(12) United States Patent
Dudar

(10) Patent No.: US 10,480,431 B1
(45) Date of Patent: Nov. 19, 2019

(54) SYSTEMS AND METHODS FOR ONBOARD CANISTER PURGE VALVE FLOW MAPPING

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 15/987,046

(22) Filed: May 23, 2018

(51) Int. Cl.
*F02D 41/00* (2006.01)
*F02M 25/08* (2006.01)

(52) U.S. Cl.
CPC ..... *F02D 41/0032* (2013.01); *F02M 25/0809* (2013.01); *F02M 25/0854* (2013.01)

(58) Field of Classification Search
CPC . F02D 41/00; F02D 41/0032; F02M 25/0809; F02M 25/0854
See application file for complete search history.

(56) References Cited

U.S. PATENT DOCUMENTS

| | | | |
|---|---|---|---|
| 6,283,098 B1 | 9/2001 | Corkill | |
| 7,448,367 B1 * | 11/2008 | Reddy | B60K 15/03519 123/519 |
| 9,416,755 B2 | 8/2016 | Dudar | |
| 9,429,114 B2 * | 8/2016 | Dudar | F02D 41/0032 |
| 9,664,127 B2 | 5/2017 | Dudar | |
| 9,669,825 B1 | 6/2017 | Dudar | |
| 9,797,348 B2 * | 10/2017 | Dudar | F02M 25/089 |
| 9,856,830 B2 | 1/2018 | Dudar | |
| 2018/0010532 A1 | 1/2018 | Dudar | |

OTHER PUBLICATIONS

Dudar, A., "Systems and Methods for Diagnosing a Vehicle Engine Intake Manifold and Exhaust System," U.S. Appl. No. 15/804,359, filed Nov. 6, 2017, 91 pages.
Dudar, A., "Systems and Methods to Mitigate Gasoline Particulate Filter Pressure Sensor Degradation," U.S. Appl. No. 15/918,833, filed Mar. 12, 2018, 91 pages.
Dudar, A. et al., "Systems and Methods for Onboard Canister Purge Valve Flow Mapping," U.S. Appl. No. 15/987,028, filed May 23, 2018, 130 pages.

* cited by examiner

*Primary Examiner* — Hieu T Vo
(74) *Attorney, Agent, or Firm* — Geoffrey Brumbaugh; McCoy Russell LLP

(57) ABSTRACT

Methods and systems are provided for indicating a presence or absence of degradation in a vehicle evaporative emissions system, where degradation includes a restriction in the evaporative emissions system and/or a source of undesired evaporative emissions. In one example, a method includes, under conditions where an engine is not combusting air and fuel, applying a pressure from the evaporative emissions system to an intake of the engine, and indicating an absence of degradation in the evaporative emissions system based on a test flow in the intake of the engine being within a predetermined threshold of a baseline flow obtained at an earlier time via applying the pressure. In this way, a presence or absence of degradation may be indicated without relying on engine operation.

20 Claims, 21 Drawing Sheets

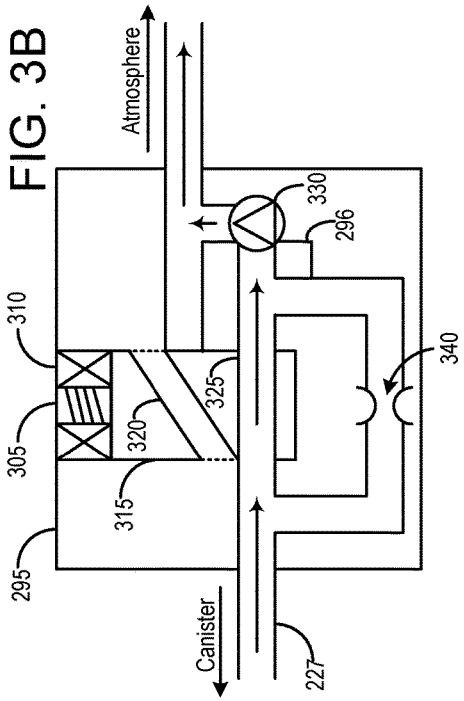
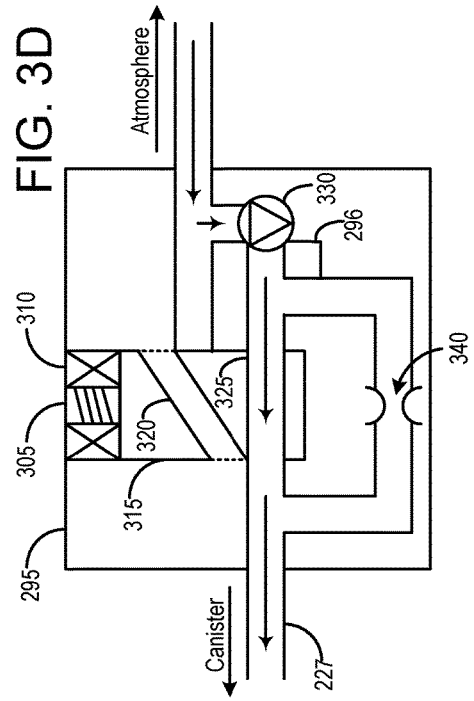
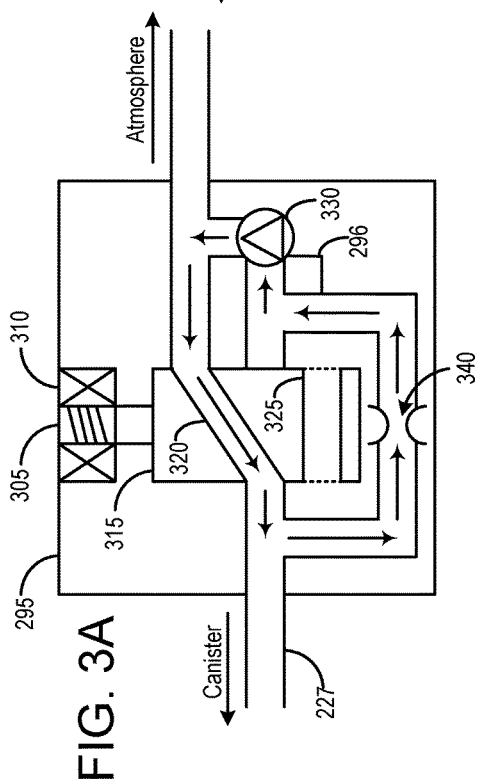

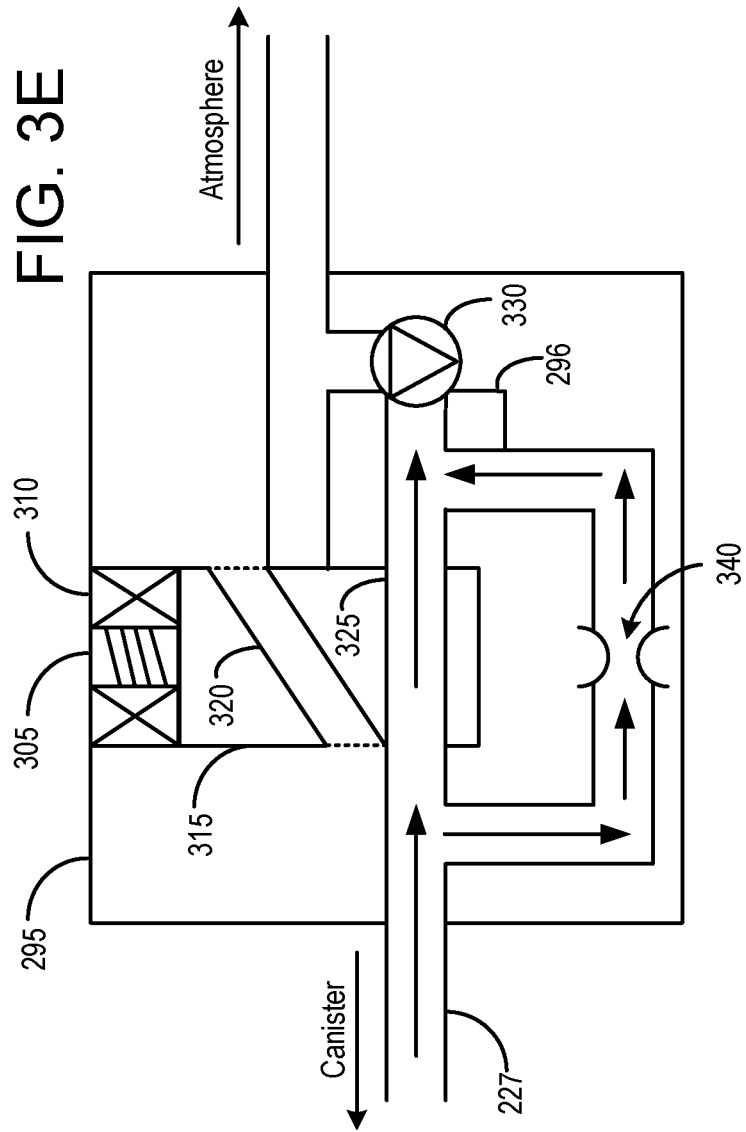

| | 0.035 | 0.104 | 0.174 | 0.243 | 0.312 | 0.382 | 0.451 | 0.590 |
|---|---|---|---|---|---|---|---|---|
| 0.224 | 1.000 | 1.000 | 1.000 | 1.000 | 1.000 | 0.990 | 1.000 | 1.000 |
| 0.195 | 1.000 | 1.000 | 0.955 | 0.867 | 0.836 | 0.833 | 0.847 | 0.998 |
| 0.167 | 1.000 | .0998 | 0.842 | 0.763 | 0.722 | 0.716 | 0.718 | 0.722 |
| 0.141 | 1.000 | .0888 | 0.736 | 0.674 | 0.634 | 0.617 | 0.618 | 0.621 |
| 0.117 | 1.000 | 0.762 | 0.639 | 0.577 | 0.540 | 0.520 | 0.517 | 0.519 |
| 0.096 | 0.998 | 0.653 | 0.539 | 0.487 | 0.454 | 0.437 | 0.432 | 0.432 |
| 0.076 | 0.827 | 0.531 | 0.439 | 0.396 | 0.371 | 0.350 | 0.344 | 0.342 |
| 0.059 | 0.678 | .0423 | 0.341 | 0.304 | 0.287 | 0.274 | 0.272 | 0.268 |
| 0.044 | 0.527 | 0.313 | 0.258 | 0.223 | 0.210 | 0.205 | 0.205 | 0.201 |
| 0.03 | 0.378 | .0217 | 0.183 | 0.164 | 0.157 | 0.148 | 0.150 | 0.148 |
| 0.019 | 0.231 | 0.151 | .0126 | 0.116 | 0.115 | 0.109 | 0.113 | 0.111 |
| 0.010 | 0.136 | 0.103 | 0.088 | 0.076 | 0.074 | 0.066 | 0.076 | 0.070 |
| 0.003 | 0.064 | 0.049 | 0.044 | 0.042 | 0.043 | 0.040 | 0.043 | 0.043 |
| 0 | 0.000 | 0.000 | 0.000 | 0.000 | 0.000 | 0.000 | 0.000 | 0.000 |

Flow (lb/min)

dP (manifold vacuum − tank pressure)/ barometric pressure

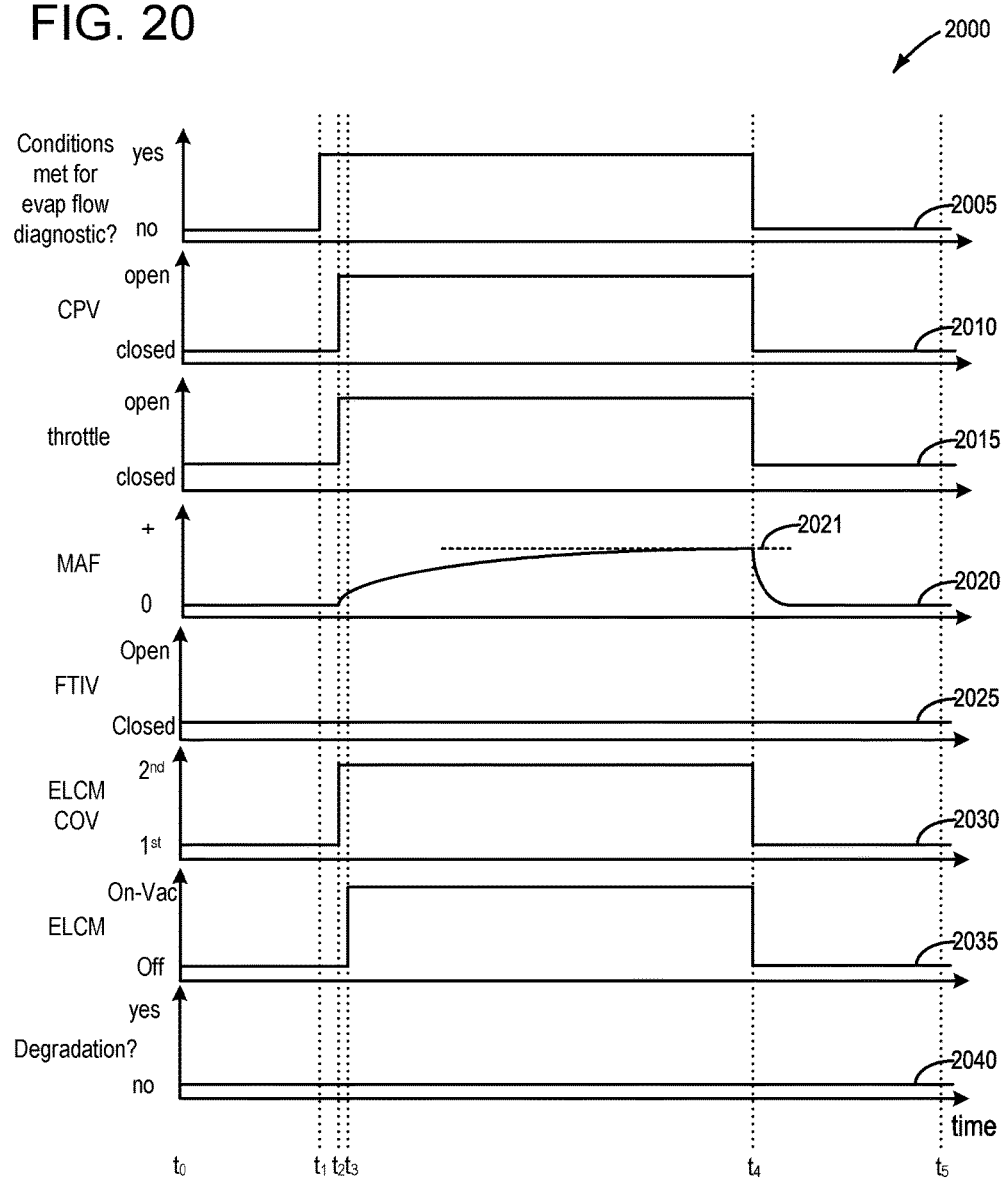

SYSTEMS AND METHODS FOR ONBOARD CANISTER PURGE VALVE FLOW MAPPING

FIELD

The present description relates generally to methods and systems for onboard flow mapping of a canister purge valve configured to regulate a flow of purge gasses from a fuel vapor storage canister to an engine of a vehicle.

BACKGROUND/SUMMARY

Vehicle evaporative emissions control systems may be configured to store fuel vapors from fuel tank refueling and diurnal engine operations in a fuel vapor canister containing a suitable adsorbent, and then purge the stored vapors during a subsequent engine operation. The stored vapors may be routed to an engine intake for combustion, further improving fuel economy.

In a typical canister purge operation, a canister purge valve coupled between the engine intake and the fuel canister is opened, allowing for intake manifold vacuum to be applied to the fuel canister. On a boosted engine, that vacuum draw may be supplied via an ejector during boosted operation. For particular hybrid vehicles, that vacuum draw may be provided via a canister purge pump positioned between the canister and the canister purge valve, for example. Simultaneously, a canister vent valve coupled between the fuel canister and atmosphere is opened, allowing for fresh air to enter the canister. Further, in some examples a vapor blocking valve coupled between the fuel tank and the fuel canister is closed to prevent the flow of fuel vapors from the fuel tank to the engine. This configuration facilitates desorption of stored fuel vapors from the adsorbent material in the canister, regenerating the adsorbent material for further fuel vapor adsorption.

A flow map stored at a controller of a vehicle may be used to command an appropriate duty cycle for the canister purge valve when purging of the canister is requested. More specifically, a particular flow value may be commanded in response to a request to purge the canister, and a 3D flow map stored at the controller may be queried to determine an appropriate duty cycle for the canister purge valve as a function of engine manifold vacuum. Such a flow value may be chosen so as to avoid potentially stalling the engine due to a rich amount of fuel vapors emanating from the canister (and fuel tank in some examples), and may be further based on a number of other relevant engine operating parameters. Furthermore, it is desirable to learn canister loading state via feedback from exhaust gas oxygen sensors during purging operations, and in order to accurately learn such a loading state, it is imperative that the commanded flow is accurate.

Degradation of components of the evaporative emissions system may adversely impact purging of the canister. For example, flow maps used to control a canister purge valve duty cycle for purging may not be accurate in the presence of degradation. Thus, it is desirable to regularly perform onboard methodology to indicate a level to which the evaporative emissions system and its components may be degraded, such that onboard strategy may update such flow maps. For hybrid vehicles with limited engine run time, it is desirable to perform such methodology to indicate the level to which the evaporative emissions system and its components are degraded, while the engine is not combusting air and fuel. The inventors have herein recognized the above-mentioned issues, and have developed methods and systems to address them. In one example, a method comprises during a condition where an engine of a vehicle is not combusting air and fuel, applying a pressure from an evaporative emissions system of the vehicle to an intake of the engine, and indicating an absence of degradation in the evaporative emissions system based on a test flow in the intake of the engine being within a predetermined threshold of a baseline flow obtained at an earlier time via applying the pressure. In this way, a presence or absence evaporative emissions system degradation may be indicated in the absence of engine operation.

As one example, a purge valve positioned in a purge line between the fuel vapor storage canister and the engine is commanded fully open, and wherein a throttle positioned in the intake is commanded fully open for obtaining the test flow and the baseline flow, for applying the pressure. Furthermore, applying the pressure may include applying a positive pressure, or may include applying a negative pressure. Applying the negative pressure may include utilizing a pump positioned in a vent line of the evaporative emissions system is controlled to a predetermined speed for applying the negative pressure to obtain the test flow and the baseline flow. Applying the positive pressure may include routing pressure generated during a refueling event of a fuel tank of the vehicle to the intake.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a schematic depiction of an evaporative level check module (ELCM) in a configuration to perform a reference check.

FIG. 3B shows a schematic depiction of an ELCM in a configuration to evacuate a fuel system and/or evaporative emissions system.

FIG. 3C shows a schematic depiction of an ELCM in a configuration that couples a fuel vapor canister to atmosphere.

FIG. 3D shows a schematic depiction of an ELCM in a configuration to pressurize a fuel system and/or evaporative emissions system.

FIG. 3E shows a schematic depiction of an ELCM in a configuration to seal an evaporative emissions system from atmosphere.

FIG. 6 depicts an example CPV flow map stored at a controller of a vehicle.

FIG. 20 depicts an example timeline for obtaining the baseline and test evap flow measurements for use with the method of FIG. 18, according to the method of FIG. 19.

DETAILED DESCRIPTION

Figure 4:
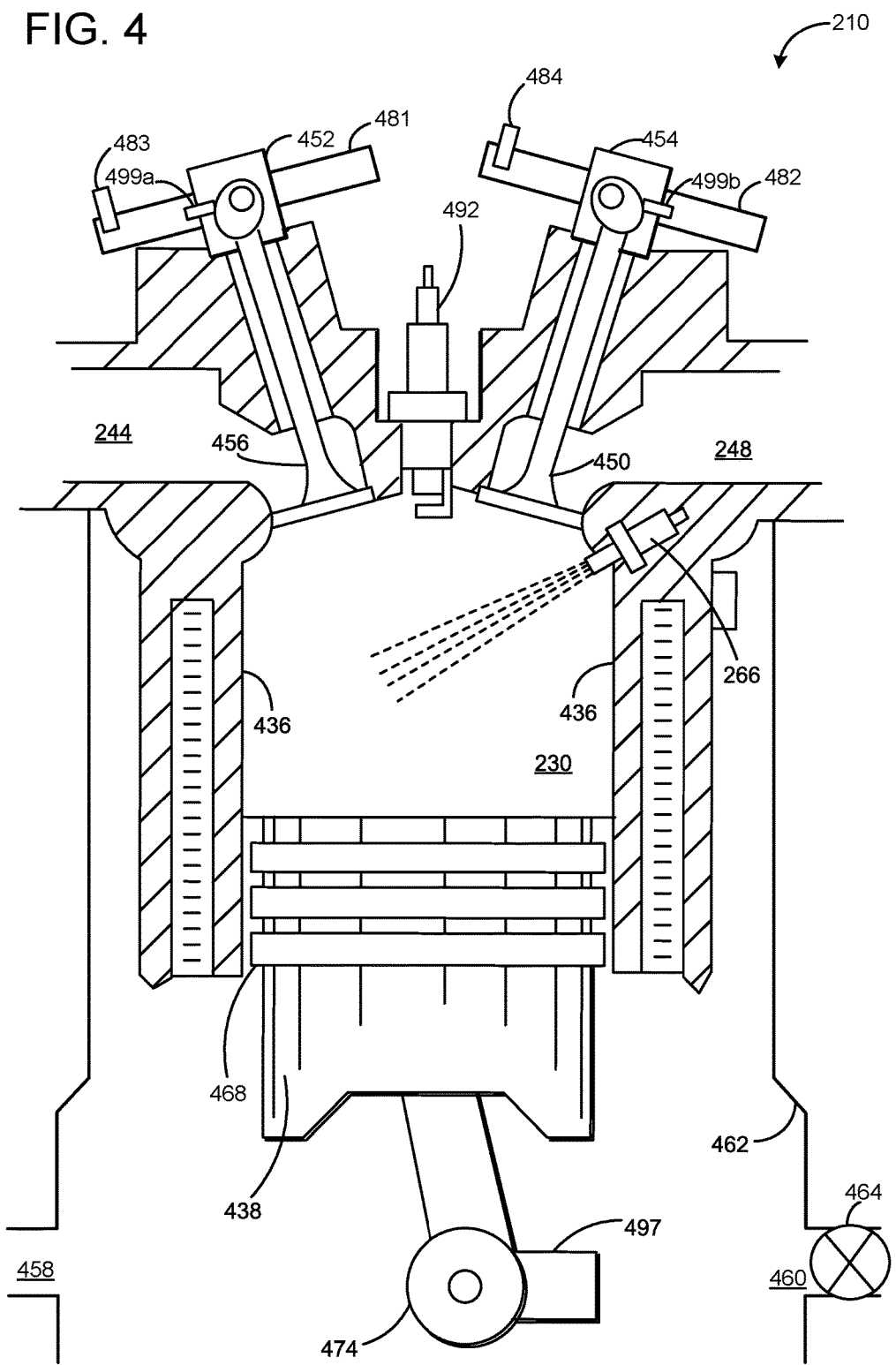
FIG. 4 schematically shows a single cylinder of the engine system of FIGS. 1-2.

The following description relates to systems and methods for controlling purging of a fuel vapor storage canister positioned in an evaporative emissions system of a vehicle, based on indications as to whether the evaporative emissions system and/or components therein are degraded. The systems and methods include using onboard diagnostics to indicate evaporative emissions system degradation, and for updating flow maps stored at the controller that are used to control a duty cycle of a canister purge valve during purging events, in response to said degradation. The systems and methods may in some examples be conducted under conditions where an engine of the vehicle is not combusting air and fuel. Accordingly, such systems and methods relate to hybrid electric vehicles, such as the hybrid electric vehicle system of FIG. 1. FIG. 2 provides details of an engine system selectively coupled to an evaporative emissions system and fuel system. The evaporative emissions system may include a pump positioned in a vent line, where the pump may be controlled under various scenarios as illustrated at FIGS. 3A-3E. An example of a cylinder of the engine is depicted at FIG. 4.

Figure 5A:
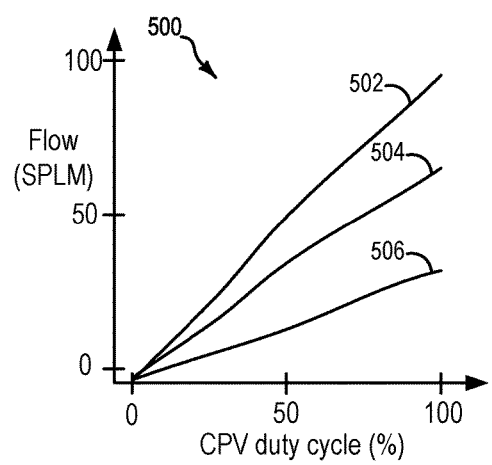
FIG. 5A schematically depicts a purge flow rate as a function of a duty cycle of a CPV and intake manifold vacuum level.
Figure 5B:
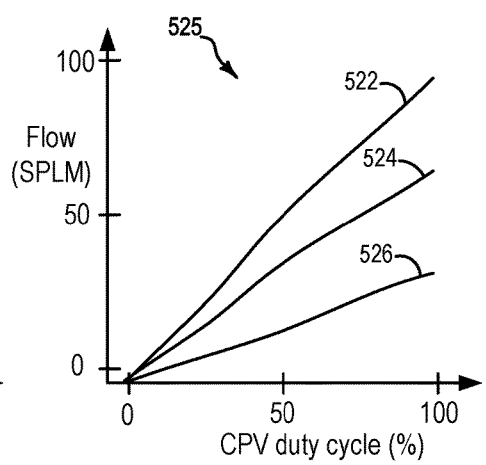
FIG. 5B schematically depicts a purge flow rate as a function of a duty cycle of a CPV and a purge pump speed.
Figure 5C:
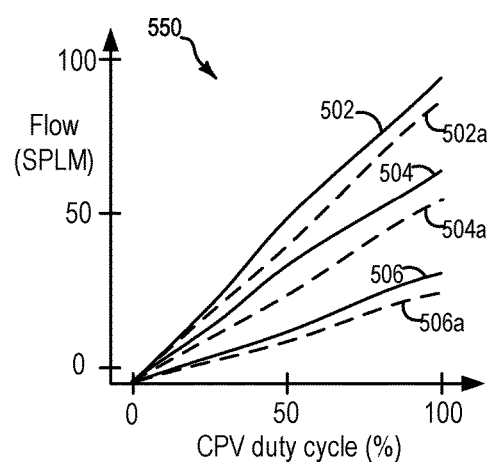
FIG. 5C corresponds to FIG. 5A, and further illustrates the purge flow rates of FIG. 5A in the presence of degradation.
Figure 5D:
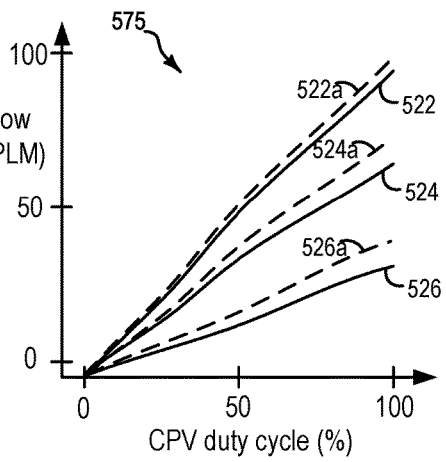
FIG. 5D corresponds to FIG. 5B, and further illustrates the purge flow rates of FIG. 5B in the presence of degradation.
Figure 7A:
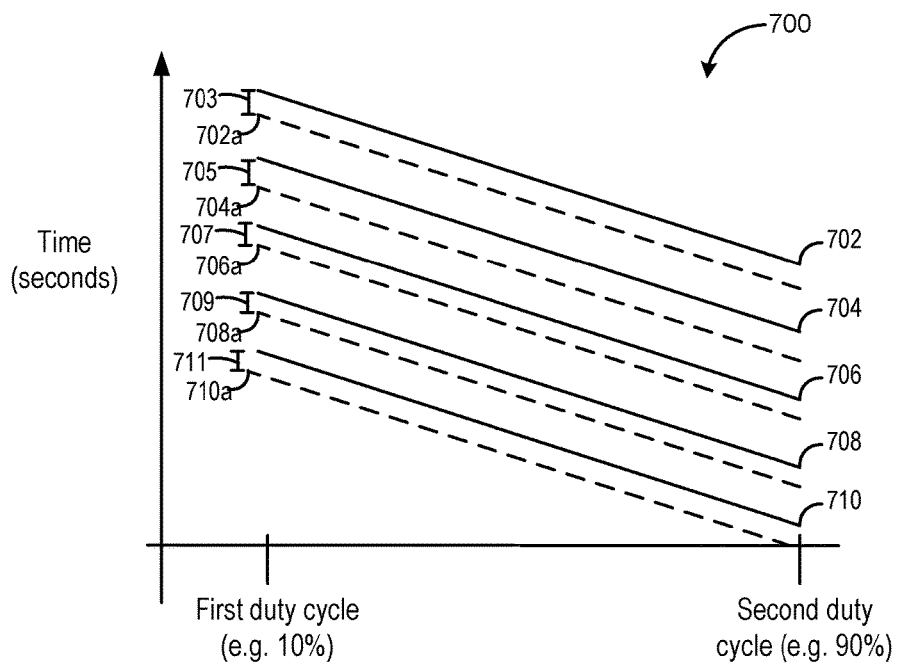
FIG. 7A schematically depicts onboard data obtained for updating a CPV flow map stored at the controller, where the data is obtained via evacuating an evaporative emissions system via intake manifold vacuum.
Figure 7B:
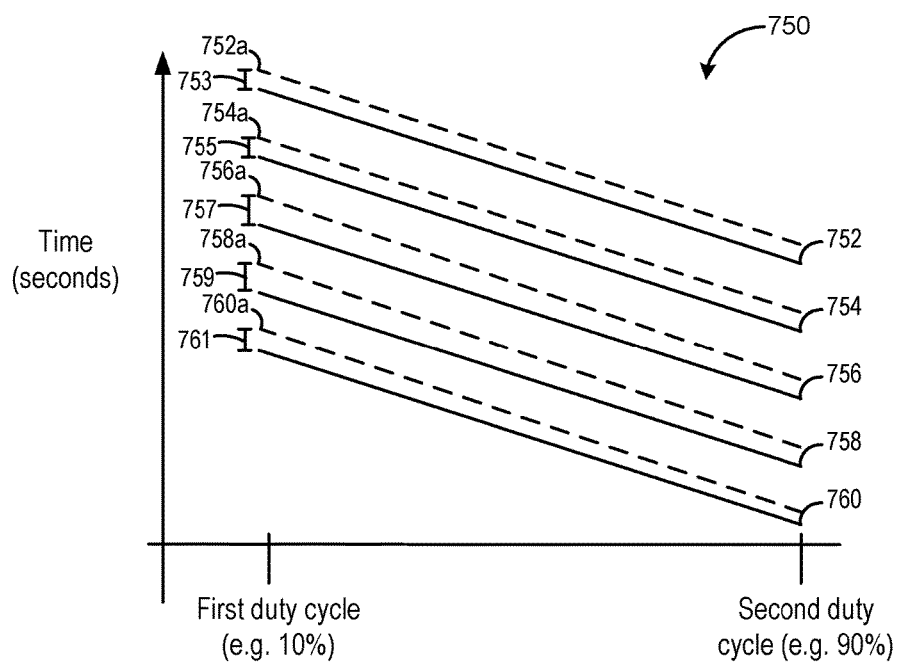
FIG. 7B schematically depicts onboard data obtained for updating a CPV flow map stored at the controller, where the data is obtained via evacuating an evaporative emissions system via a purge pump.
Figure 8:
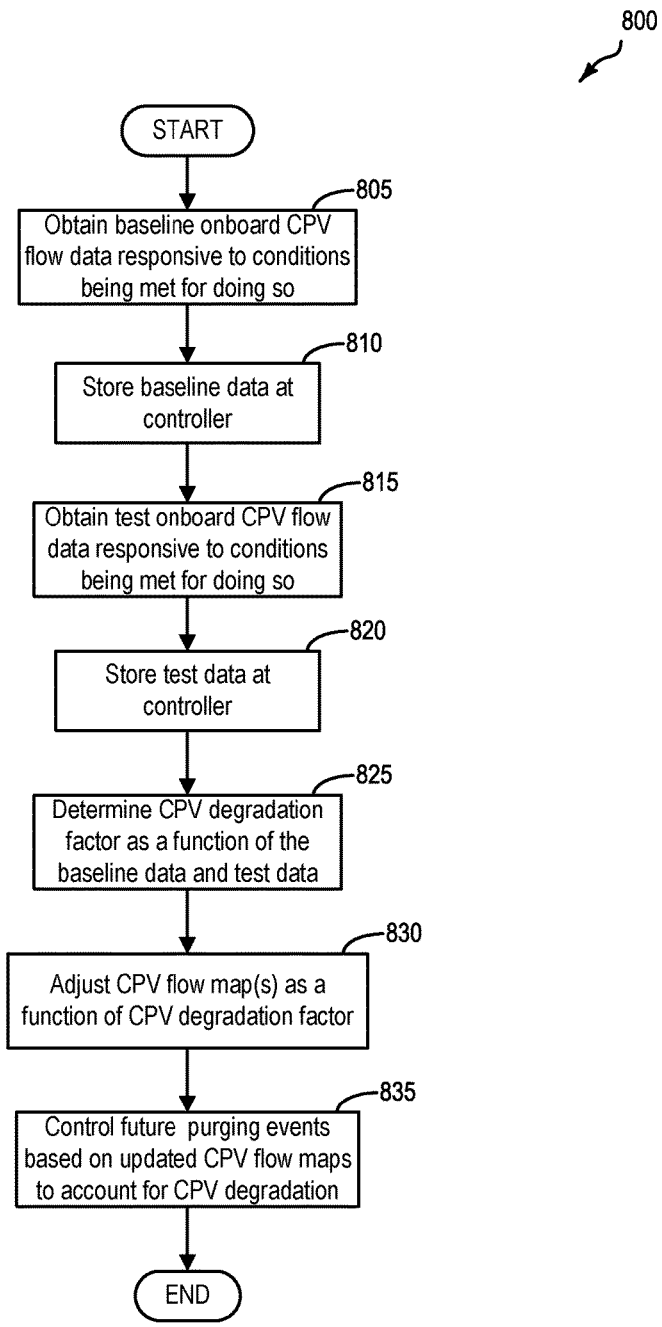
FIG. 8 depicts a high-level example method for adjusting a CPV flow map stored at a controller of a vehicle, by obtaining baseline onboard CPV flow data and test onboard CPV flow data.
Figure 9:
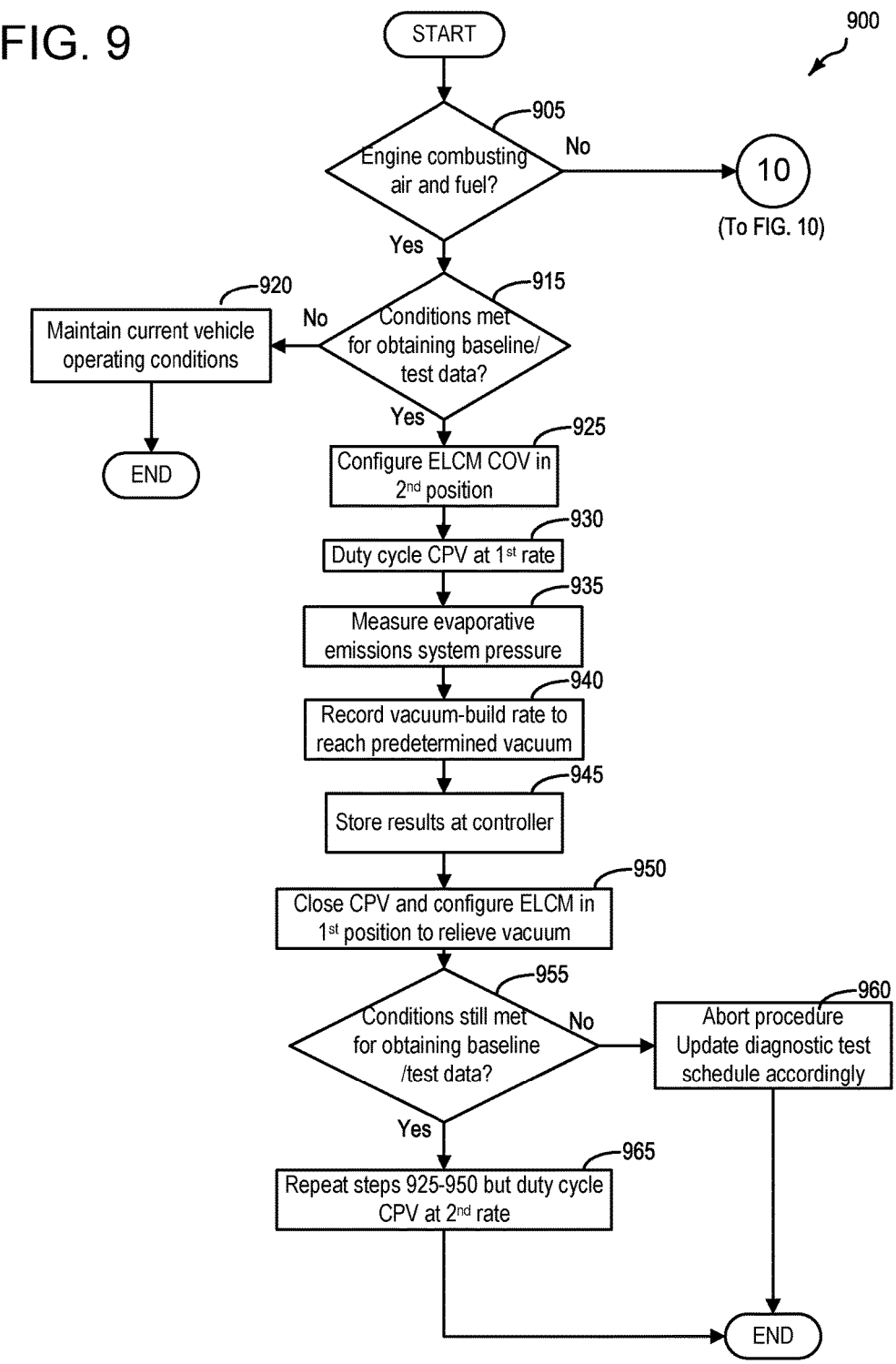
FIG. 9 depicts an example method for obtaining the baseline and/or test CPV flow data of FIG. 8 using intake manifold vacuum while the engine is combusting air and fuel.
Figure 10:
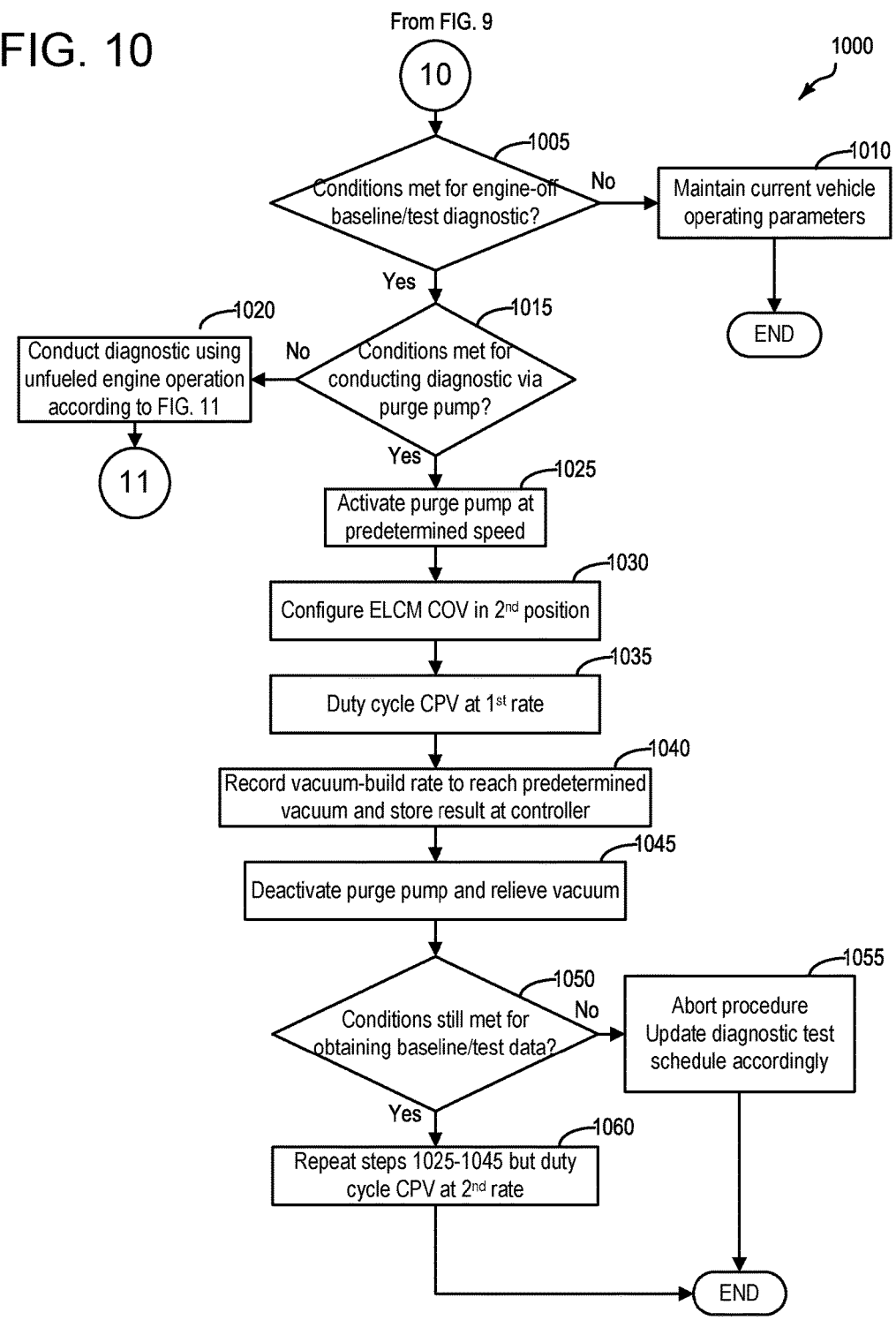
FIG. 10 continues from FIG. 9, and depicts an example method for obtaining the baseline and/or test CPV flow data of FIG. 8 using a purge pump.
Figure 11:
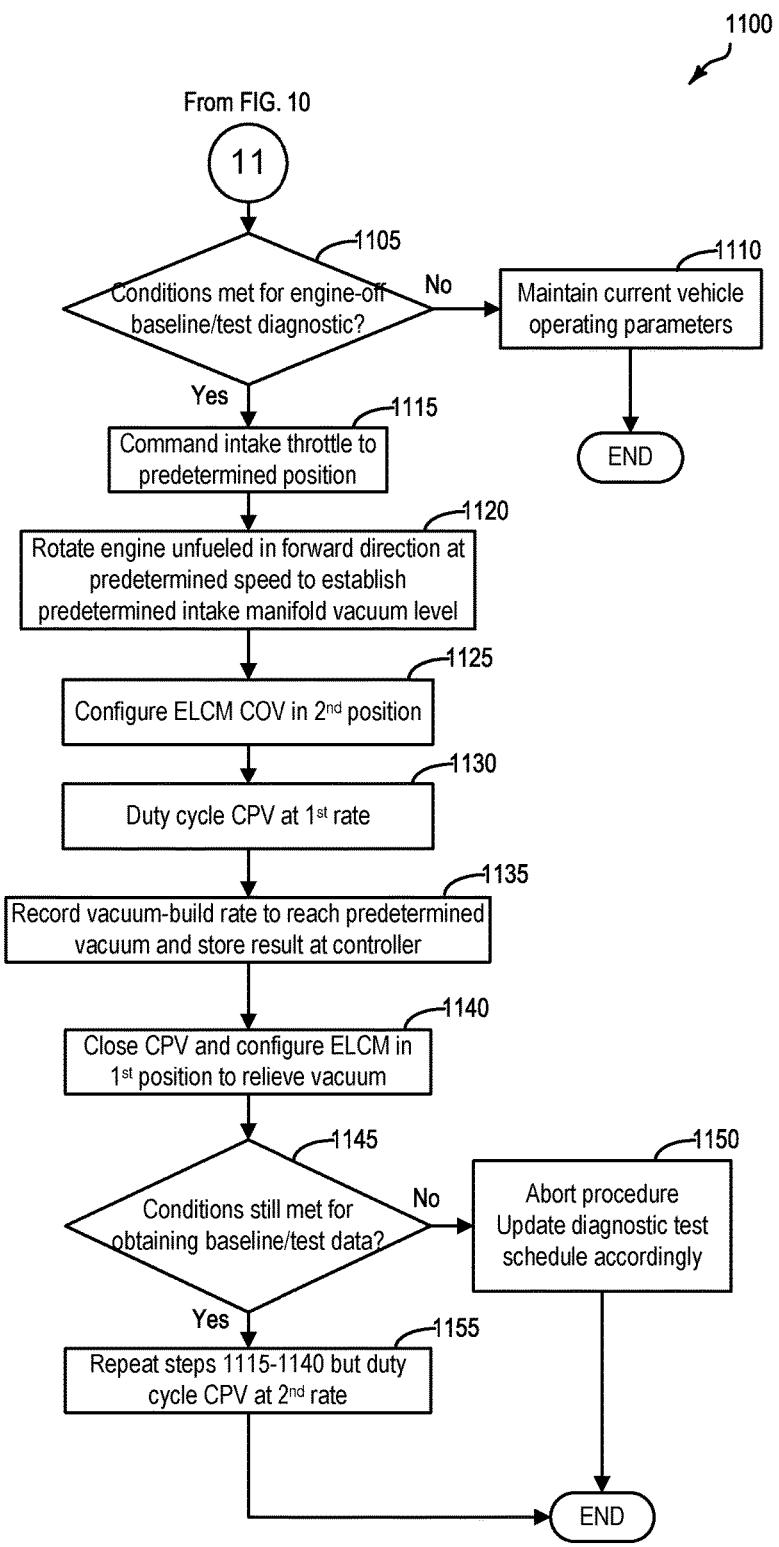
FIG. 11 continues from FIG. 10, and depicts an example method for obtaining the baseline and/or test CPV flow data of FIG. 8 using intake manifold vacuum via the rotating the engine unfueled.
Figure 12:
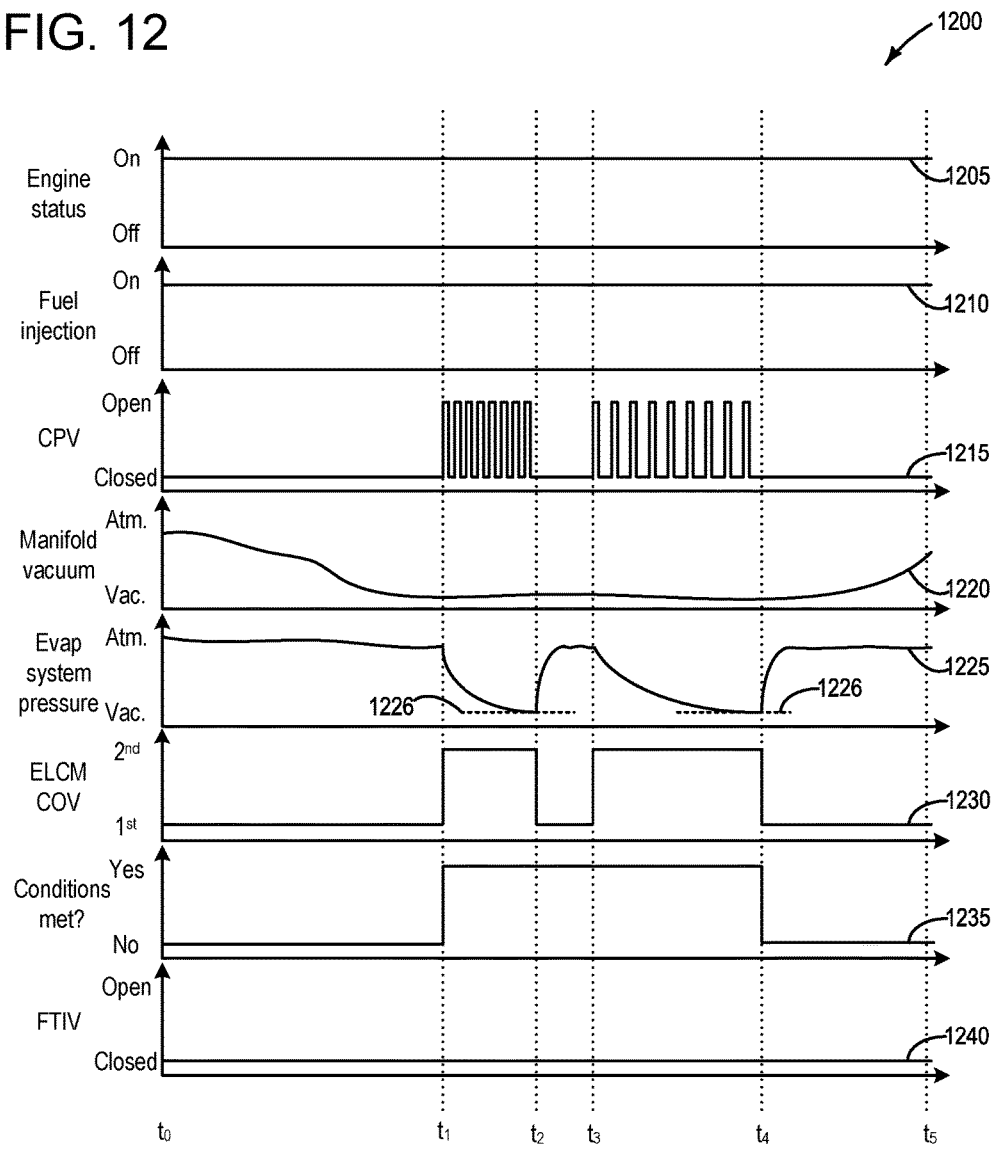
FIG. 12 depicts an example timeline for obtaining CPV flow data via the method of FIG. 9.
Figure 13:
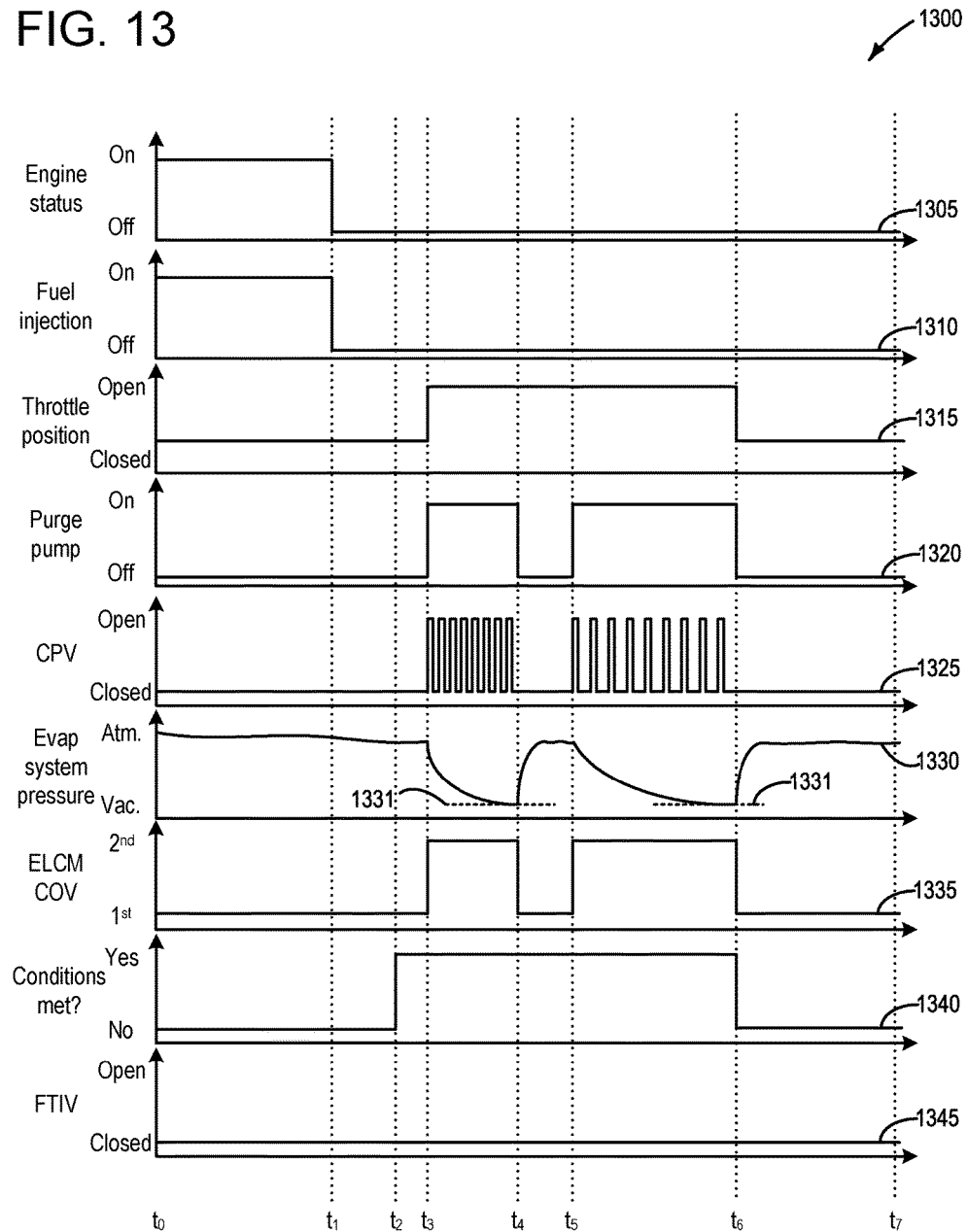
FIG. 13 depicts an example timeline for obtaining CPV flow data via the method of FIG. 10.
Figure 14:
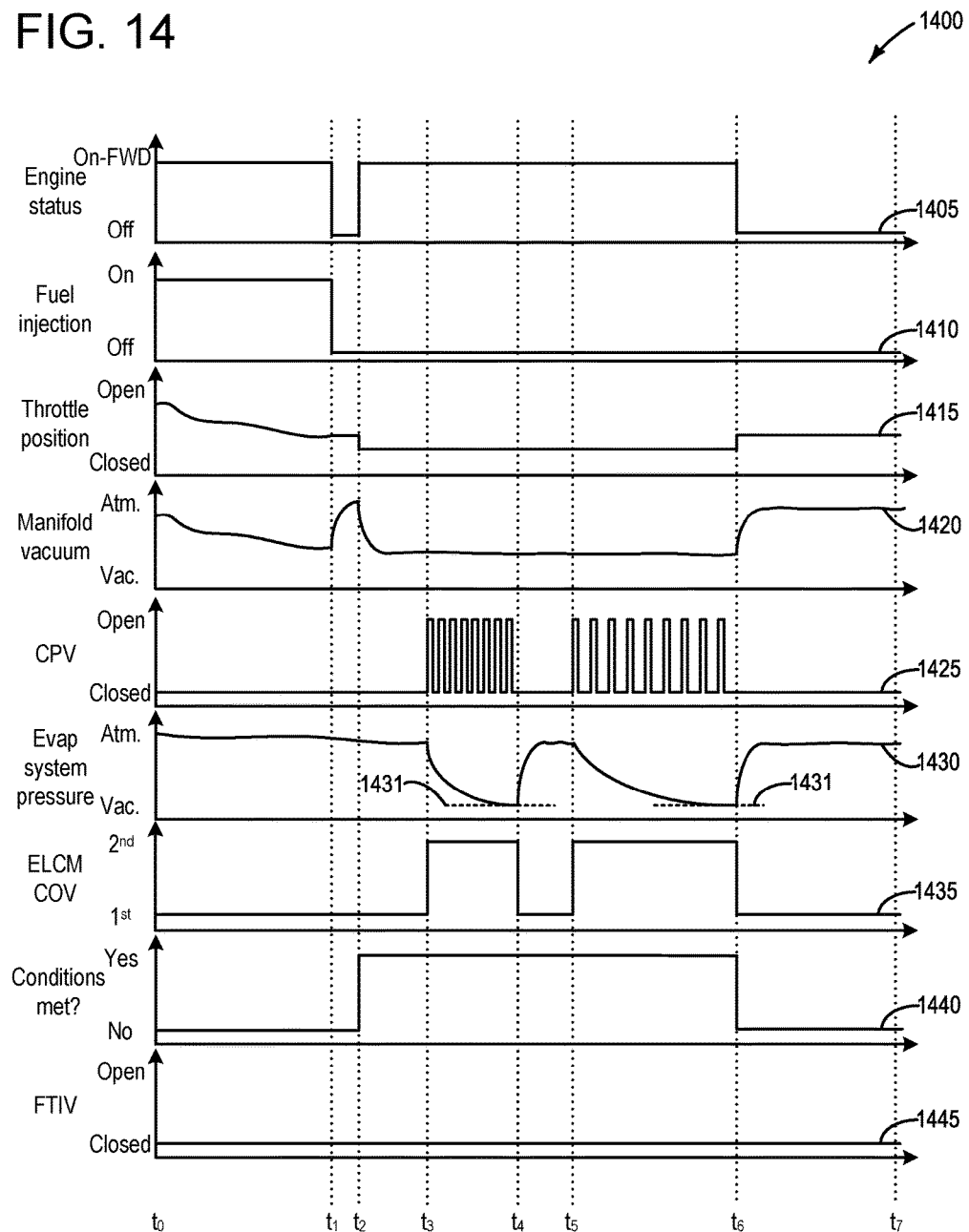
FIG. 14 depicts an example timeline for obtaining CPV flow data via the method of FIG. 11.

FIGS. 5A-5B depict examples of purge flow rates as a function of a duty cycle of the canister purge valve, and FIGS. 5C-5D depict how such flow rates may be impacted by degradation of the canister purge valve and/or other components of the evaporative emissions system (e.g. canister internal filter being clogged, sources of undesired evaporative emissions). An example of a flow map stored at a controller that is used to control the duty cycle of the canister purge valve for purging the canister is depicted at FIG. 6. FIGS. 7A-7B graphically illustrate onboard methodology for updating such a flow map as that depicted at FIG. 6. FIG. 8 depicts a high-level example method for updating/adjusting such a flow map, and for controlling future purging events of the canister based on the updated flow map. FIG. 9 illustrates a method for obtaining data used to update a flow map via methodology that relies on the engine combusting air and fuel. FIG. 10 illustrates a method that relies on a purge pump positioned between the engine and the canister, for obtaining data used to update a flow map. FIG. 11 illustrates a method that relies on unfueled engine rotation to obtain data used to update a flow map. FIG. 12 depicts an example timeline for obtaining data for updating a flow map according to the method of FIG. 9. FIG. 13 depicts an example timeline for obtaining data for updating a flow map according to the method of FIG. 10. FIG. 14 depicts an example timeline for obtaining data for updating a flow map according to the method of FIG. 11.

Figure 15:
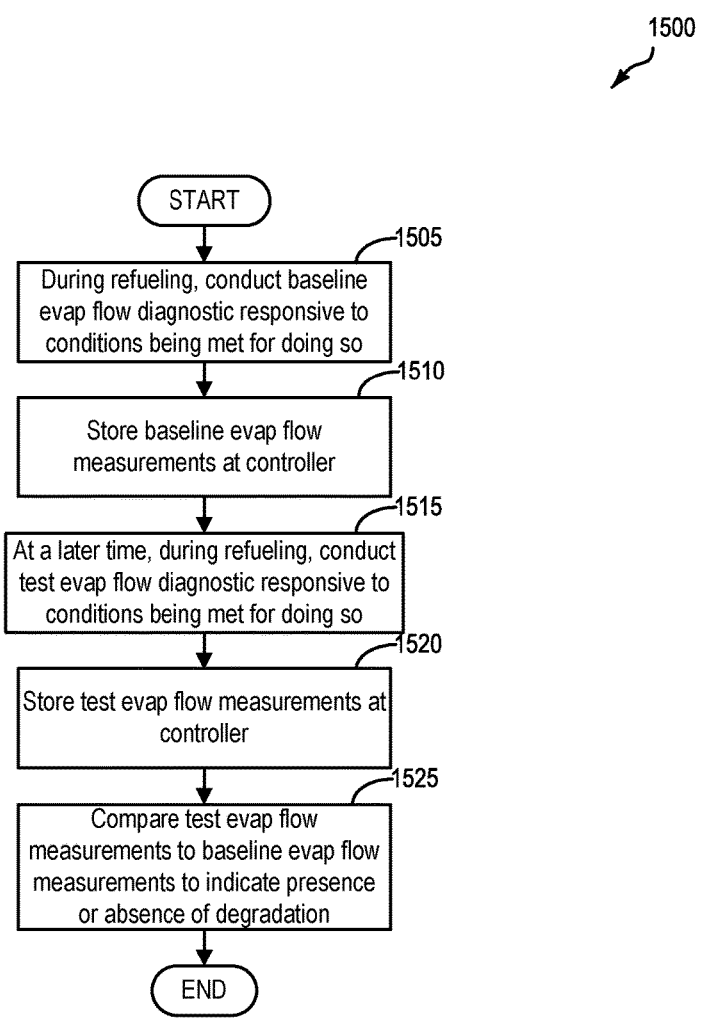
FIG. 15 depicts a high-level example method for indicating evaporative emissions system degradation during a refueling event by monitoring fluid flow in the intake of an engine.
Figure 16:
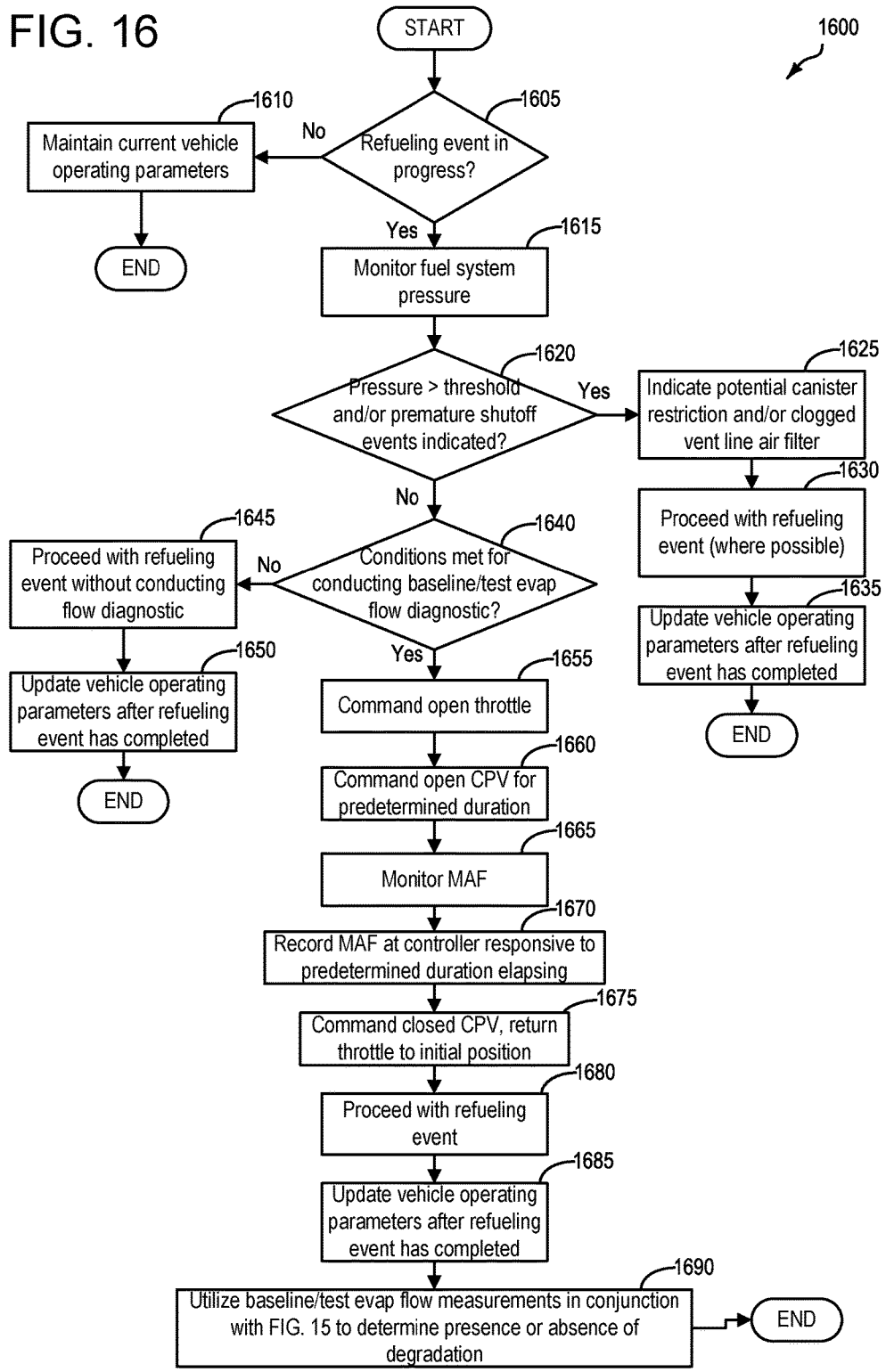
FIG. 16 depicts an example method for obtaining baseline and test evap flow measurements for use with the method of FIG. 15.
Figure 17:
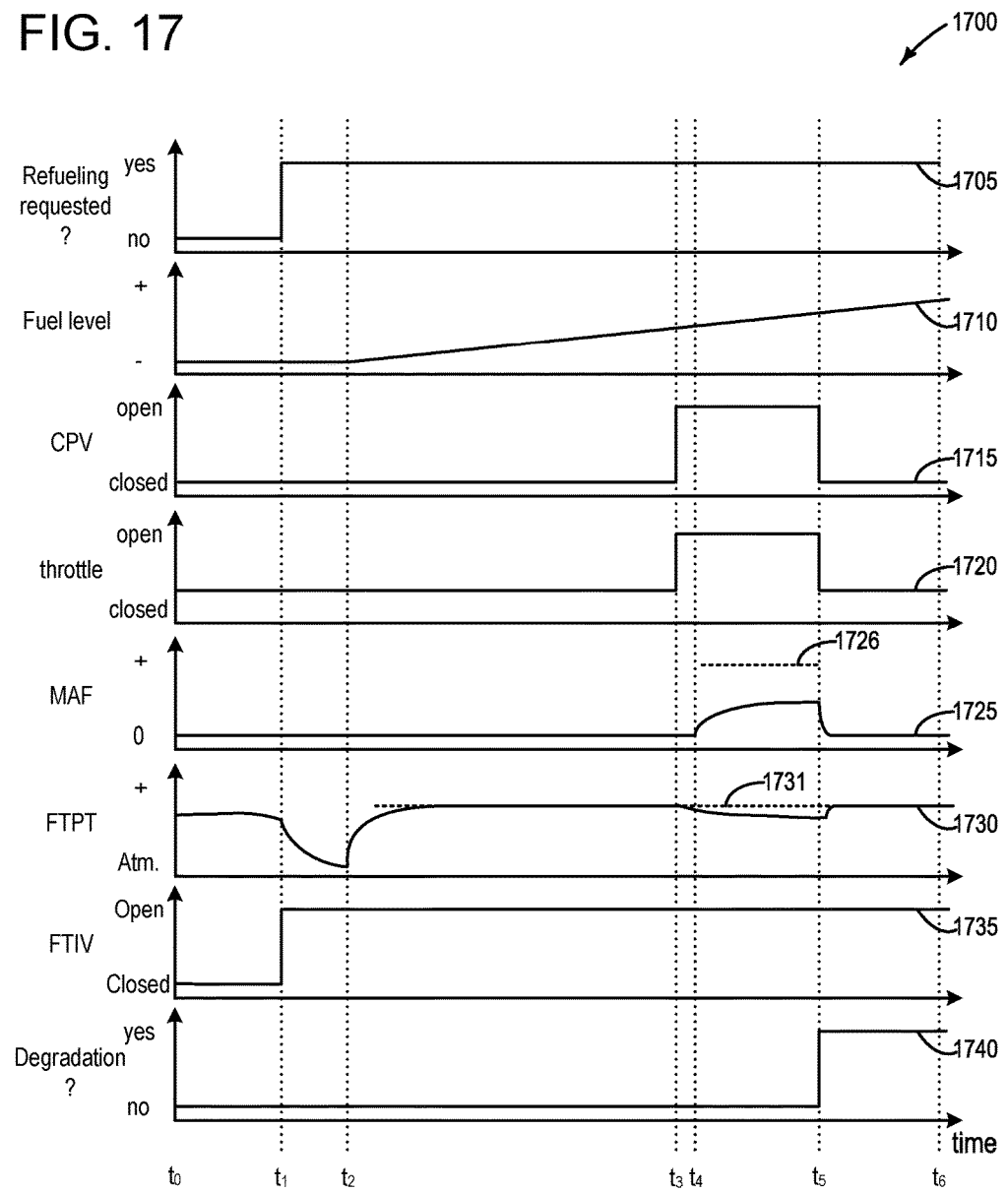
FIG. 17 depicts an example timeline for obtaining the baseline and test evap flow measurements for use with the method of FIG. 15, according to the method of FIG. 16.
Figure 18:
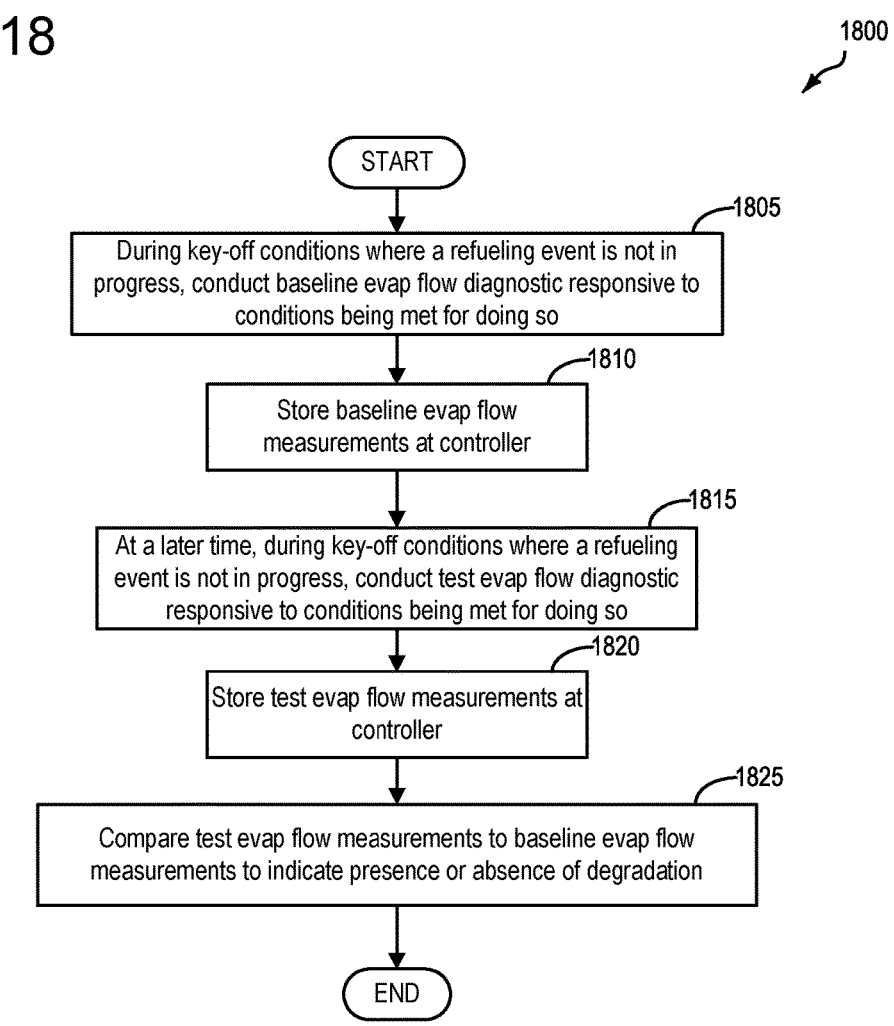
FIG. 18 depicts a high-level example method for indicating evaporative emissions system degradation during a key-off event that does not include a refueling event, by monitoring fluid flow in the intake of an engine.
Figure 19:
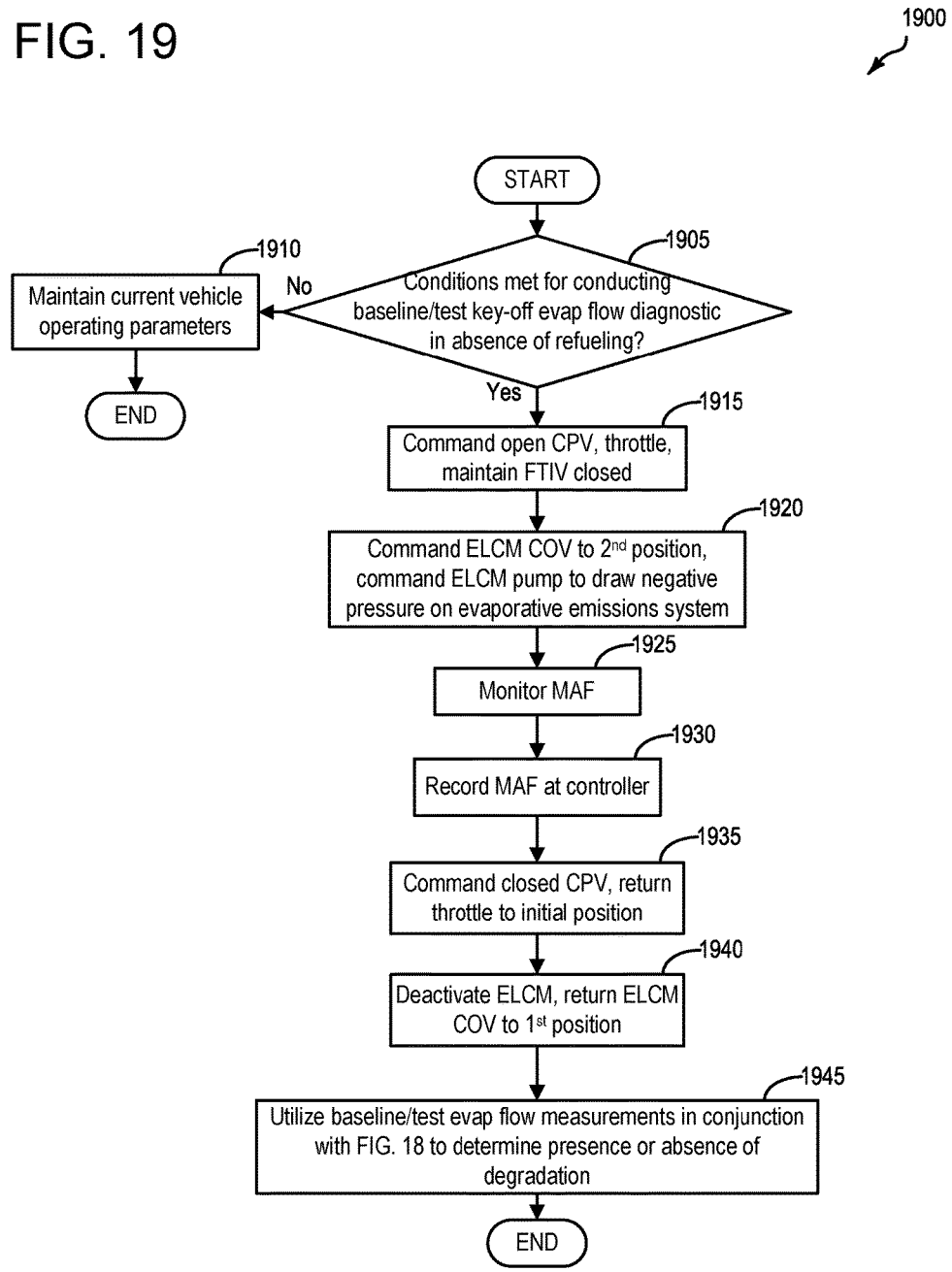
FIG. 19 depicts an example method for obtaining baseline and test evap flow measurements for use with the method of FIG. 18.

FIG. 15 depicts a high-level method for providing an indication of a presence or absence of degradation stemming from the evaporative emissions system during a refueling event. FIG. 16 illustrates onboard methodology for obtaining data for use with the method of FIG. 15. FIG. 17 depicts an example timeline for obtaining such data according to FIG. 16, for indicating a presence or absence of degradation according to FIG. 15. FIG. 18 depicts a high-level example method for providing an indication of a presence or absence of degradation stemming from the evaporative emissions system during a key-off condition that does not include a refueling event. FIG. 19 illustrates onboard methodology for obtaining data for use with the method of FIG. 18. FIG. 20 depicts an example timeline for obtaining such data according to FIG. 19, for indicating a presence or absence of degradation according to FIG. 18.

Figure 1:
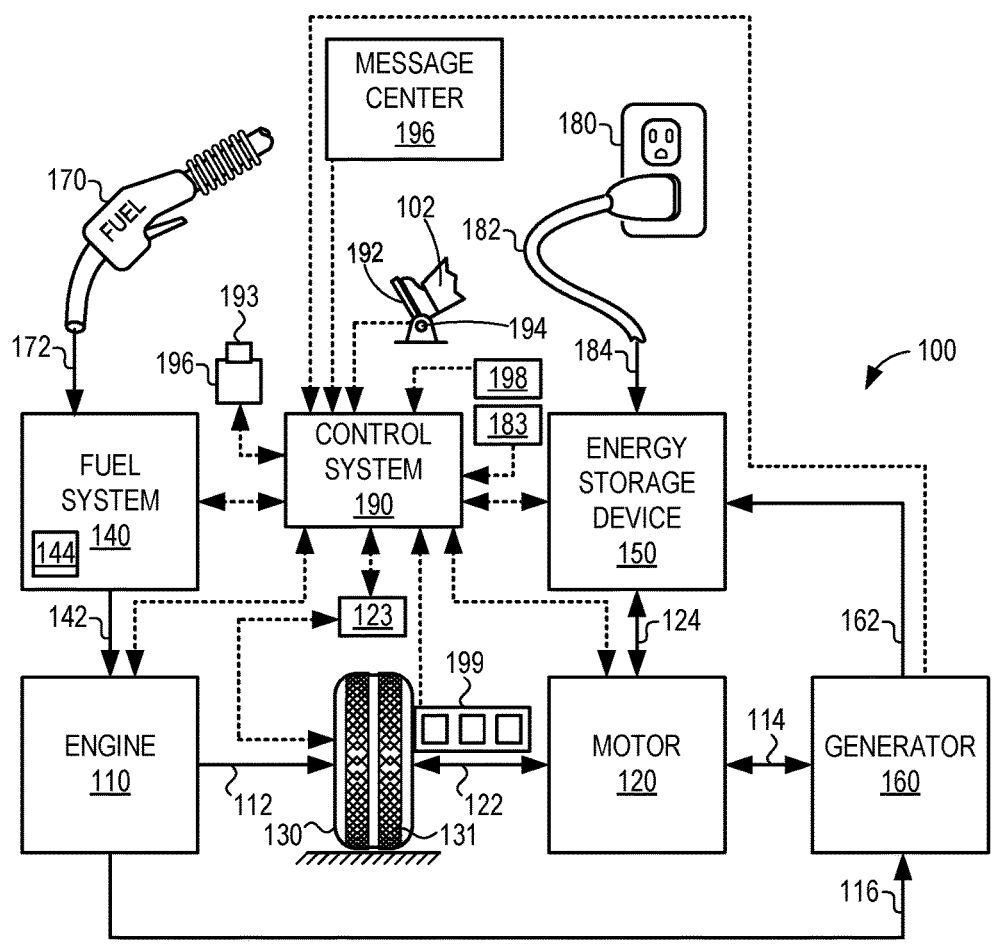
FIG. 1 schematically shows an example vehicle propulsion system.
Figure 2:
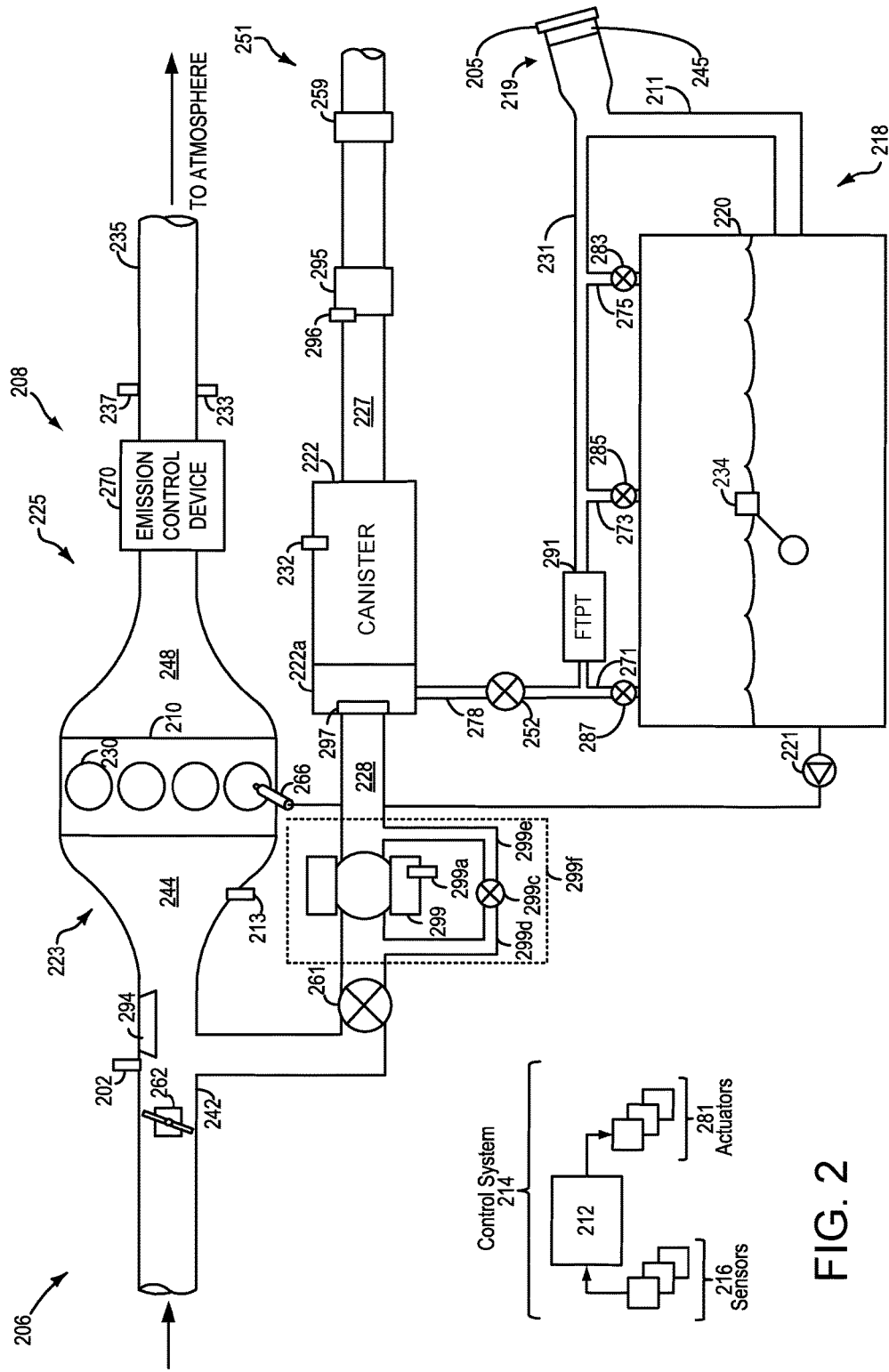
FIG. 2 schematically shows an example vehicle system comprising an engine system coupled to a fuel system and an evaporative emissions system.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 193 which may be manually actuated or pressed by a vehicle operator to initiate refueling. For example, as described in more detail below, in response to the vehicle operator actuating refueling button 193, a fuel tank in the vehicle may be depressurized so that refueling may be performed.

In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Engine 110 may be configured with Start/Stop (S/S) feature 183 (also referred to herein as a S/S system) communicatively coupled to control system 190, wherein the control system 190 may automatically shut down (idle-stop) the internal combustion engine 110, without receiving operator input to shut down the engine, if selected idle-stop conditions are met. These may include, for example, torque demand being less than a threshold, engine speed less than a threshold engine speed, vehicle speed below a threshold vehicle speed (e.g. 5 mph) the onboard energy storage device being sufficiently charged, no request being received for air-conditioning, etc. Likewise, the engine may be automatically restarted responsive to the torque demand being higher than the threshold, the battery requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via motor 120 or a different motor coupled to a crankshaft of engine 110, until a desired engine speed is reached, after which the motor may be disabled and engine fueling may be resumed. Thereafter engine combustion may be able to support engine spinning. As a result of the automatic start/stops, fuel consumption and exhaust emissions can be reduced.

FIG. 2 shows a schematic depiction of a vehicle system 206. It may be understood that vehicle system 206 may be the same as vehicle propulsion system 100 described above at FIG. 1. The vehicle system 206 includes an engine system 208 coupled to an emissions control system 251 and a fuel system 218. It may be understood that fuel system 218 may be the same as fuel system 140 depicted at FIG. 1. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. It may be understood that engine 210 may comprise the same engine as engine 110 depicted above at FIG. 1. The engine 210 includes an engine intake 223 and an engine exhaust 225. The engine intake 223 includes a throttle 262 fluidly coupled to the engine intake manifold 244 via an intake passage 242. Engine intake may further include various sensors. For example, a mass air flow (MAF) sensor 202 may be coupled to the engine intake to determine a rate of air mass or fluid flow flowing through the intake. Further, a barometric pressure sensor 213 may be included in the engine intake. For example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 (e.g. 144) coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

A canister internal filter 297 may in some examples be included in the canister 222. Canister internal filter 297 may be positioned near purge line 228, such that during purging of the canister to engine intake, dust particles from atmosphere and/or from the adsorbent material may be prevented from being routed through purge line 228. For example, such dust particles may, over time, interact with canister purge valve 261, which may result in purge valve 261 sticking closed, not fully opening, sticking open, etc. By including the canister internal filter 297, such issues may be reduced or avoided.

An air intake system hydrocarbon trap (AIS HC) 294 may be placed in the intake manifold of engine 210 to adsorb fuel vapors emanating from unburned fuel in the intake manifold, puddled fuel from degraded injectors and/or fuel vapors in crankcase ventilation emissions during engine-off periods. The AIS HC may include a stack of consecutively layered polymeric sheets impregnated with HC (hydrocarbon) vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 294. In addition, fuel vapors stored during an engine shutdown can also be desorbed from the AIS HC during engine operation. In this way, AIS HC 294 may be continually loaded and purged, and the trap may reduce evaporative emissions from the intake passage even when engine 210 is shut down.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer may not be linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222. In other examples, as will be discussed in further detail below, a purge pump 299 may be activated to draw atmospheric air across canister 222 and through open purge valve 261 to route fuel vapors desorbed from the canister to engine intake. Such action may be undertaken when intake manifold vacuum is not sufficient to be used for purging the canister, for example. In some examples, the flow of air and vapors between canister 222 and the atmosphere may be regulated by a canister vent valve (not shown) coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. However, in some examples the flow of air and vapors between canister 222 and atmosphere may be regulated by a changeover valve configured as part of an evaporative level check module (ELCM) 295. Details of such an ELCM and associated changeover valve will be discussed in further detail below and particularly with regard to FIGS. 3A-3E.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed. As will be discussed in further detail below with regard to FIGS. 15-17, there may be circumstances where the canister purge valve may be commanded open during refueling, such that a fluid flow in the intake may be monitored, to indicate a presence or absence of evaporative emissions system degradation (e.g. canister internal filter restriction, CPV restriction, etc.).

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. While the example above relies on intake manifold vacuum to conduct the purging operation, in other examples a canister purge pump 299 may be used, as discussed. In such an example, the controller 212 may open canister purge valve 261 with isolation valve 252 closed, and the purge pump may be activated to draw vacuum on the canister in order to draw atmospheric air across the canister to desorb fuel vapors and route the desorbed fuel vapors to engine intake. Similarly, such purging may be continued until stored fuel vapor amount in the canister is determined to be below a threshold. Discussed herein, activating purge pump 299 to draw vacuum on the canister may be understood to be activating purge pump 299 to operate in a forward direction, or via forward pump rotation.

In a vehicle system where the purge pump 299 is included, a purge pump bypass valve 299c, a first bypass conduit 299d and second bypass conduit 299e may be included. First bypass conduit 299d may be fluidically coupled to purge line 228 downstream of purge pump 299, and second bypass conduit 299e may be fluidically coupled to purge line 228 upstream of purge pump 299. When the purge pump bypass valve 299c is open, it may be understood that fluid flow may be routed around purge pump 299, via first bypass conduit 299d and second bypass conduit 299e. Bypassing purge pump 299 may be useful when intake manifold vacuum is solely used for canister purging purposes, for example (e.g. purge pump off). Alternatively, when purge pump 299 is used for canister purging operations, purge pump bypass valve 299c may be commanded closed. Purge pump bypass valve 299c may be a solenoid valve, for example. In some examples, purge pump 299, purge pump actuator 299a, purge pump bypass valve 299c, first bypass conduit 299d, and second bypass conduit 299e may all be encompassed in one purge pump system 299f.

In one example, it may be desirable to conduct a diagnostic as to whether canister purge valve 261 is functioning as desired (e.g. closing fully or sealing as desired), or in other words, is not degraded. Such a diagnostic may include applying intake manifold vacuum on the canister purge valve 261 while the canister purge valve is commanded fully closed. If a pressure change is indicated in the evaporative emissions system or fuel system (e.g. with isolation valve 252 also open), it may be determined that purge valve 261 is degraded as in the absence of degradation no change in pressure would be expected. In a case where purge pump 299 is included, such a diagnostic may further include commanding open purge pump bypass valve 299c.

In another example, conducting a diagnostic as to whether canister purge valve 261 is degraded may include rotating canister purge pump 299 in a reverse direction, where vacuum is directed at the canister purge valve. Such a diagnostic may include commanding closed the canister purge valve 261, commanding closed the purge pump bypass valve 299c, and commanding closed the throttle 262. The purge pump may then be activated in the reverse direction, and if a pressure change in the intake manifold 244 is indicated via, for example, MAP sensor 213, then it may be determined that the canister purge valve 261 is degraded. Such a method may further include commanding/controlling closed intake valves of the engine. If, after a predetermined time period expires while vacuum is directed at the canister purge valve 261 without an indication of a pressure change in the intake, then purge pump bypass valve 299c may be commanded open to relieve the vacuum, and the purge pump 299 may be deactivated. It may be understood that operating the purge pump 299 in a forward-mode or reverse-mode may be via use of an H-bridge circuit to enable forward or reverse rotation of the purge pump 299.

Controller 212 may comprise a portion of a control system 214. It may be understood that control system 214 may be the same control system as control system 190 depicted above at FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, MAF sensor 202, MAP sensor 213, and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, purge pump actuator 299a, and refueling lock 245, purge pump bypass valve 299c, etc. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 8-11, 15-16, and 18-19.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors, or in response to a predetermined duration of time elapsing, per a timer. As examples where sensors may trigger the awake mode, the opening of a vehicle door may trigger a return to an awake mode, or a remote start event may trigger a return to an awake mode.

Evaporative emissions test diagnostic routines may be intermittently performed by controller 212 on fuel system 218 and evaporative emissions control system 251 to confirm the presence or absence of undesired evaporative emissions. As such, evaporative emissions test diagnostic routines may be performed while the engine is off (engine-off test) using engine-off natural vacuum (EONV) generated due to a change in temperature and pressure at the fuel tank following engine shutdown and/or with vacuum supplemented from a vacuum pump (e.g. 295). Alternatively, evaporative emissions test diagnostic routines may be performed while the engine is running by using engine intake manifold vacuum. Evaporative emissions test diagnostics may be performed by an evaporative level check module (ELCM) 295 communicatively coupled to controller 212. ELCM 295 may be coupled in vent 227, between canister 222 and the atmosphere. ELCM 295 may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the evaporative emissions system 251 and fuel system 218. ELCM 295 may further include a reference orifice (e.g. 0.02") and a pressure sensor 296. A reference check may thus be performed whereby a vacuum may be drawn across the reference orifice, where the resulting vacuum level comprises a vacuum level indicative of an absence of undesired evaporative emissions. For example, following the reference check, the fuel system 218 and evaporative emissions system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

Turning to FIGS. 3A-3D, they illustrate a schematic depiction of an example ELCM 295 in various conditions in accordance with the present disclosure. As shown in FIG. 2, ELCM 295 may be located along vent 227 between canister 222 and atmosphere. ELCM 295 includes a changeover valve (COV) 315, a pump 330, and pressure sensor 296. Pump 330 may be a reversible pump, for example, a vane pump. COV 315 may be moveable between a first a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold for undesired evaporative emissions to be tested, for example, 0.02". In either the first or second position, pressure sensor 296 may generate a pressure signal reflecting the pressure within ELCM 295. Operation of pump 330 and solenoid 310 may be controlled via signals received from controller 212.

As will be discussed in further detail below, in addition to being utilized in order to conduct an evaporative emissions test diagnostic procedure, the ELCM pressure sensor and reference orifice may be relied upon to conduct an onboard flow test diagnostic procedure. Briefly, in one example various intake manifold vacuum(s) may be applied across the canister purge valve, at specified duty cycles of the canister purge valve (e.g. a first duty cycle rate and a second duty cycle rate for the CPV). For each manifold vacuum and duty cycle, a rate at which pressure is reduced to a predetermined vacuum (e.g. −20 InH2O) across reference orifice 340, as monitored via the ELCM pressure sensor 296, may be determined. Such a procedure may be conducted when it is known that the canister purge valve is functioning as desired, and thus may constitute baseline measurements. Then, at a later time or in response to an indication that the purge valve is not functioning as desired, that there is some level of canister internal filter clogging, etc., test measurements using the same methodology may be obtained and compared via the controller (e.g. 212) to the baseline measurements. A difference in values between test measurements and baseline measurements may enable determination of a canister purge valve degradation factor, which may then be used to update flow map(s) for the canister purge valve, to enable appropriate duty cycles for the purge valve to be selected via such flow map(s) for particular canister purging events. Compensating for evaporative emissions system degradation (e.g. canister purge valve degradation) may prevent engine hesitation and/or stall in response to purging events, may improve fuel economy, may increase engine lifetime, and may improve driveability and customer satisfaction.

As shown in FIG. 3A, COV 315 is in the first position, and pump 330 is activated in a first direction. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for the presence or absence of undesired evaporative emissions in a subsequent evaporative emissions test diagnostic.

As shown in FIG. 3B, COV 315 is in the second position, and pump 330 is activated in the first direction. This configuration allows pump 330 to draw a vacuum on fuel system 218 and evaporative emissions system 251. In examples where fuel system 218 includes FTIV 252, FTIV 252 may be opened to allow pump 330 to draw a vacuum on fuel tank 220. Air flow through ELCM 295 in this configuration is represented by arrows. In this configuration, as pump 330 pulls a vacuum on evaporative emissions system 251 and fuel system 218, the absence of undesired evaporative emissions in the systems should allow for the vacuum level in ELCM 295 to reach or exceed the previously determined reference vacuum threshold. In the presence of undesired evaporative emissions larger than the reference orifice, the pump may not pull down to the reference check vacuum level.

As shown in FIG. 3C, COV 315 is in the first position, and pump 330 is de-activated. This configuration allows for air to freely flow between atmosphere and the canister. This configuration may be used during a canister purging operation, for example, and may additionally be used during vehicle operation when a purging operation is not being conducted, and when the vehicle is not in operation. In this way, changeover valve 315 may be used in lieu of a canister vent valve.

As shown in FIG. 3D, COV 315 is in the second position, and pump 330 is activated in a second direction, opposite from the first direction. In this configuration, pump 330 may pull air from atmosphere into fuel system 218 and evaporative emission system 251. In a configuration where FTIV 252 is open and CPV 261 is closed, air drawn by pump 330 may promote desorption of fuel vapor from canister 222, and further direct the desorbed fuel vapor into fuel tank 220. In this way, fuel vapor may be purged from the canister to the fuel tank, thereby decreasing the potential for bleed emissions.

Turning to FIG. 3E, an example illustration of ELCM 295 is depicted illustrating how ELCM 295 may be used to conduct an onboard flow test diagnostic for the canister purge valve (e.g. 261). As discussed above, such a test may include establishing air flow across the canister purge valve via, for example, intake manifold vacuum, or via purge pump (e.g. 299) operating in the forward-mode of operation. Such air flow may be communicated to ELCM 295 as illustrated by arrows via duty cycling the canister purge valve. With the COV 315 configured in the second position, a vacuum may be drawn across reference orifice 340, and with pump 296 off, vacuum may build in the evaporative emissions system. In other words, with the COV 315 configured in the second position, the evaporative emissions system may be sealed from communication with atmosphere along the vent line (e.g. 227). A rate at which vacuum develops in the evaporative emissions system as a function of canister purge valve duty cycle and either manifold vacuum level or purge pump speed may be used to determine a canister purge valve degradation factor. As discussed, such a canister purge valve degradation factor may be calculated based on baseline vacuum-build rates obtained when the canister purge valve is known to be free from degradation, as compared to test vacuum-build rates obtained when the canister purge valve is known to be degraded to at least some extent and/or periodically during the course of vehicle operation. Methods for determining such a canister purge valve degradation factor will be discussed in greater detail below with regard to the methods depicted at FIGS. 8-11. The canister purge valve degradation factor may be used to update a flow map (see for example FIG. 6) that is used to control a duty cycle of the canister purge valve for purging the canister to engine intake, such that a commanded flow for a purging event may be accurately achieved, even under conditions where there is degradation of the canister purge valve, or in some cases other evaporative emissions system degradation (e.g. canister internal filter clogging, etc.).

FIG. 4 depicts an example embodiment of a combustion chamber or cylinder that may be included in engine 210 depicted in FIG. 2. Cylinder (i.e. combustion chamber) 230 may include combustion chamber walls 436 with piston 438 positioned therein. Piston 438 may include one or more piston rings 468. The one or more piston rings 468 may function to seal cylinder 230, to assist with piston heat transfer, and to regulate oil consumption, for example. Piston 438 may be coupled to crankshaft 474 so that reciprocating motion of the piston is translated into rotational motion of the crankshaft. Crankshaft 474 may be coupled to at least one drive wheel of the passenger vehicle via a transmission system. Further, a starter motor or electric machine may be coupled to crankshaft 474 via a flywheel to enable a starting operation of engine 210, and/or to rotate the engine in an unfueled mode.

Cylinder 230 can receive intake air via intake air passage 244, which may be one of a plurality of intake air passages coupled to cylinder 230. Intake air passage 244 may communicate with other cylinders of engine 210 in addition to cylinder 230. In some embodiments, one or more of the intake passages may include a boosting device such as a turbocharger or a supercharger. Exhaust passage 248 can receive exhaust gases from cylinder 230 as well as from other cylinders of engine 210.

Each cylinder of engine 210 may include one or more intake valves and one or more exhaust valves. For example, cylinder 230 is shown including at least one intake poppet valve 456 and at least one exhaust poppet valve 450 located at an upper region of cylinder 230. In some embodiments, each cylinder of engine 210, including cylinder 230, may include at least two intake poppet valves and at least two exhaust poppet valves located at an upper region of the cylinder.

Intake valve 456 may be controlled by a controller via actuator 452. Similarly, exhaust valve 450 may be controlled by a controller via actuator 454. During some conditions, the controller may vary the signals provided to actuators 452 and 454 to control the opening and closing of the respective intake and exhaust valves. The position of intake valve 456 and exhaust valve 450 may be determined by respective position sensors 499a and 499b, respectively. The valve actuators may be of the electric valve actuation type or cam actuation type, or a combination thereof. The intake and exhaust valve timing may be controlled concurrently or any of a possibility of variable intake cam timing, variable exhaust cam timing, twin independent variable cam timing (TiVCT), or fixed cam timing may be used. Each cam actuation system may include one or more cams (e.g. actuator 452 and/or 454) and may utilize one or more of cam profile switching (CPS), variable cam timing (VCT), variable valve timing (VVT) and/or variable valve lift (VVL) systems that may be operated by a controller to vary valve operation. For example, cylinder 230 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Shown for illustrative purposes at FIG. 4 is an example of TiVCT. Specifically, an intake camshaft 481 and an exhaust camshaft 482 are illustrated. It may be understood that such a configuration may enable the ability to advance or retard timing of both the intake camshaft 481 and the exhaust camshaft 482 independently. Such an ability may allow for improved power and torque, particularly at lower engine speed (engine RPM), as well as improved fuel economy and reduced emissions. Such an ability may further enable precise control over intake and exhaust valve position, which may include in some examples positioning a particular cylinder with intake and exhaust valves both at least partially open.

In an example, a first oil pressure-controlled actuator 483 under control of the controller may regulate rotation of intake camshaft 481, and a second oil pressure-controlled actuator 484 may regulate rotation of second camshaft 482. In this way the first and second oil pressure-controlled actuators may control the camshafts to advance or retard engine timing based on operating conditions. For example, the controller may utilize crankshaft position sensor 497 and position sensor(s) 499a and 499b to determine engine timing.

While the example depicted herein at FIG. 4 illustrates the actuators (e.g. 483 and 484) of the camshafts as oil pressure-controlled, there may be some examples where instead of oil pressure driven cam phasing, cam torque actuation (CTA) may be employed, which may utilize existing torsional energy in the valve train to rotate the camshaft(s), as is commonly understood in the art.

Cylinder 230 can have a compression ratio, which is the ratio of volumes within the cylinder between when piston 438 is at bottom dead center (BDC) and at top dead center (TDC). It may be understood that, as discussed herein, BDC may comprise a position of piston 438 being in closest proximity to crankshaft 474, whereas TDC may comprise a position of piston 438 being at a position farthest from crankshaft 474. Furthermore, it may be understood that, as discussed herein, TDC may be understood to be 180° from BDC. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 210 may include a spark plug 492 for initiating combustion. An ignition system (not shown) can provide an ignition spark to cylinder 230 via spark plug 492 in response to a spark advance signal from a controller, under select operating modes. However, in some embodiments, spark plug 492 may be omitted, such as where engine 210 may initiate combustion by auto-ignition or by injection of fuel as may be the case with some diesel engines.

In some embodiments, each cylinder of engine 210 may be configured with one or more fuel injectors for providing fuel thereto. As a non-limiting example, cylinder 230 may include two fuel injectors (e.g., a port fuel injector and a direct fuel injector). Fuel injector 266 is shown coupled directly to cylinder 230 for injecting fuel directly therein in proportion to a pulse width of a signal received from a controller via an electronic driver. In this manner, fuel injector 266 provides what is known as direct injection (hereafter referred to as "DI") of fuel into cylinder 230. While FIG. 4 shows injector 266 as a side injector, it may also be located overhead of the piston, such as near the position of spark plug 492. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 266 from a high pressure fuel system including a fuel tank, fuel pumps, a fuel rail, etc. Alternatively, fuel may be delivered by a single stage fuel pump at lower pressure, in which case the timing of the direct fuel injection may be more limited during the compression stroke than if a high pressure fuel system is used.

Fuel may be delivered to the cylinder during a single cycle of the cylinder. Discussed herein, a single engine cycle includes an exhaust stroke, an intake stroke, a compression stroke, and a power stroke. It may be further understood that, when a piston is within a threshold (e.g. within 5°) of TDC between the exhaust stroke and the intake stroke, both the intake valve and the exhaust valve may be at least partially open. Directly injected fuel may be delivered during an intake stroke as well as partly during a previous exhaust stroke. Further, the direct injected fuel may be delivered as a single injection or as multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

A positive crackcase ventilation (PCV) system, may be coupled to the engine intake so that gasses in the crankcase 462 may be vented in a controlled manner from the crankcase. Engine 210 may include a crankcase ventilation tube 458, and a PCV line 460 in order to vent gasses out of the crankcase 462 and into intake manifold. In some examples PCV line 460 may include PCV valve 464, which may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

As described above, FIG. 4 shows only one cylinder of a multi-cylinder engine. As such each cylinder may similarly include its own set of intake/exhaust valves, fuel injector(s), spark plugs, piston rings, etc.

Thus, a system for a hybrid vehicle comprises a fuel vapor storage canister positioned in an evaporative emissions system; a canister purge valve positioned in a purge line fluidically coupling the fuel vapor storage canister to an intake of an engine; a pump positioned in a vent line that couples the fuel vapor storage canister to atmosphere, the pump including a changeover valve configurable to a first position and a second position where the vent line is sealed from atmosphere when the changeover valve is configured in the second position, the pump further including a reference orifice and a pressure sensor configured to measure a pressure difference across the reference orifice; and a vacuum source downstream of the fuel vapor storage canister for applying a predetermined negative pressure on the evaporative emissions system. In such a system, the system may further comprise a controller with computer readable instructions stored on non-transitory memory that when executed, cause the controller to obtain a first baseline rate and a second baseline rate at which pressure in the evaporative emissions system is reduced to a predetermined vacuum level by configuring the changeover valve in the second position to seal the evaporative emissions system and applying the predetermined negative pressure on the evaporative emissions system via the vacuum source while the canister purge valve is duty cycled at a first rate and then a second rate; at a later time, obtain a first test rate and a second test rate at which pressure in the evaporative emissions system is reduced to the predetermined vacuum level by configuring the changeover valve in the second position and applying the negative pressure on the evaporative emissions system via the vacuum source while the canister purge valve is duty cycled at the first rate and then the second rate; 84023386compare the first and second test rates with the first and second baseline rates to obtain a degradation factor that is used to update a flow map stored at the controller that is used to control the canister purge valve for purging fuel vapors from the fuel vapor storage canister; and in response to a request to purge the canister, controller the canister purge valve based on the updated flow map.

Such a system may further comprise a motor configured to rotate the engine unfueled, and \wherein the controller stores further instructions to rotate the engine unfueled to provide the vacuum source for applying the predetermined negative pressure on the evaporative emissions system.

Such a system may further comprise a purge pump positioned between the canister purge valve and the fuel vapor storage canister, and where the controller stores further instructions to operate the purge pump to provide the vacuum source for applying the predetermined negative pressure on the evaporative emissions system.

In another example, a system for a hybrid vehicle comprises a fuel vapor storage canister positioned in an evaporative emissions system of the hybrid vehicle, the fuel vapor storage canister selectively fluidically coupled to a fuel system via a fuel tank isolation valve and selectively fluidically coupled to an intake of an engine via a canister purge valve; a throttle positioned in the intake of the engine; a plurality of intake valves configured to regulate air flow to the engine; and a mass air flow sensor positioned in the intake of the engine. In such a system, the system may further comprise a controller with computer readable instructions stored on non-transitory memory that when executed, cause the controller to: with the engine not combusting air and fuel, in a first condition, operate the evaporative emissions system in a first mode to direct a first test flow that is negative with respect to atmospheric pressure to the intake and indicate evaporative emissions system degradation in response to the first test flow being outside of a first predetermined threshold of a first baseline flow obtained via operating the evaporative emissions system in the first mode, where the first test flow and first baseline flow are indicated via the mass air flow sensor; and in a second condition, operate the evaporative emissions system in a second mode to direct a second test flow that is positive with respect to atmospheric pressure to the intake and indicate evaporative emissions system degradation in response to the second test flow being outside of a second predetermined threshold of a second baseline flow obtained via operating the evaporative emissions system in the second mode, where the second test flow and the second baseline flow are monitored via the mass air flow sensor.

In such a system, the system may further comprise a pump positioned in the evaporative emissions system between the fuel vapor storage canister and atmosphere. In such a system, the controller may store further instructions to, in the first condition, command fully open the canister purge valve, command fully closed the fuel tank isolation valve, command fully open the throttle, control the engine to substantially close the plurality of intake valves, and operate the pump at a predetermined speed to direct the first test flow to the intake, where the predetermined speed comprises a same speed as that utilized for obtaining the first baseline flow.

In such a system, the controller may store further instructions to, in the second condition, in response to a request for refueling of a fuel tank positioned in the fuel system, command fully open the fuel tank isolation valve to enable refueling of the fuel tank, and in response to an absence of premature shutoffs of a refueling dispenser during the refueling, and in response to an indication that a fuel fill rate comprises a predetermined fuel fill rate, direct the second test flow to the intake via commanding fully open the canister purge valve with the fuel tank isolation valve open, commanding fully open the throttle, and controlling the engine to substantially close the plurality of intake valves.

Turning now to FIGS. 5A-5D, they show examples of canister purge valve (CPV) flow obtained in an offboard fashion, for example via a technician at a bench using a flow meter to measure flow rate, or standard liter per minute across a CPV at particular levels of intake vacuum (FIG. 5A, FIG. 5C), or at particular purge pump speeds (FIG. 5B, FIG. 5D). As discussed above, such flow may be used to establish flow maps that are stored at a controller (e.g. 212), such that when a particular flow is requested via onboard strategy for a particular canister purging event, an appropriate duty cycle may be determined.

At FIG. 5A, depicted is a graph 500 of three examples of intake manifold vacuum. A first, greatest manifold vacuum 502, a second, medium manifold vacuum 504, and a third, lowest manifold vacuum 506, are shown. As illustrated, flow across the CPV increases as duty cycle increases and as intake manifold vacuum increases.

FIG. 5B, alternatively, depicts a graph 525 of a similar example, but where three levels of purge pump speeds are utilized rather than intake manifold vacuum. Depicted is a first, greatest pump speed 522, a second, medium pump speed 524, and a third, lowest pump speed 526. Flow across the CPV increases as duty cycle increases and as purge pump speed increases.

While only three examples of manifold vacuum (FIG. 5A), and only three examples of purge pump speed (FIG. 5B) are shown, it may be understood that more than three manifold vacuums may be utilized, and more than three purge pump speeds may be utilized, for the generation of CPV flow map(s) to be stored at the controller.

Turning now to FIG. 5C, graph 550 shows an example of flow obtained across the same CPV as that depicted at FIG. 5A, the flow obtained under similar conditions (e.g. via a technician in an offboard fashion using a flow meter), after the CPV has been used in the vehicle for some time. In other words, FIG. 5C depicts how flow across such a CPV may vary due to degradation of the valve (or in some cases canister internal filter restriction, a source of undesired evaporative emissions, etc.), over time. Line 502a represents flow obtained at the same manifold vacuum as line 502, illustrating less overall flow as a function of duty cycle of the CPV. Similarly, line 504a represents flow obtained at the same manifold vacuum as line 504, and line 506a represents flow obtained at the same manifold vacuum as line 506, where each have less overall flow as a function of duty cycle of the CPV. Thus, in this example, the degradation may include the CPV not fully opening, or sticking upon closure, thus resulting in less overall flow as compared to the baseline measurements (e.g. line 502, 504, 506), for example. Depending on the level to which flow is affected, a determination may be made as to how flow is affected (e.g. to what extent the CPV is degraded), and how to compensation for such degradation. While this example depicts a situation where less flow is observed, it is also possible that greater flow may be seen in such a test, for example if the CPV does not properly close or if the CPV sticks open to some extent while duty cycling the CPV.

Turning now to FIG. 5D, graph 575 shows an example of flow obtained across the same CPV as that depicted at FIG.

5B, the flow obtained under similar conditions (e.g. via a technician in an offboard fashion using a flow meter), after the CPV has been used in the vehicle for some time. Line 522a represents flow obtained at the same purge pump speed as line 522, line 524a represents flow obtained at the same purge pump speed as line 524, and line 526a represents flow obtained at the same purge pump speed as line 526. In this example, each depict greater overall flow as a function of CPV duty cycle. Thus, in this example, the degradation may include the CPV not fully closing or sticking open during the duty cycling of the valve. Similarly as that discussed above at FIG. 5C, depending on a level to which flow is affected, a determination can be made as to how flow is affected (e.g. to what extent the CPV is degraded, for example), and in some examples, may enable a determination as to how to compensate for such degradation. For example, a flow map may be updated to account for the type of degradation observed experimentally via a technician, provided the valve is still used in the vehicle after the conducting of such a diagnostic.

Turning to FIG. 6, an example of a CPV flow map 600 as discussed herein, is shown. Briefly, flow map 600 is a function of intake manifold vacuum (calculated as manifold vacuum minus fuel tank pressure, corrected for barometric pressure) versus flow (standard liter per minute). As discussed above, such a flow map may be generated via a technician at a bench, prior to the CPV being utilized in a vehicle. When the vehicle is in operation, such a flow map may be utilized to control a duty cycle of the CPV depending on a flow rate requested via the controller. For example (see dashed oval), when a flow of 0.03 lb/minute is requested or commanded via the controller, and differential pressure across the CPV is 0.590 atm, flow map 600 may be queried where it may be determined that CPV duty cycle may be commanded to 14.8% in order to achieve the commanded flow.

While FIG. 6 depicts an example of a CPV flow map consisting of commanded flow as a function of intake manifold vacuum calculated as discussed above, to arrive at a duty cycle to achieve the commanded flow, in another example such a flow map may be a function of purge pump speed, or pressure difference across a CPV as a function of purge pump speed. In such an example, such a CPV flow map may similarly be used to determine a duty cycle for a commanded flow as a function of purge pump speed and/or pressure difference across the CPV as a function of purge pump speed.

As discussed, such flow maps may be useful for controlling/regulating an amount of vapors introduced into an engine while the engine is operating to combust air and fuel during a purge event. However, there may be circumstances where the purge valve becomes degraded to some extent (or in some cases a canister internal filter becomes restricted, etc.), and thus such flow maps may no longer be representative. In such an example, commanding a particular duty cycle to achieve a requested or commanded flow may, in fact, result in more or less actual flow. Such discrepancy may result in driveability issues, engine hesitation or stall, etc. Thus, it may be desirable to be able to periodically update such flow maps as that depicted at FIG. 6, via an onboard method that does not involve having the vehicle serviced via a technician.

Methods discussed herein and with regard to FIGS. 8-11 may enable onboard determination of CPV flow, such that flow map(s) such as that depicted at FIG. 6 may be updated to provide a more accurate flow map reflective of a current state of the CPV being utilized in a particular vehicle. While such methods will be discussed in detail below, FIGS. 7A-7B graphically depict such methods and will be briefly described prior to turning to FIGS. 8-11.

FIG. 7A graphically depicts an example methodology 700 for determining CPV flow in an onboard fashion, for example while the vehicle is in operation. The method includes, at different levels of intake manifold vacuum, establishing sets of baseline rates at which a predetermined vacuum level is established in a vehicle evaporative emissions system, as a function of duty cycle of the CPV, and then at a later time, establishing test rates at different level of intake manifold vacuum at which the same predetermined vacuum level is established in the evaporative emissions system as a function of CPV duty cycle. Only two duty cycles may be utilized for both the baseline and test diagnostics in some examples, however in other examples more than two duty cycles may be used. In the case of two or more duty cycles used, a straight line may be drawn between a rate at which the particular vacuum is reached for one duty cycle, and the rate at which the particular vacuum is reached for other duty cycles. As discussed, an ELCM (e.g. 295) may be used including a reference orifice (e.g. 340) and pressure sensor (e.g. 296), and a changeover valve (e.g. 315), where the changeover valve is configured in a second position for conducting the baseline and test diagnostics to seal the evaporative emissions system from atmosphere.

Accordingly, line 702 represents such a line established between a rate at which the predetermined vacuum is reached for a first duty cycle, and a second duty cycle, for a first vacuum level. Lines 704, 706, 708, and 710 similarly represent such lines obtained for second, third, fourth, and fifth vacuum levels, respectively. In this example it may be understood that line 702 represents the lowest level of intake manifold vacuum, while line 710 represents the greatest level of intake manifold vacuum. It may be understood that lines 702, 704, 706, 708, and 710 are obtained when the CPV is known to not be degraded to any significant extent, thus constituting the baseline rates at which the predetermined vacuum level is reached.

At a later time, when the CPV (or in some cases other components of the evaporative emissions system such as the canister internal filter being clogged) is known to be degraded or after a predetermined time elapses where a request to conduct such a test is commanded via the controller, test measurements represented by lines 702a, 704a, 706a, 708a, and 710a may be obtained. It may be understood that in this example, line 702a corresponds to the same (e.g. within a predetermined threshold such as within 1% difference or less) intake manifold vacuum level as that for which line 702 was established, line 704a corresponds to the vacuum for which line 704 was established, line 706a corresponds to the vacuum for which line 706 was established, line 708a corresponds to the vacuum for which line 708 was established, and line 710a corresponds to the vacuum for which line 710 was established. In this example, for all cases the rate for which vacuum in the evaporative emissions system reached the predetermined vacuum level increased (in other words, took less time for the predetermined vacuum level to be reached). Thus, in this example, it may be understood that the CPV may not be closing fully or may be staying open longer than desired to enable a more rapid rate at which pressure in the evaporative emissions system is reduced to the predetermined vacuum level for the various levels of intake manifold vacuum.

With such a pattern of data established, a CPV degradation factor may be determined via the controller for each level of manifold vacuum. Such degradation factors may comprise a difference between baseline data (e.g. 702) and test data (e.g. 704). Accordingly, various determination of degradation factors 703, 705, 707, 709, and 711 are depicted. In some examples, such degradation factors may be averaged or otherwise processed via the controller to obtain a high-confidence degradation factor. Such degradation factor (s) may then be used to update the CPV flow map stored at the controller, such as the CPV flow map depicted at FIG. 6. Updating the CPV flow map may include accounting for the degradation such that, when a particular flow value is commanded via the controller for a purge event, the CPV is controlled such that that an actual flow equal to the particular commanded flow is achieved, whereas if the flow map had not been updated, the actual flow value may not correspond to the particular commanded flow value.

FIG. 7B depicts a similar example graph 750 as that depicted at FIG. 7A, however rather than intake manifold vacuum, purge pump speed is the variable. More specifically, baseline data (lines 752, 754, 756, 758, 760) may be obtained for at least two different duty cycles of the CPV for various speeds of the purge pump, and then test data (lines 752a, 754a, 756a, 758a, 760a) may be obtained at the same duty cycles and corresponding pump speeds. Again, baseline and test data comprise a rate at which a predetermined threshold vacuum is reached in the evaporative emission system as monitored via the ELCM pressure sensor, at particular duty cycles, for particular pump speeds. For clarity pump speed for obtaining line 752 comprises the same pump speed as that for obtaining line 752a, line 754 comprises the same pump speed as that for obtaining line 754a, line 756 comprises the same pump speed as that for obtaining line 756a, line 758 comprises the same pump speed as that for obtaining line 758a, and line 760 comprises the same pump speed as that for obtaining line 760a. Furthermore, it may be understood that in this example, line 752 (and 752a) was obtained with the lowest pump speed while line 760 (and 760a) was obtained with the greatest pump speed.

In the example depicted at FIG. 7B, for all pump speeds tested, the rate at which the predetermined threshold vacuum was reached is decreased for the test measurements (752a, 754a, 756a, 758a, 760a) as compared to the baseline measurements (752, 754, 756, 758, 760). In other words, for each pump speed, it is taking longer for the pressure in the evaporative emissions system to be reduced to the predetermined threshold vacuum, for each duty cycle tested for the test data as compared to the baseline data. Thus, in this example, it may be understood that the CPV may be sticking closed, or not fully opening, thus resulting in a decreased rate at which pressure in the evaporative emissions system is reduced to the predetermined vacuum level for the various pump speeds tested.

Similar to that discussed above for FIG. 7A, with such a pattern of data established, a CPV degradation factor may be determined via the controller for each purge pump speed. Such degradation factors may comprise a difference between baseline data (e.g. 752) and test data (e.g. 752a). Accordingly, various determination of degradation factors 753, 755, 757, 759, and 761 are depicted. Averaging or otherwise processing the degradation factor data may be conducted via the controller to obtain a high-confidence degradation factor. Such degradation factor(s) may then be used to update the CPV flow map stored at the controller, such a flow map corresponding to a flow map that relies on the purge pump for purging operations.

In a case where such baseline and test data are obtained using intake manifold vacuum, either the engine may be combusting air and fuel, or the engine may be rotated unfueled via, for example, a motor (e.g. 120), to generate the manifold vacuum. If the engine is rotated unfueled to generate the intake manifold vacuum for the baseline and test data, then a pre-condition may include a canister that is clean (e.g. loaded to less than a threshold amount, for example less than 5%, less than 1%, etc.), so as not to introduce fuel vapors to the engine.

Furthermore, in a case where baseline and test data are obtained using intake manifold vacuum, if a purge pump is included in the purge line, then it may be understood that a purge pump bypass valve (e.g. 299c) may be commanded open (in addition to duty cycling the CPV) to enable communication of the intake manifold vacuum with the ELCM.

In a case where baseline and test data are obtained using the purge pump to establish air flow across the CPV, an intake throttle (e.g. 262) may be commanded fully open, or may be controlled to a predetermined position.

Furthermore, while various methods (e.g. engine on and combusting, unfueled engine rotation, use of purge pump) are discussed herein for how to establish rates (baseline and test rates) at which vacuum in the evaporative emissions system is reduced to the predetermined threshold vacuum level it may be understood that degradation factors used to update CPV flow maps may be confined to the flow maps corresponding to the way in which the degradation factors were determined. For example, degradation factors determined via methodology comprising use of the purge pump (see for example FIG. 7B) may be used to update a CPV flow map that corresponds to use of the purge pump for canister purging. Alternatively, degradation factors determined via methodology comprising use of intake manifold vacuum (see for example FIG. 7A) may be used to update a CPV flow map that corresponds to use of intake manifold vacuum for canister purging.

Still further, it may be understood that the general methodology depicted at FIGS. 7A-7B relies on the duty cycle itself not influencing the degradation the methodology is attempting to address. For example, if the valve is sticking at low duty cycle rates, but not at higher duty cycle rates, then the lines drawn between duty cycles for the above-mentioned conditions may not be linear and in such examples it may be difficult to ascertain degradation factors based on the above-described methodology. Thus, enablement for the methodology to obtain degradation factors may include an indication that both the baseline measurements and test measurements are linear, with a similar slope for both the baseline measurements and test measurements as a function of duty cycle.

Turning now to FIG. 8, a high-level flowchart for an example method 800 for obtaining measurements of CPV flow in an onboard fashion without having to service a vehicle, is shown. Such a method may be used to obtain one or more high-confidence degradation factor(s) which may be utilized to update one or more CPV flow map(s) stored at a controller of the vehicle. In this way, in response to an aged or degraded CPV (or in some cases other evaporative emissions system degradation such as a canister internal filter that may be clogged or plugged to at least some extent) where a particular CPV flow map is no longer representative of the flow characteristics through the CPV, the flow map may be updated such that a commanded flow may be accurately produced via a duty cycle obtained via the updated flow map for purging the canister.

Method 800 will be described with reference to the systems described herein and shown in FIGS. 1-4, though it will be appreciated that similar methods may be applied to other systems without departing from the scope of this disclosure. Instructions for carrying out method 800 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-4. The controller may employ actuators such as motor (e.g. 120), purge pump actuator (e.g. 299a) for controlling the purge pump (e.g. 299), throttle (e.g. 262), CPV (e.g. 261), ELCM COV (e.g. 315), etc., according to the methods described herein.

Method 800 begins at 805 and may include obtaining onboard baseline CPV flow data responsive to conditions being met for doing so. Conditions being met may include a CPV that is new, or in use for less than a predetermined threshold amount of time (e.g. 1 day, 2 days, etc.). Conditions being met may further include an indication of no degradation in the vehicle evaporative emissions system, no indication of CPV degradation, no indication of ELCM degradation, no indication of FTIV degradation, no indication of purge pump bypass valve degradation (where included), no indication of canister internal filter restriction/clogging, an air filter that is not restricted, etc.

As discussed above with regard to FIGS. 7A-7B obtaining baseline data may include establishing rates at which a predetermined threshold vacuum level (e.g. −20 InH2O) is reached across a reference orifice (e.g. 340) in an evaporative emissions system as monitored via an ELCM pressure sensor (e.g. 296), at different levels of either intake manifold vacuum or purge pump speed, for at least two different duty cycles of the CPV for each level of manifold vacuum or each purge pump speed. With such rates established, a straight line may be drawn between the rates obtained for the different duty cycles for each particular intake manifold vacuum level, or between the rates obtained for the different duty cycles for each particular purge pump speed. Proceeding to 810, method 800 may include storing such data at the controller of the vehicle.

With the baseline data obtained, method 800 may proceed to 815. At 815, method 800 may include obtaining onboard test CPV flow data responsive to conditions being met for doing so. Conditions being met may include an indication of CPV degradation (and/or in some examples other evaporative emissions system degradation such as a clogged canister internal filter), an indication that a predetermined time period has elapsed since the baseline measurements were obtained, and/or a predetermined time since other test measurements were obtained. Conditions being met at 815 may further include no indication of ELCM degradation, no indication of FTIV degradation, etc. In some examples, conditions being met at 815 may include an indication of no sources of undesired evaporative emissions stemming from the evaporative emissions system, however in other examples conditions being met at 815 may include an indication of a source of undesired evaporative emissions stemming from the evaporative emissions system, without departing from the scope of this disclosure. At 815, the test measurements may be obtained in the same fashion as the baseline measurements, discussed above with regard to FIGS. 7A-7B, the data from which may be stored at the controller at step 820.

With such baseline and test measurements obtained, method 800 may proceed to 825. At 825, method 800 may include determining a CPV degradation factor based on a difference between the baseline measurements and test measurements for each manifold vacuum, or purge pump speed. In some examples, the CPV degradation factor obtained for each manifold vacuum condition may be averaged or otherwise processed to obtain a high-confidence CPV degradation factor. Similarly, in some examples, the CPV degradation factor obtained for each purge pump speed condition may be averaged or otherwise processed to obtain a high-confidence CPV degradation factor. With such CPV degradation factors obtained, method 800 may proceed to 830. At 830, method 800 may include adjusting or updating corresponding CPV flow maps as a function of the corresponding CPV degradation factor. For example, one CPV flow map may correspond to a flow map if engine intake manifold vacuum is used for purging, while another CPV flow map may correspond to a flow map if the purge pump is used for purging. Thus, degradation factors obtained via the use of intake manifold vacuum may be used to update a CPV flow map that relies upon intake manifold vacuum for purging operations, while degradation factors obtained via the use of the purge pump may be used to update a CPV flow map that relies upon the purge pump for purging operations. Such updated flow maps may be stored at the controller of the vehicle.

Proceeding to 835, method 800 may include controlling future purging events according to the updated CPV flow maps to account for CPV degradation. In other words, if a purging event is requested that relies on intake manifold vacuum, then the updated CPV flow map that is based on intake manifold vacuum for determining CPV duty cycle, may be relied upon for conducting the canister purging operation. Alternatively, if a purging event is requested that relies on the purge pump, then the updated CPV flow map that is based on the use of the purge pump for determining CPV duty cycle may be relied upon for conducting the canister purging operation. In this way, the CPV flow maps may be continually updated to account for CPV degradation over time. By accounting for varying levels of CPV degradation, and updating CPV flow maps accordingly, a requested purge flow may be accurately established via a duty cycle of the CPV as determined according to the updated CPV flow maps.

As discussed above, there may be several ways in which to obtain the onboard baseline and test CPV flow data. Accordingly, such methodologies will be discussed in more detail below with regard to FIGS. 9-11.

Turning to FIG. 9, a high-level flowchart for an example method 900 for obtaining baseline or test CPV flow data using intake manifold vacuum under conditions where an engine of the vehicle is combusting air and fuel, is shown. More specifically, as discussed with regard to method 800, to acquire degradation factors based on onboard CPV flow mapping, both baseline and test measurements may be acquired. It may be understood that the same methodology for obtaining the baseline measurements may be used for obtaining test measurements. Accordingly, only one method is illustrated but it may be understood that method 900 may be used to obtain either baseline or test measurements.

Method 900 will be described with reference to the systems described herein and shown in FIGS. 1-4, though it will be appreciated that similar methods may be applied to other systems without departing from the scope of this disclosure. Instructions for carrying out method 900 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-4. The controller may employ actuators such as motor (e.g. 120), purge pump bypass valve (e.g. 299c), throttle (e.g. 262), CPV (e.g. 261), ELCM COV (e.g. 315), etc., according to the methods described herein.

Method 900 begins at 905 and may include indicating whether the engine is combusting air and fuel. If not, method 900 may proceed to method 1000 depicted at FIG. 10. If, at 905, it is indicated that the engine is combusting air and fuel, method 900 may proceed to 915. At 915, method 900 may include indicating whether conditions are met for obtaining baseline or test CPV flow data. For example, as discussed, conditions being met for specifically obtaining baseline CPV flow data may include an indication that the CPV is within a threshold amount of time from being installed in the vehicle (e.g. less than 1 day, less than 2 days, etc.), or in other words, no indication of CPV degradation. Conditions being met for specifically obtaining baseline CPV flow data may additionally include an indication of an absence of undesired evaporative emissions or other degradation in the evaporative emissions system. Conditions being met for specifically obtaining test CPV flow data may include an indication that a threshold duration of time has elapsed since baseline measurements were obtained, or a threshold duration of time since prior test measurements were obtained, an indication of CPV degradation to some extent, etc. Conditions being met for obtaining test CPV flow data may include an indication of no sources of undesired evaporative emissions in the vehicle evaporative emissions system (or in some examples an indication of a source of undesired evaporative emissions), no indication of ELCM degradation, no indication of FTIV degradation, etc.

Furthermore, at 915, conditions being met may include an indication of a stable intake manifold vacuum. For example, such instances may occur while the vehicle is in operation and changes in torque are not being requested by the vehicle operator. In some examples where the engine is equipped with variable cam timing capabilities (e.g. Ti-VCT), then actuators (e.g. 483, 484) may be controlled such that engine intake manifold vacuum is maintained while the baseline or test measurements are being obtained as per method 900. Additionally or alternatively, for a hybrid vehicle such as that depicted at FIG. 1, a motor (e.g. 120) may be used to maintain requested torque while controlling the engine to ensure constant intake manifold vacuum during the acquiring of baseline or test measurements. Still further, the throttle (e.g. 262) may be controlled during the acquiring of the baseline or test measurements to maintain constant intake manifold vacuum. In other words, when using intake manifold vacuum while the engine is combusting air and fuel to obtain the baseline or test CPV flow measurements, a constant (e.g. variation less than a predetermined threshold, such as less than 1% variation or less than 5% variation) intake manifold vacuum may be maintained. An indication of vacuum level in the intake manifold may be provided via a MAP sensor (e.g. 213), and may be referenced to pressure in the evaporative emissions system via the ELCM pressure sensor (e.g. 296), and may in some examples further be compensated as a function of barometric pressure.

If, at 915, conditions are not met for obtaining baseline or test data, method 900 may proceed to 920. At 920, method 900 may include maintaining current vehicle operating conditions. In other words, engine operation may be maintained in its current state of operation and method 900 may end.

Returning to 915, responsive to conditions being met for obtaining the baseline or test data, method 900 may proceed to 925. At 925, method 900 may include configuring the ELCM COV (e.g. 315) in the second position (refer to FIG. 3E), to seal the evaporative emissions system from atmosphere. Furthermore, while not explicitly illustrated, for vehicles equipped with a purge pump (e.g. 299) and purge pump bypass valve (e.g. 299c), the purge pump bypass valve may be commanded fully open. Still further, the FTIV (e.g. 252) may be commanded or maintained closed.

Proceeding to 930, method 900 may include duty cycling the CPV (e.g. 261) at a first rate (e.g. 90%). With the CPV being duty cycled at the first rate, method 900 may proceed to 935 and may include measuring pressure decrease, or vacuum-build, in the evaporative emissions system via the ELCM pressure sensor. Proceeding to 940, method 900 may include recording a rate at which pressure in the evaporative emissions system is reduced to a predetermined threshold vacuum (e.g. −20 InH2O). The results may be stored at the controller at step 945.

With the predetermined vacuum-build reached and the rate at which the predetermine vacuum-build was reached stored at the controller, method 900 may proceed to 950. At 950, method 900 may include commanding fully closed the CPV, and commanding the ELCM COV in the first position (refer to FIG. 3C). In this way, pressure in the evaporative emissions system may be relieved.

Proceeding to 955, method 900 may include indicating whether conditions are still met for obtaining baseline or test data. For example, if baseline data was being acquired, then conditions being met at 955 relate to conditions being met for obtaining further baseline data. If test data was being acquired, then conditions being met at 955 relate to conditions being met for obtaining further test data. Conditions being met at 955 may include an indication that the intake manifold vacuum remains unchanged from the baseline or test data acquired prior to step 955.

If, at 955, conditions are no longer met for obtaining the baseline or test data, method 900 may proceed to 960. At 960, method 900 may include aborting the procedure, and may further include updating a schedule for conducting onboard CPV flow test diagnostic(s) to reflect the aborted test procedure. For example, another CPV onboard flow test may be scheduled for the next possible situation where conditions are met for conducting such a test.

Returning to 955, if conditions are indicated to be met for obtaining further baseline or test CPV flow data, method 900 may proceed to 965. At 965, method 900 may include repeating the steps 925 through 950, but instead of cycling the CPV at the first rate, the CPV may be cycled at a second rate (e.g. 10% duty cycle).

As discussed with regard to method 900, the results of the baseline or test CPV flow measurements may be stored at the controller. Responsive to both baseline and test measurements having been obtained, method 800 at step 825 may be used to determine the CPV degradation factor, in order to adjust CPV flow maps such that future purging events may be more accurately controlled to reflect requested purge flow rates, as discussed in detail above.

Turning now to FIG. 10, if at FIG. 9 the engine was not indicated to be combusting air and fuel, method 900 may proceed to method 1000 where at step 1005 it may be indicated as to whether conditions are met for conducting a diagnostic for obtaining baseline or test CPV flow data under conditions where the engine is not combusting air and fuel. Accordingly, at 1005, method 1000 may include indicating whether conditions are met for obtaining such baseline or test CPV flow measurements. Conditions being met may include an indication of a fuel vapor canister load less than a threshold load. The threshold load may include a canister load of less than 5% capacity, less than 1% capacity, etc. In other words, conditions being met may include an indication that the canister is clean, so as not to introduce fuel vapors to the engine while the engine is not combusting air and fuel. Conditions being met may include a start/stop event, for example where the engine is stopped from combusting air and fuel. In some examples, conditions being met may include an indication that the vehicle is not in motion, for example. In other words, conditions being met may include an indication that the vehicle is not being propelled by power from the onboard energy storage device. However, in other examples, the vehicle may be in motion, being propelled via energy from the onboard energy storage device, without departing from the scope of this disclosure. In some examples, conditions being met may include an indication of a key-off event where the controller is kept in an awake mode to conduct such a diagnostic to obtain baseline or test CPV flow measurements. In still other examples, the controller may be scheduled to awake at a predetermined time after a key-off event, to conduct such a diagnostic.

Still further, similar to that discussed above at FIG. 9, conditions being met for specifically obtaining baseline CPV flow data may include an indication that the CPV is within a threshold amount of time from being installed in the vehicle (e.g. less than 1 day, less than 2 days, etc.), or in other words, no indication of CPV degradation, no indication of evaporative emissions system degradation, etc. Conditions being met for specifically obtaining test CPV flow data may include an indication that a threshold duration of time has elapsed since baseline measurements were obtained, or a threshold duration of time since prior test measurements were obtained, an indication of CPV degradation to some extent, etc. Conditions being met for obtaining test measurements may include an indication of no sources of undesired evaporative emissions in the vehicle evaporative emissions system (however in other examples conditions being met may include an indication of a source of undesired evaporative emissions stemming from the evaporative emissions system), no indication of ELCM degradation, no indication of FTIV degradation, etc.

If, at 1005, conditions are not indicated to be met for conducting the diagnostic to obtain the baseline or test CPV flow measurements, method 1000 may proceed to 1010, where current vehicle operating parameters may be maintained. Method 1000 may then end.

Alternatively, if conditions are indicated to be met at 1005, method 1000 may proceed to 1015. At 1015, it may be determined as to whether conditions are met for conducting the diagnostic via the purge pump (e.g. 299). For example, if a purge pump is not included in the vehicle system, then conditions may not be met for conducting the diagnostic via the purge pump. In another example, if the purge pump is indicated to be degraded, then conditions may not be met for conducting the diagnostic via the purge pump. In still another example, if CPV flow data per the purge pump is not requested at such a time, for example if sufficient data has already been acquired to enable a CPV degradation factor specific to the purge pump for updating a CPV flow map that is based on use of the purge pump for purging events, then conditions may not be met at 1015.

Responsive to conditions not being met at 1015, method 1000 may proceed to 1020, where the diagnostic for obtaining CPV flow data may be conducted via the method depicted at FIG. 11. However, responsive to conditions being met at 1015, method 1000 may proceed to 1025. At 1025, the purge pump may be activated to a predetermined speed. The predetermined speed may comprise a speed for which CPV flow data is requested, and the predetermined speed may be different for different diagnostics that make use of the purge pump. For example, FIG. 7B illustrates different purge pump speeds utilized for obtaining CPV flow degradation factors, thus the predetermined speed may vary depending on which data (at which speed) has already been obtained, and which data still is requested to be obtained.

Activating the purge pump at 1025 may include activating the purge pump to draw vacuum on the fuel vapor storage canister. In other words, the purge pump may be activated in the forward direction. To avoid pressure build between the CPV and the purge pump, the purge pump bypass valve (e.g. 299c) may be commanded open initially while the pump achieves the desired speed. Proceeding to step 1030, the ELCM COV may be commanded to the second position (refer to FIG. 3E), and at step 1035 the CPV may be commanded to be duty cycled at the first rate (e.g. 90% duty cycle). It may be understood that steps 1030 and 1035 may be performed near simultaneously, or in other words, within a threshold of each other (e.g. less than 1 second). Furthermore, while not explicitly illustrated, if the purge pump bypass valve is open, the purge pump bypass valve may be commanded closed at the same time as steps 1030 and 1035 are carried out.

Proceeding to 1040, as discussed at method 900, via the ELCM pressure sensor a rate at which vacuum in the evaporative emissions system builds to the predetermined vacuum (e.g. −20 InH2O) may be determined and stored at the controller. Responsive to the rate being determined, method 1000 may proceed to 1045, where the purge pump may be deactivated, and vacuum in the evaporative emissions system may be relieved via commanding the ELCM COV to the first position (refer to FIG. 3C). Furthermore, at 1045, the CPV may be commanded closed.

Proceeding to 1050, method 1000 may include indicating whether conditions are still met for obtaining the baseline or test data. Conditions being met at 1050 may include an indication that vehicle operating conditions have not changed which may adversely impact the baseline or test measurements. For example, if the test was being conducted during a S/S event and the engine has been activated in response to an acceleration request via a vehicle operator, then conditions may not be met at 1050. In another example, if the baseline or test measurements were being obtained during a key-off condition and the vehicle has become occupied and started, either in an engine-on or in some examples, engine-off manner, conditions may not be continued to be met at 1050.

If, at 1050, conditions are not still met for obtaining baseline or test data, then method 1000 may proceed to 1055. At 1055, method 1000 may include aborting the procedure, and updating a diagnostic test schedule for conducting onboard CPV flow test diagnostic(s) to reflect the aborted test procedure. For example, another CPV onboard flow test may be scheduled for the next possible situation where conditions are met for conducting such a test.

Returning to 1050, if conditions are indicated to be met for obtaining further baseline or test CPV flow data, method 1000 may proceed to 1060. At 1060, method 1000 may include repeating steps 1025-1045, but instead of duty cycling the CPV at the first rate, the CPV may be cycled at a second rate (e.g. 10% duty cycle).

As discussed with regard to method 1000, the results of the baseline or test CPV flow measurements obtained may be stored at the controller. Responsive to both baseline and test measurements having been obtained, method 800 at step

825 may be used to determine the CPV degradation factor, in order to adjust CPV flow maps such that future purging events may be more accurately controlled to reflect requested purge flow rates.

Turning now to FIG. 11, if at FIG. 10 conditions were not indicated to be met for obtaining the CPV flow measurements via use of the purge pump, method 1000 may proceed to method 1100 where at step 1105 it may be indicated as to whether conditions are met for conducting the diagnostic via unfueled engine rotation. Such conditions may be similar to those for conducting the diagnostic via the purge pump. For example, conditions being met may include an indication of a fuel vapor canister load less than a threshold load (e.g. less than 5%, or less than 1% capacity). Conditions being met may in some examples include a start/stop event where the engine is stopped from combusting air and fuel, an indication that the vehicle is not in motion (e.g. not being propelled solely via power from the onboard energy storage device), a key-off event where the controller is kept awake to conduct the diagnostic, a key-off event where the controller is awakened at a predetermined time since a key-off event to conduct the diagnostic, etc. However, in some examples, the diagnostic may be conducted with the vehicle in motion, being propelled solely by energy from the energy storage device, without departing from the scope of the present disclosure.

Still further, similar to that discussed above at FIG. 11, conditions being met for specifically obtaining baseline CPV flow data may include an indication that the CPV is within a threshold amount of time from being installed in the vehicle (e.g. less than 1 day, less than 2 days, etc.), or in other words, no indication of CPV degradation. Conditions being met for specifically obtaining baseline CPV flow data may include an indication of an absence of evaporative emissions system degradation. Conditions being met for specifically obtaining test CPV flow data may include an indication that a threshold duration of time has elapsed since baseline measurements were obtained, or a threshold duration of time since prior test measurements were obtained, an indication of CPV degradation to some extent, etc. Conditions being met for obtaining test CPV flow data may include an indication of no sources of undesired evaporative emissions in the vehicle evaporative emissions system (however in other examples conditions being met may include an indication of a source of undesired evaporative emissions in the evaporative emissions system), no indication of ELCM degradation, no indication of FTIV degradation, etc.

If, at 1105, conditions are not indicated to be met for conducting the diagnostic via unfueled engine rotation, method 1100 may proceed to 1110, where current vehicle operating parameters may be maintained. Method 1100 may then end.

Alternatively, if at 1105, conditions are indicated to be met, method 1100 may proceed to 1115. At 1115, method 1100 may include commanding an intake throttle to a predetermined position. Such a predetermined position may comprise a position that the throttle is commanded to any time that unfueled engine rotation is used to obtain baseline or test CPV flow data. In some examples such a predetermine position may comprise the throttle being commanded to 50% closed, 60% closed, 75% closed, 85% closed, 95% closed, or 100% closed (e.g. fully closed). By controlling throttle position, it may be ensured that intake manifold vacuum as a result of unfueled engine rotation may be communicated effectively to the evaporative emissions system when the CPV is duty cycled to obtain the baseline or test measurements.

Proceeding to 1120, method 1000 may include rotating the engine unfueled in a forward direction, where the forward direction comprises a direction that the engine rotates when combusting air and fuel. In other words, the rotation of the engine in the forward direction may result in development of a positive pressure with respect to atmospheric pressure in the exhaust system and a negative pressure with respect to atmospheric pressure in the intake manifold. Rotating the engine unfueled may comprise commanding a motor (e.g. 120) to rotate the engine, without providing spark and without providing fuel injection.

At 1120, the engine may be rotated at a particular speed (RPM) and intake manifold vacuum monitored, for example via a MAP sensor (e.g. 213) with respect to a pressure in the evaporative emissions system. Engine speed may be controlled such that intake manifold vacuum is controlled to a predetermined intake manifold vacuum, such a vacuum specific to diagnostic being conducted. For example, returning to FIG. 7A, various levels of intake manifold are depicted, and thus, engine speed may be controlled such that the desired intake manifold vacuum is achieved. As discussed, such an intake manifold vacuum may be referenced to pressure in the evaporative emissions system coupled to atmosphere, and may further be referenced to barometric pressure.

With the predetermined intake manifold vacuum established, method 1100 may proceed to 1125. At 1125, method 1100 may include configuring the ELCM COV (e.g. 315) in the second position (refer to FIG. 3E). Proceeding to 1130, method 1100 may include duty cycling the CPV (e.g. 261) at a first rate (e.g. 90% duty cycle). At 1135, method 1100 may include recording the rate at which vacuum builds in the evaporative emissions system to a predetermined vacuum level (e.g. −20 InH2O), as monitored by the ELCM pressure sensor (e.g. 296). When the predetermined vacuum level is reached, the rate may be stored at the controller.

Proceeding to 1140, method 1100 may include commanding closed the CPV, and commanding the ELCM COV to the first position (refer to FIG. 3C), to relieve the vacuum in the evaporative emissions system. In some examples the engine may be maintained on at 1140, and method 1100 may proceed to step 1145. However, in other examples the engine may be deactivated at step 1140.

At 1145, method 1100 may include indicating whether conditions are still met for obtaining baseline or test CPV flow data. Similar to that discussed above, if the previous steps of method 1100 were being conducted to obtain baseline CPV flow data, then conditions being met at 1145 relate to obtaining further baseline data. Alternatively, if the previous steps were being conducted to obtain test CPV flow data, then conditions being met at 1145 relate to obtaining further test data.

Conditions being met at 1145 may include no indication that vehicle operating conditions have changed which would adversely impact the diagnostic being conducted. For example, if the engine has been activated to combust air and fuel, if the vehicle was stopped and has been initiated to be propelled, even via solely battery power, conditions may not be indicated to be met.

In the case where conditions are no longer indicated to be met at 1145, method 1100 may proceed to 1150. At 1150, method 1100 may include aborting the procedure, and updating a diagnostic test schedule for conducting onboard CPV flow test diagnostic(s) to reflect the aborted test procedure. For example, another CPV onboard flow test may be scheduled for the next possible situation where conditions are met for conducting such a test.

Returning to 1145, if conditions are indicated to be met for obtaining further baseline or test CPV flow data, method 1100 may proceed to 1155. At 1155, method 1100 may include repeating steps 1115-1140, but instead of cycling the CPV at the first rate, the CPV may be cycled at a second rate (e.g. 10% duty cycle).

Similar to that discussed above, the results of such baseline or test measurements obtained via method 1100 may be stored at the controller. Responsive to both baseline and test measurements having been obtained, method 800 at step 825 may be used to determine the CPV degradation factor, in order to adjust CPV flow maps such that future purging events may be more accurately controlled to reflect requested purge flow rates.

Turning now to FIG. 12, an example timeline 1200 for conducting an engine on diagnostic to obtain test CPV flow measurements as per method 900 depicted at FIG. 9, is shown. More specifically, regarding example timeline 1200 it may be understood that baseline measurements have already been obtained and stored at the controller, at a plurality of intake manifold vacuum levels, and thus test measurements for one particular intake manifold vacuum level are being obtained according to example timeline 1200.

Timeline 1200 includes plot 1205, indicating a status of the engine (on or off), over time. The engine being on refers to the engine rotating, whereas the engine being off refers to the engine not rotating. Timeline 1200 further includes plot 1210, indicating whether fuel injection to the engine is being provided (on) or not (off), over time. Timeline 1200 further includes plot 1215, indicating a status (open or closed) of a canister purge valve (CPV), over time. It may be understood that a closed CPV refers to a fully closed CPV, and an open CPV refers to a fully open CPV. Timeline 1200 further includes plot 1220, indicating a level of vacuum or negative pressure with respect to atmospheric pressure (atm.) in an intake manifold of the engine, over time. Timeline 1200 further includes plot 1225, indicating pressure in an evaporative emissions system, over time. In this example, pressure may be at or near atmospheric pressure (atm.), or may be negative (vac.) with respect to atmospheric pressure. Timeline 1200 further includes plot 1230, indicating whether an ELCM COV (e.g. 315) is in a first position (refer to FIG. 3C), or second position (refer to FIG. 3E), over time. Timeline 1200 further includes plot 1235, indicating whether conditions are indicated to be met for conducting the diagnostic to obtain test measurements via methodology where the engine is combusting air and fuel, over time. Timeline 1200 further includes plot 1240, indicating whether a FTIV (e.g. 252) is in an open or closed state, over time.

At time t0, the engine is on (plot 1205), and fuel injection is being provided (plot 1210). The CPV is closed (plot 1215), and the pressure in the intake manifold is near atmospheric pressure (plot 1220). The FTIV is also closed (plot 1240), and the ELCM COV is configured in the first position (plot 1230). Accordingly, pressure in the evaporative emissions system is near atmospheric pressure (plot 1225). At time t0, conditions are not yet indicated to be met for conducting the diagnostic for obtaining test CPV flow measurements.

Between time t0 and t1, pressure in the intake manifold decreases, and stabilizes. It may be understood that the level of vacuum in the intake manifold corresponds to a vacuum level for which it is desirable to obtain test CPV flow measurements. For example, such a vacuum level may comprise a predetermined vacuum level for which test CPV flow measurements are requested via the controller. With the vacuum stabilized, at time t1, conditions are indicated to be met (plot 1235) for obtaining the test CPV flow measurements. Conditions being met at time t1 may additionally include a variety of other variables being satisfied as per step 915 of method 900.

With conditions being indicated to be met for obtaining the test CPV flow measurements, the CPV is commanded to be duty cycled at a first rate (e.g. 90%) (plot 1215), and the ELCM COV is commanded to the second position (plot 1230) to seal the evaporative emissions system from atmosphere. With the CPV being duty cycled, engine intake manifold vacuum may be communicated to the sealed evaporative emissions system, which may result in development of vacuum, as discussed. While not explicitly illustrated, in a case where the vehicle system includes a purge pump (e.g. 299), a purge pump bypass valve (e.g. 299c) may be commanded fully open concurrent with the commanding the ELCM COV to the second position and commanding the CPV to be duty cycled.

Between time t1 and t2, pressure in the evaporative emissions system, as monitored by an ELCM pressure sensor (e.g. 296), is reduced (plot 1225), and at time t2, the vacuum builds to a predetermined threshold vacuum (e.g. −20 InH2O), represented by line 1226. Accordingly, at time t2, the rate at which the pressure was reduced to the predetermined threshold vacuum is stored at the controller.

At time t2, the ELCM COV is commanded to the first position (plot 1230), and the CPV is stopped from being duty cycled (plot 1215). With the CPV closed and the ELCM COV configured in the first position, pressure in the evaporative emissions system returns to atmospheric pressure between time t2 and t3.

At time t3, conditions are still indicated to be met for obtaining further test CPV flow data. Importantly, the intake manifold vacuum remains essentially constant, which is a stipulation for obtaining further CPV flow data. In some examples, for an engine equipped with twin-independent variable cam timing, intake manifold vacuum may be maintained constant via manipulation of actuators (e.g. 483, 484) controlling intake and/or exhaust valves of the engine. Furthermore, in some examples, intake manifold vacuum may be maintained constant via additionally or alternatively using a motor (e.g. 120) to assist the engine in meeting vehicle operator-requested torque requests such that intake manifold may be maintained constant for conducting the diagnostic.

With conditions still being indicated to be met at time t3, the ELCM COV is commanded to the second position (plot 1230), and the CPV is duty cycled at a second rate (e.g. 10%) (plot 1215). Accordingly, pressure in the evaporative emissions system again is reduced between time t3 and t4, but at a slower rate than the rate between time t1 and t2. At time t4, the vacuum builds to the predetermined vacuum threshold, and the rate at which the vacuum built to the predetermined vacuum threshold is stored at the controller. At time t4, the CPV is commanded closed (plot 1215), or in other words is stopped from being duty cycled, and the ELCM COV is commanded to the first position (plot 1230). With test data having been obtained for the particular intake manifold vacuum level at two different duty cycles, conditions are no longer indicated to be met for conducting the diagnostic (plot 1235), or in other words. Accordingly, between time t4 and t5 pressure in the evaporative emissions system returns to atmospheric pressure (plot 1225), and intake manifold vacuum is a function of driver demand.

While test measurements corresponding to one intake manifold vacuum are illustrated at FIG. 12, it may be understood that such test measurements may be obtained in similar fashion for other intake manifold vacuum levels, where such intake manifold vacuum levels may correspond to intake manifold vacuum levels for which baseline CPV flow measurements were obtained. In this way, a plot similar to that depicted at FIG. 7A may be generated, and a CPV degradation factor may be determined, as discussed in detail above and with regard to FIG. 8.

Turning now to FIG. 13, an example timeline 1300 depicting a diagnostic using a purge pump to obtain test CPV flow measurements, is shown. More specifically, for example timeline 1300 it may be understood that baseline CPV flow measurements have already been obtained at various purge pump speeds, and thus test CPV flow measurements are requested. Timeline 1300 includes plot 1305, indicating engine status (on or off), and plot 1310, indicating whether fuel injection is being provided (on) or not (off) to the engine, over time. Timeline 1300 further includes plot 1315, indicating position of an air intake throttle (open or closed), over time. In this example it may be understood that the throttle being open refers to the throttle being fully open, whereas the throttle being closed refers to the throttle being fully closed. Timeline 1300 further includes plot 1320, indicating status of a purge pump (e.g. 299) (on or off), over time. In this example, it may be understood that the purge pump being "on" may include the purge pump being activated to a predetermined speed, the predetermined speed corresponding to a speed for which the test CPV flow measurements are desired.

Timeline 1300 further includes plot 1325, indicating a status of a CPV (e.g. 261), over time. The CPV may be fully open or fully closed. Timeline 1300 further includes plot 1330, indicating pressure in an evaporative emissions system, over time. In this example timeline, pressure in the evaporative emissions system may be near atmospheric pressure (atm.), or may be negative (vac.) with respect to atmospheric pressure. Timeline 1300 further includes plot 1335, indicating a position of an ELCM COV (e.g. 315), over time. The ELCM COV may be in either a first position (refer to FIG. 3C), or may be in a second position (refer to FIG. 3E). Timeline 1300 further includes plot 1340, indicating whether conditions are met for conducting an engine-off diagnostic for test CPV flow measurements via the purge pump, over time. Timeline 1300 further includes plot 1345, indicating a status of an FTIV (e.g. 252), over time.

At time t0, the engine is on (plot 1305), and combusting air and fuel, as fuel is being provided to the engine (plot 1310). The throttle is controlled to a position based on driver demand (plot 1315). The purge pump is off (plot 1320), and the CPV is closed (plot 1325). Pressure in the evaporative emissions system is near atmospheric pressure (plot 1330), as the ELCM COV is configured in the first position (plot 1335) and the FTIV is closed (plot 1345). Conditions are not yet indicated to be met for conducting the diagnostic to obtain test CPV flow measurements via the purge pump, as the engine is in operation. It may be understood that it may not be requested to obtain test CPV flow measurements at time t0 via the engine for a variety of reasons, including intake manifold vacuum at a level for which test CPV flow measurements are not requested, for example.

At time t1, the engine is deactivated, and fuel injection is discontinued. At time t2, conditions are indicated to be met for obtaining test CPV flow measurements via the purge pump. Accordingly, at time t3, the throttle is commanded to a fully open position (plot 1315), the ELCM COV is commanded to the second position (plot 1335), the purge pump is commanded on to a predetermined speed (plot 1320), the speed comprising a speed requested by the controller for obtaining test CPV flow measurements. Furthermore, at time t3, the CPV is commanded to be duty cycled at a first rate (e.g. 90% duty cycle) (plot 1325). It may be understood that the purge pump is activated in the forward-mode, such that a vacuum is drawn on the canister and evaporative emission system, and a positive pressure is delivered to the intake system.

While not explicitly illustrated, in some examples, between time t2 and t3, the engine may be controlled via unfueled engine rotation to position intake valves in a closed configuration. For example, if the engine is configured with twin independent variable cam timing (Ti-VCT), then actuators (e.g. 483, 484) may be commanded such that intake valves of the engine may be controlled to be substantially closed, such that air flow is routed to atmosphere via the fully open throttle. However, in other examples, intake valves of the engine may not be controlled to the closed position without departing from the scope of this disclosure.

Still further, it may be understood that, while not explicitly illustrated, commanding on the purge pump may include commanding or maintaining closed a purge pump bypass valve (e.g. 299c).

Between time t3 and t4, pressure in the evaporative emissions system is reduced via the purge pump as a function of duty cycle of the CPV. At time t4, a predetermined vacuum level (e.g. −20 InH2O) is reached, represented by line 1331. The rate at which the predetermined vacuum level is reached is determined, and is stored at the controller.

At time t4, with the predetermined vacuum having been reached, the purge pump is deactivated, the CPV is commanded closed, and the ELCM COV is commanded to the first position. Accordingly, pressure in the evaporative emissions system returns to atmospheric pressure (plot 1330) between time t4 and t5.

At time t5, conditions are still indicated to be met for obtaining further test CPV flow measurements. Accordingly, the purge pump is activated to the same speed, the ELCM COV is commanded to the second position, and the CPV is duty cycled at a second rate (e.g. 10%). Accordingly, between time t5 and t6 pressure in the evaporative emissions system is reduced at a slower rate than between time t3 and t4.

At time t6, pressure in the evaporative emissions system reaches the predetermined vacuum threshold (e.g. −20 InH2O). The rate at which the pressure reached the predetermined vacuum is stored at the controller. With both rates for the first and second duty cycles having been determined, conditions are no longer indicated to be met for conducting the diagnostic to obtain the test CPV flow measurements (plot 1340). Accordingly, the throttle is returned to the position it was in prior to conducting the diagnostic, the purge pump is deactivated, the CPV is commanded or maintained closed, and the ELCM COV is commanded to the first position. Between time t6 and t7, pressure in the evaporative emissions system returns to atmospheric pressure (plot 1330), and the engine is maintained off.

While test measurements corresponding to one purge pump speed are illustrated at FIG. 13, it may be understood that such test measurements may be obtained in similar fashion for other purge pump speeds, where such speeds may correspond to speeds for which baseline CPV flow measurements were obtained. In this way, a plot similar to that depicted at FIG. 7B may be generated, and a CPV degradation factor may be determined, as discussed in detail above and with regard to FIG. 8.

Turning now to FIG. 14, an example timeline 1400 for obtaining test CPV flow measurements via unfueled engine rotation, is shown. More specifically, for example timeline 1400 it may be understood that baseline CPV flow measurements obtained via unfueled engine rotation have already been obtained, and thus test CPV flow measurements are currently requested. Timeline 1400 includes plot 1405, indicating a status of the engine, over time. The engine may either be on, or off, where the engine being on refers to the engine rotating in a forward direction, or in other words, the same direction as the engine rotates when combusting air and fuel. Timeline 1400 further includes plot 1410, indicating whether fuel injection is being provided to the engine (on) or not (off), over time. Timeline 1400 further includes plot 1415, indicating a position of an air intake throttle, over time. The throttle may be fully open, fully closed, or somewhere between. Timeline 1400 further includes plot 1420, indicating pressure in an intake manifold of the engine, over time. In this example timeline, pressure may be near atmospheric pressure (atm.), or may be negative (vac.) with respect to atmospheric pressure. Timeline 1400 further includes plot 1425, indicating a status of a CPV, over time. The CPV may be either fully open or fully closed. Timeline 1400 further includes plot 1430, indicating pressure in an evaporative emissions system, over time. Pressure in the evaporative emissions system in this example timeline may be near atmospheric pressure, or may be negative (vac.) with respect to atmospheric pressure. Timeline 1400 further includes plot 1435, indicating a position of an ELCM COV (e.g. 315), over time. The ELCM COV may either be in a first position (refer to FIG. 3C), or a second position (refer to FIG. 3E), over time. Timeline 1400 further includes plot 1440, indicating whether conditions are met for obtaining test CPV flow measurements via unfueled engine rotation, over time. Timeline 1400 further includes plot 1445, indicating a status (open or closed) of an FTIV (e.g. 252), over time.

At time t0, the engine is on (plot 1405) and is combusting air and fuel (plot 1410). Throttle position (plot 1415) is a function of driver demand, as is intake manifold vacuum (plot 1420). The CPV is closed (plot 1425), the FTIV is closed (plot 1445), and the ELCM COV is configured in the first position (plot 1435). Accordingly, pressure in the evaporative emissions system is near atmospheric pressure (plot 1430). At time t0, with the engine in operation combusting air an fuel, conditions are not yet met for obtaining test CPV flow measurements via unfueled engine rotation.

At time t1, the engine is deactivated, and fuel injection is discontinued. Between time t1 and t2, pressure in the intake manifold returns to atmospheric pressure. At time t2, conditions are indicated to be met for obtaining test CPV flow measurements via unfueled engine rotation. In this example, it may be understood that either a purge pump is not included in the vehicle, or the purge pump is indicated to be degraded, for example.

With conditions met for obtaining the test CPV flow measurements, at time t3 the throttle is commanded to a predetermined position for obtaining the measurements, and the engine is activated to rotate in the forward direction (plot 1405), without fueling being provided (plot 1410). In other words, the engine is rotated unfueled via a motor (e.g. 120). It may be understood that the engine speed may be controlled to achieve a desired intake manifold vacuum, and in some examples, in conjunction with or alternatively via controlling the throttle.

Between time t2 and t3, pressure in the intake manifold reaches a desired level of intake manifold vacuum. In other words, the controller may request a particular vacuum for which test CPV flow data is desired, and the engine may be rotated to achieve said vacuum. With the desired vacuum reached and maintained, for example via controlling engine speed and/or throttle position, at time t3 the ELCM COV is commanded to the second position (plot 1435), and the CPV is duty cycled at a first rate (e.g. 90%). While not explicitly illustrated, in a case where the vehicle includes a purge pump, a purge pump bypass valve (e.g. 299c) may be commanded open at time t3.

Between time t3 and t4, pressure in the evaporative emissions system is reduced, and at time t4 pressure reaches a predetermined threshold vacuum (e.g. −20 InH2O). A rate at which the predetermined threshold vacuum was reached may be stored at the controller. With the rate determined for the first CPV duty cycle, the ELCM COV is commanded to the first position, and the CPV is commanded closed. Between time t4 and t5 pressure in the evaporative emissions system returns to atmospheric pressure.

At time t5, conditions are still indicated to be met for obtaining further test CPV flow measurements for the current intake manifold vacuum level. Accordingly, the ELCM COV is again commanded to the second position and the CPV is duty cycled at a second rate (e.g. 10%). Accordingly, pressure in the evaporative emissions system is reduced at a slower rate than between time t3 and t4. At time t6, pressure in the evaporative emissions system reaches the predetermined threshold vacuum (e.g. −20 In H2O), and the rate at which the predetermined threshold vacuum was reached is stored at the controller. With both rates obtained for the two CPV duty cycles, conditions are no longer indicated to be met for conducting the diagnostic, the engine is deactivated, the throttle is returned to its position it was in prior to the diagnostic, the CPV is commanded or maintained closed, and the ELCM COV is commanded to the first position. Accordingly, between time t6 and t7, pressure in the evaporative emissions system returns to atmospheric pressure, as does pressure in the intake manifold.

Again, while test measurements corresponding to one intake manifold vacuum are illustrated at FIG. 14, it may be understood that such test measurements may be obtained in similar fashion for other intake manifold vacuums, where such vacuums may correspond to vacuums for which baseline CPV flow measurements were obtained. In this way, a plot similar to that depicted at FIG. 7A may be generated, and a CPV degradation factor may be determined, as discussed in detail above and with regard to FIG. 8.

Thus, a method comprises controlling a duty cycle of a purge valve configured to regulate a purge flow from a fuel vapor storage canister to an intake of an engine during a canister purging event based on a degradation factor obtained by comparison of durations at which a predetermined pressure is reached in an evaporative emissions system at multiple purge valve activation levels. In such a method, the evaporative emissions system may be sealed for obtaining the durations at which the predetermined pressure is reached. In such a method, the predetermined pressure may comprise a negative pressure with respect to atmospheric pressure. Furthermore, a fuel system may be sealed from the evaporative emissions system for obtaining the durations at which the predetermined pressure is reached.

In such a method, the comparison of the durations at which the predetermined pressure is reached at multiple purge valve activation levels may include both conditions for which there is an absence of evaporative emissions system degradation and conditions for which there is a presence of evaporative emissions system degradation.

Such a method may further comprise operating a pump positioned downstream of the fuel vapor storage canister to communicate a predetermined vacuum to the evaporative emissions system for obtaining the durations at which the predetermined pressure is reached. In one example, the pump comprises the engine. In another example, the pump comprises a purge pump positioned in a purge line between the purge valve and the fuel vapor storage canister.

In such a method, the predetermined pressure that is reached may be monitored via a pressure sensor positioned in the evaporative emissions system configured to indicate pressure across a reference orifice in the evaporative emissions system. The multiple purge valve activation levels may include two or more different duty cycles of the purge valve. Furthermore, the degradation factor may be used to adjust a flow map for controlling the duty cycle of the purge valve during the canister purging event.

Another example of a method comprises updating a flow map at a controller of a vehicle based on an onboard diagnostic that compares a set of test rates at which a predetermined vacuum is reached in a sealed evaporative emissions system to a set of baseline rates at which the predetermined vacuum is reached in the sealed evaporative emissions system; and controlling a purge valve positioned between a fuel vapor storage canister and an engine during a purging event where fuel vapors are purged from the fuel vapor storage canister to the engine, based on the updated flow map.

In such a method, the set of baseline rates are obtained under conditions of an absence of degradation of the purge valve and evaporative emissions system, and the test rates are obtained at a time subsequent to obtaining the baseline rates.

In such a method, the onboard diagnostic includes duty cycling the purge valve at a first rate and then a second rate while predetermined negative pressure with respect to atmosphere is applied on the evaporative emissions system from a position downstream of the fuel vapor storage canister, for obtaining the set of test rates and the set of baseline rates. The method may further comprise maintaining the predetermined negative pressure substantially constant when duty cycling the purge valve at the first rate and then the second rate, and where more than one negative pressure may be used to obtain the set of test rates and the set of baseline rates by duty cycling the purge valve at the first rate and the second rate.

In such a method, a degradation factor may be obtained by comparing the set of test rates to the set of baseline rates, and the degradation factor may be used to update the flow map at the controller. The flow map may be relied upon for controlling the purge valve in response to a requested flow rate of air and fuel vapor from the fuel vapor storage canister to the engine for the purge event.

As discussed, one approach for indicating CPV degradation may include monitoring pressure in the evaporative emissions system while the engine is combusting air and fuel and where the CPV is commanded closed with the evaporative emissions system sealed. If a negative pressure from the intake manifold is communicated to the evaporative emissions system, as monitored via a pressure sensor (e.g. 296), then it may be indicated that the CPV is degraded. In another example, a similar approach of communicating negative pressure from the intake manifold (with the engine combusting) to the evaporative emissions system and monitoring pressure therein, may be conducted with the CPV open and the evaporative emissions system sealed from atmosphere. In this example, a lack of vacuum or a substantially reduced vacuum may be indicative of degradation in the form of a CPV that is sticking closed, that there is a large source of undesired evaporative emissions stemming from the evaporative emissions system, that there is a restriction in the evaporative emissions system (e.g. canister internal filter (e.g. 297) restriction), etc.

Such examples rely on the engine combusting air and fuel in order to be conducted. However, hybrid vehicles (e.g. plug-in hybrid electric vehicles, stop/start, hybrid electric vehicles, etc.) may have limited run time and thus limited opportunities to conduct such tests. Thus, other approaches may be desirable for vehicles with limited engine run time.

It is desirable that such an approach enable a determination of potential CPV degradation (e.g. improper sealing or improper opening), potential canister internal filter restriction, etc. As one example, the canister filter may become clogged or plugged to various extents over time, and such a condition may impact the ability to purge, and which may be a factor in the CPV flow test diagnostics described above. In other words, adjusting a CPV flow map as discussed above may serve to account for a level to which the internal filter is clogged or plugged in addition to or alternative to any CPV degradation. Any indication of CPV degradation, or any indication of the canister internal filter being clogged/plugged, may be used as an entry condition for conducting the CPV flow mapping diagnostics as discussed above. Thus, a method for providing such indication(s) is discussed in detail below with regard to FIGS. 15-16. Such a diagnostic may be referred to as a evap flow diagnostic, as the diagnostic relates to whether a purge flow (for example during purging the canister) through the evaporative (evap) emissions system may be impacted by a current status of the CPV, canister internal filter, and evaporative emissions system in general. In examples where a purge pump is included in the vehicle system, such a diagnostic may further relate to whether a purge pump bypass valve or conduits routing fluid flow around the purge pump, may be degraded.

Accordingly, turning to FIG. 15, a high-level example method 1500 for diagnosing whether a CPV may be degraded to some extent and/or whether a canister internal filter may be clogged or plugged to some extent, is shown. Specifically, the method includes conducting the diagnostic during a refueling event, where fluid flow induced via the refueling event (e.g. induced via the generation of pressure during refueling) is used as a means for assessing evaporative emissions system degradation (e.g. one or more of canister internal filter degradation, CPV degradation, purge line degradation, purge pump bypass valve degradation (where included), purge pump bypass conduit degradation, etc.). To indicate the presence or absence of such degradation, fluid flow in an intake of the engine induced by the refueling event may be relied upon, for example via a monitoring of the fluid flow via a mass air flow (MAF) sensor (e.g. 202) positioned in an intake of the engine.

Method 1500 will be described with reference to the systems described herein and shown in FIGS. 1-4, though it will be appreciated that similar methods may be applied to other systems without departing from the scope of this disclosure. Instructions for carrying out method 1500 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-4. The controller may employ actuators such as CPV (e.g. 261), purge pump bypass valve (e.g. 299*c*) (where included), throttle (e.g. 262), etc., according to the methods described herein.

Method 1500 begins at 1505, and may include, during a refueling event where fuel is being added to the fuel tank, conducting a baseline evap flow diagnostic responsive to conditions being met for doing so. For example, the baseline evap flow diagnostic may be conducted under conditions where it is known that there is no degradation of the CPV, purge line, and that the canister internal filter is clean (e.g. loading of the canister internal filter with debris below a threshold loading amount). In a situation where the vehicle system includes a purge pump, the baseline evap flow diagnostic may further include an indication that the purge pump bypass valve and purge pump bypass conduits are not degraded.

The baseline evap flow diagnostic may be conducted as follows. During refueling, an FTIV (e.g. 252) may be opened to enable refueling vapors to be directed to the canister. The CPV may be maintained closed. Provided that during the refueling event, pressure in the fuel system/ evaporative emissions system does not increase above a threshold and/or there are no indications of premature shutoffs that would indicate the canister itself is clogged/restricted, or that the air filter (e.g. 259) upstream of the canister is clogged/restricted, the CPV may be commanded open and air flow in the intake of the engine may be monitored. To enable such fluid flow, an intake throttle may be additionally commanded fully open. The fluid flow may be monitored via the MAF sensor as the flow proceeds from the fuel tank, through the open CPV and to the intake. Such fluid flow may thus constitute baseline evap flow measurements. For example, the fluid flow may be monitored for a predetermined time duration, and then may be averaged or otherwise processed to yield the baseline evap flow. For consistency, conditions being met for conducting the baseline evap flow diagnostic may include a pressure in the fuel system being within a threshold of a desired fuel system pressure during refueling (e.g. a pressure corresponding to 10 gallons per minute being provided via a refueling dispenser). Subsequent to the baseline evap flow measurements having been obtained, the CPV may be commanded closed and the throttle returned to the position it was in prior to the obtaining of the baseline evap flow measurements.

With such baseline evap flow measurements having been obtained at 1505, method 1500 may proceed to 1510, where said baseline evap flow measurements (or the processed versions thereof) may be stored at the controller.

Proceeding to 1515, at a later time, for example after a predetermined time duration has elapsed since the baseline evap flow measurements were obtained, or according to a predetermined schedule for conducting the diagnostic, method 1500 may include obtaining test evap flow measurements similar to that described above for obtaining the baseline evap flow measurements. However, for the test measurements, conditions being met to conduct the diagnostic may not include an indication that the canister internal filter is substantially clean, and may not include an indication that the CPV (and in some examples the purge pump bypass valve) is not degraded, as the diagnostic is specifically attempting to determine current operational state of such components. Briefly, during such a refueling event to obtain test evap flow measurements, again the CPV may be maintained closed and provided that no premature shutoffs are indicated and/or that pressure remains below the threshold pressure, and further that pressure in the fuel system is within the threshold of the desired fuel system pressure (e.g. a pressure corresponding to 10 gallons per minute being provided via a refueling dispenser), the CPV and throttle may each be commanded fully open (along with a purge pump bypass valve where included), and fluid flow in the intake may be monitored for the same predetermined time duration as that described above at step 1505. The monitoring of the fluid flow may again be conducted via the MAF sensor, and the data may be averaged or otherwise processed after the predetermined time duration has elapsed. Such data may be stored at the controller at step 1520. Again, after the predetermined time duration elapses, the CPV may be commanded closed (along with the purge pump bypass valve where included), and the throttle may be returned to the position it was in prior to obtaining the test evap flow measurements.

Proceeding to 1525, method 1500 may include comparing the test evap flow measurements to the baseline evap flow measurements, to indicate the presence or absence of degradation. In this example, evaporative emissions system degradation may include one or more of CPV degradation (e.g. the CPV not fully opening or sticking closed), the canister internal filter being clogged/plugged to at least some extent, the purge pump bypass valve being degraded (where included), etc., when the test evap flow measurements as monitored via the MAF sensor are substantially less than the baseline evap flow measurements. In other words, comparing the test evap flow measurements to the baseline evap flow measurements at 1525 may include indicating that there is degradation as discussed above, provided the test evap flow measurements are not within a threshold (e.g. within 5% or within 1%) of the baseline evap flow measurements, for example. Alternatively, an absence of degradation may be indicated responsive to the test evap flow measurements being within the threshold of the baseline evap flow measurements. Method 1500 may then end.

Method 1500 thus represents a high-level example method of the diagnostic described above which may be used to compare the test evap flow measurements to the baseline evap flow measurements. A more detailed methodology is provided below with regard to FIG. 16.

Turning now to FIG. 16, a method 1600 for obtaining either the baseline evap flow measurements or the test evap flow measurements as discussed above with regard to FIG. 15, is shown. Only one method is illustrated because the methodology for obtaining baseline evap flow measurements is substantially the same as obtaining test evap flow measurements. Method 1600 begins at 1605, and includes indicating whether a refueling event is in progress. Such an indication may be provided based on a request via a vehicle operator to commence refueling, and may additionally or alternatively include an indication that fuel is being added to the fuel tank (e.g. fuel level increasing as monitored via a fuel level indicator). If a refueling event is not in progress, method 1600 may proceed to 1610, where current vehicle operating parameters may be maintained. Method 1600 may then end.

Returning to 1605, responsive to an indication that a refueling event is in progress, method 1600 may include monitoring fuel system pressure. Such pressure may be monitored, for example, via a fuel tank pressure transducer (FTPT) (e.g. 291). Proceeding to 1620, method 1600 may include indicating whether pressure in the fuel system is greater than the predetermined threshold and/or if premature shutoffs are indicated. If pressure in the fuel system is greater than the predetermined threshold and/or if premature shutoffs are indicated, method 1600 may proceed to 1625. At 1625, method 1600 may include indicating potential canister restriction and/or potential air filter (e.g. 259) restriction. With canister restriction and/or potential restriction of the air filter indicated, method 1600 may proceed to 1630, where the refueling event may proceed, provided the premature shutoffs do not prevent the vehicle fuel tank from being refueled. In such an example, when the refueling is completed, method 1600 may proceed to 1635, where vehicle operating conditions may be updated to reflect the indication of restriction in the canister and/or air filter. For example, updating vehicle operating conditions may include illuminating a malfunction indicator light (MIL) at the vehicle dash in order to alert a vehicle operator of a request to service the vehicle to address the potential restrictions. In some examples, a canister purge schedule may be updated, to reflect the potential restriction. For example, the canister may be prevented from being purged until the issue of the restriction has been remedied or may be purged more aggressively (for example only at increased manifold vacuums). Further, other diagnostics that rely on evacuation of the evaporative emissions system and/or fuel system may be postponed until the issue of the restriction has been remedied. Method 1600 may then end.

Returning to 1620, in response to an indication that pressure in the fuel system is not greater than the predetermined threshold, and/or responsive to an indication of an absence of premature shutoff events of the refueling dispenser, method 1600 may proceed to 1640. At 1640, method 1600 may include indicating whether conditions are met for conducting either the baseline evap flow diagnostic or the test evap flow diagnostic, as discussed above with regard to FIG. 15. As discussed above, one example of conditions being met may include an indication that pressure in the fuel system comprises the desired fuel system pressure, or where pressure is within a threshold of the desired fuel system pressure. Other conditions for conducting either the baseline evap flow diagnostic or the test evap flow diagnostic are discussed above with regard to FIG. 15 and apply to step 1640 of method 1600.

If, at 1640, conditions are not indicated to be met for conducting such a diagnostic, method 1600 may proceed to 1645. At 1645, method 1600 may include proceeding with the refueling event without conducting the evap flow diagnostic (either the baseline or test evap flow diagnostic). Proceeding to 1650, method 1600 may include updating vehicle operating parameters after the refueling event has been completed. For example, a canister loading state may be updated to reflect the refueling event, fuel tank fill level may be updated, a canister purging scheduled may be updated to reflect the refueling event, etc. Method 1600 may then end.

Returning to 1640, responsive to an indication that conditions are met for conducting either the baseline evap flow diagnostic or the test evap flow diagnostic, method 1600 may proceed to 1655. At 1655, method 1600 may include commanding fully open the throttle (e.g. 262). Proceeding to 1660, method 1600 may include commanding fully open the CPV, for a predetermined duration of time. While not explicitly illustrated, in a case where a purge pump is included in the vehicle system, the purge pump bypass valve may be commanded fully open. In this way, the fuel tank may be fluidically coupled to engine intake and to atmosphere.

With the fuel tank fluidically coupled to engine intake and to atmosphere, method 1600 may proceed to 1665. At 1665, mass air flow in the intake may be monitored, via for example, a MAF sensor (e.g. 202). Mass air flow measurements may be acquired periodically, for example every 1 second, every 5 seconds, etc. Proceeding to 1670, method 1600 may include recording the MAF measurements at the controller after the predetermined duration of time has elapsed. As discussed, in some examples the MAF measurements may be averaged or otherwise processed, for storage at the controller. Furthermore, it may be understood that any fuel vapors that may have been routed from the fuel tank to the intake may be adsorbed via the AIS HC trap (e.g. 294) positioned in the intake, prior to exiting to atmosphere.

Proceeding to 1675, method 1600 may include commanding closed the CPV (and where applicable, commanding closed the purge pump bypass valve), and commanding the throttle to be returned to the position it was in prior to obtaining the MAF measurements. Continuing at 1680, method 1600 may include enabling the refueling event to proceed as usual, in other words, without directing or routing any fluid flow to the intake. Such action may be maintained until the refueling event is completed, for example via an automatic shutoff of the refueling dispenser, via removal of the dispenser from the fuel filler nozzle, etc. It may be understood that, upon completion of the refueling event, for vehicle fuel systems that include an FTIV (e.g. 252), the FTIV may be commanded closed to seal the fuel system from the evaporative emissions system.

Proceeding to 1685, method 1600 may include updating vehicle operating parameters responsive to completion of the refueling event. For example, canister loading state may be updated, fuel level may be updated, and a canister purging schedule may be updated to reflect the refueling event.

Continuing to 1690, method 1600 may include, where applicable, utilizing the evap flow measurements obtained via method 1600 to determine whether degradation is present, as discussed above with regard to FIG. 15. For example, if baseline evap flow measurements were obtained, then nothing more may be done than the storing of the baseline measurements at the controller per step 1670. Alternatively, responsive to test evap flow measurements being obtained, then method 1500 may be used to compare the test evap flow measurements to the baseline evap flow measurements, in order to indicate the presence or absence of degradation, as discussed above with regard to FIG. 15. In this way, a presence or absence of evaporative emissions system degradation may be indicated during the refueling event based on fluid flow in the intake of the engine.

Continuing to FIG. 17, an example timeline 1700 for conducting the evap flow test diagnostic during a refueling event, as discussed above with regard to FIGS. 15-16, is shown. Timeline 1700 includes plot 1705, indicating whether refueling is requested via the vehicle operator, plot 1710, indicating a fuel level in the fuel tank, plot 1715, indicating an open or closed status of the CPV, plot 1720, indicating an open or closed status of the throttle, plot 1725 indicating mass air flow in engine intake as monitored via the MAF sensor, plot 1730, indicating pressure in the fuel system as monitored via the FTPT, plot 1735, indicating on open or closed status of the FTIV, and plot 1740, indicating whether degradation is present. Each of the above-mentioned plots are with respect to time. For the CPV, throttle, and FTIV, it may be understood that "open" refers to fully open, and "closed" refers to fully closed. Fuel level may increase (+) or decrease (−), MAF may increase (+) with respect to no flow (0), and fuel tank pressure may increase (+) with respect to atmosphere (Atm.).

At time t0, refueling is not requested (plot 1705), and fuel level is low (plot 1710). The CPV is closed (plot 1715), the throttle is more closed than open (plot 1720), and the FTIV is closed (plot 1735). There is no air flow in the intake (plot 1725), fuel tank pressure is positive with respect to atmosphere (plot 1730), and degradation (e.g. of the CPV, canister internal filter, etc.) is not indicated. In this example illustration, it may be understood that the purge pump is not included in the vehicle system.

At time t1, a refueling event is requested via the vehicle operator. For example, a refueling button on the vehicle dash is depressed. Accordingly, the FTIV is commanded open via the controller, and with the fuel tank fluidically coupled to atmosphere, pressure in the fuel system decays to atmospheric pressure between time t1 and t2. At time t2, refueling is enabled, for example a refueling lock is commanded or allowed to open, enabling fuel to be added to the tank. Between time t2 and t3, pressure in the fuel system rises and stabilizes at a threshold pressure represented by dashed line 1731. In this example, it may be understood that the threshold pressure represents a pressure expected in the fuel system in response to a predetermined fuel flow rate (e.g. 10 gallons per minute). In other words, the pressure in the fuel system has reached and stabilized at the desired fuel system pressure for conducting the evap flow diagnostic during refueling, as discussed above with regard to FIGS. 15-16. Furthermore, between time t2 and t3, no premature shutoffs of the refueling dispenser are indicated (as per the absence of pressure fluctuations in the fuel system indicating such events). Accordingly, the canister is free from restriction and the air filter is not clogged/restricted to any significant extent.

Thus, at time t3, a test evap flow diagnostic is initiated. It may be understood that the baseline evap flow diagnostic has already been previously conducted, and the MAF measurements obtained via the baseline evap flow diagnostic is represented by dashed line 1726.

At time t3, the CPV is commanded fully open, as is the throttle. At time t4, fluid flow in the intake is indicated (plot 1725) via the MAF sensor (e.g. 202). Such fluid flow increases and stabilizes between time t4 and t5. Furthermore, between time t4 and t5, pressure in the fuel system decreases slightly as there is now an additional pathway for pressure build-up in the fuel system to be relieved (e.g. via the vent line and via the purge line).

At time t5, it may be understood that the predetermined time duration for obtaining the test evap flow measurements elapses. Accordingly, the test evap flow measurements are stored at the controller, and the CPV is commanded closed, while the throttle is commanded to the position it was in prior to conducting the test evap flow diagnostic.

As indicated, MAF for the test evap flow diagnostic is lower than the MAF for the baseline evap flow diagnostic. As discussed, such data is processed via method 1500 discussed above, and at time t5, degradation is indicated based on the comparison between test evap flow measurements and baseline evap flow measurements.

Between time t5 and t6, after fluid flow is effectively sealed from the intake, refueling proceeds as before conducting the evap flow diagnostic.

In this example, because degradation is indicated, it may be understood that either the CPV may not be fully opening, or the canister internal filter may be clogged to some extent. As additional examples, there may be degradation in the purge line (e.g. a source of undesired evaporative emissions), such that fluid flow is not reaching the MAF sensor. In some examples there may be a combination of one or more of the above examples in terms of degradation. In some examples, if it is known that there is an absence of undesired evaporative emissions stemming from the evaporative emissions system as indicated, for example, by other onboard methodology, then it may be indicated that the source of degradation is one of the canister internal filter or the canister purge valve. Furthermore, in such a case where it is additionally known that the canister purge valve is not degraded to any significant extent, then such a method may pinpoint the canister internal filter as the source of degradation (e.g. canister internal filter being clogged).

In any case, such an indication may provide impetus for proceeding (when conditions are appropriate) with updating CPV flow maps based on the methodology depicted above at FIGS. 8-11. In this way, control of the CPV during purging events may be updated to reflect the current vehicle component conditions, to avoid stalling/hesitation or underperformance that may otherwise occur if the degradation is not taken into account for purging operations.

While not explicitly illustrated, there may be opportunity during a refueling event to indicate whether a CPV is not properly sealing. For example, if any air flow in the intake as monitored via the MAF sensor is indicated during refueling while the CPV is commanded closed, then it may be an indication of the CPV not being fully closed even when commanded to be. As one example, the evaporative emissions system may be briefly sealed during refueling, to encourage fluid flow through a CPV that is not fully closing. Furthermore, in such an example, the throttle may be commanded open to allow for fluid flow to the intake. More specifically, during refueling the evaporative emissions system may be sealed, and the throttle commanded open. Mass air flow in the intake may be monitored for a predetermined duration. No fluid flow in the intake, or in other words, fluid flow below a threshold, may indicate the CPV is properly sealing. Alternatively, fluid flow greater than a threshold may indicate the CPV is not properly sealing. Such a diagnostic may be conducted for a predetermined amount of time, and may include monitoring pressure in the fuel system/evaporative emissions system to avoid undesirable pressure build-up during the diagnostic.

While such an approach described above with regard to the methods of FIGS. 15-16 may be useful, it may be desirable to additionally have methodology for indicating evaporative emissions system degradation (e.g. potential CPV degradation, canister internal filter restriction, etc.), which does not rely on a refueling event, and that does not rely on the engine combusting air and fuel. Accordingly, turning to FIG. 18, a high level example method 1800 for obtaining baseline and test evap flow measurements in the absence of a refueling event, is shown. It may be understood that the baseline evap flow measurements and the test evap flow measurements discussed in relation to FIG. 18 are referred to by the same nomenclature as those discussed at FIGS. 15-17, but are slightly different in nature, as will be evident below. Briefly, it may be understood that the baseline evap flow measurements and test evap flow measurements discussed at FIGS. 18-20 are obtained in the absence of refueling, are conducted with a pump (e.g. 295), and involve evacuating the evaporative emissions system with the fuel system sealed and the CPV (and purge pump bypass valve, where included) open. As per the methodology of FIGS. 15-16, mass air flow in the intake may be used as a readout as to whether there are restrictions in the evaporative emissions system, for example a CPV (or purge pump bypass valve, where included) that is not fully opening or is sticking closed, canister internal filter being clogged/plugged, canister restriction, a source of undesired evaporative emissions, etc.

Method 1800 will be described with reference to the systems described herein and shown in FIGS. 1-4, though it will be appreciated that similar methods may be applied to other systems without departing from the scope of this disclosure. Instructions for carrying out method 1800 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-4. The controller may employ actuators such as CPV (e.g. 261), purge pump bypass valve (e.g. 299c) (where included), ELCM (e.g. 295), ELCM COV (e.g. 315), etc., according to the methods described herein.

Method 1800 begins at 1805, and may include during engine-off conditions where a refueling event is not in progress, conducting a baseline evap flow diagnostic responsive to conditions being met for doing so. In one example, an engine-off condition may include the vehicle having been turned off and where a controller is kept alive to conduct the diagnostic. In another example, the controller may be slept at a key-off event and the controller may be awoken at a scheduled time during the key-off event to conduct the diagnostic. In still another example, an engine-off condition may include a start/stop event where the engine is stopped from combusting air and fuel.

Conditions being met for conducting the baseline evap flow diagnostic may include an indication of a clean canister, or in other words, an indication that the canister loading state is less than a threshold (e.g. less than 5% loaded, or less than 1% loaded). Conditions being met may include an indication of no restriction in the canister internal filter, a CPV that is not degraded, a purge pump bypass valve (where included) that is not degraded, a throttle that is functioning as desired, no sources of undesired evaporative emissions stemming from the evaporative emissions system, etc.

The baseline evap flow diagnostic may include parking the engine with at least intake valves (and exhaust valves in some examples) closed, for example via rotating the engine via the motor (e.g. 120) and controlling intake/exhaust valves to closed positions via actuators (e.g. 483, 484). The baseline evap flow diagnostic may further include commanding fully open the throttle, commanding fully open the CPV, commanding fully open the purge pump bypass valve (where included), commanding or maintaining the FTIV closed, commanding the ELCM COV to the second position (see for example FIG. 3B), and activating the ELCM pump in vacuum-mode to evacuate the evaporative emissions system. The ELCM may be activated at a predetermined speed for the diagnostic. With the ELCM activated, fluid flow in the intake may be monitored via the MAF sensor. Measurements may be obtained via the MAF sensor every 1 second, every 5 seconds, etc. Fluid flow may be monitored for a predetermined duration, after which the MAF measurements may be averaged or otherwise processed to obtain baseline evap flow measurements. After obtaining the baseline evap flow measurements, the ELCM may be deactivated, the ELCM COV may be commanded to the first position, the CPV may be commanded closed, and the throttle may be returned to the position it was in prior to obtaining the baseline evap flow measurement. Furthermore, the intake/exhaust valves may be controlled to appropriate positions for starting the engine for the next engine restart event.

Proceeding to 1810, the baseline evap flow measurements may be stored at the controller. Subsequently, at a later time, at 1815, method 1800 may include conducting the same procedure in order to obtain test evap flow measurements responsive to conditions being met for doing so. Conditions being met at 1815 may again include a clean canister (e.g. recently purged within a threshold duration of time and/or an indication of a loading state less than a threshold loading state such as less than 5% or less than 1% loaded), but may not include the indications of the absence of CPV degradation, purge pump bypass valve degradation (where included), canister internal filter restriction, canister restriction, etc. Conditions being met may include an indication of a threshold amount of time elapsing since the baseline evap flow diagnostic, or a threshold amount of time elapsing since the last time test evap flow measurements were obtained.

Conducting the evap flow test diagnostic may involve the same steps as that discussed above with regard to conducting the baseline flow test diagnostic. It may be understood that the ELCM may be operated at the same speed to obtain the test evap flow measurements, as was utilized to obtain the baseline evap flow measurements. The diagnostic for obtaining the test evap flow measurements may be conducted for the same duration as that for obtaining the baseline evap flow measurements. Proceeding to 1820, after obtaining the test evap flow measurements, the test evap flow measurements may be stored at the controller.

Proceeding to 1825, method 1800 may include comparing the test evap flow measurements to the baseline evap flow measurements, to indicate a presence or absence of degradation. For example, the controller may compare the baseline evap flow measurements to the test evap flow measurements, and if the test evap flow measurements are not within a threshold of the baseline evap flow measurements, then degradation may be indicated. Otherwise, if the test evap flow measurements are within the threshold of the baseline evap flow measurements, an absence of degradation may be indicated. For example, degradation may be indicated if the test evap flow is less than the baseline evap flow measurements by at least the threshold. Degradation may include a CPV that is not opening as desired, a purge pump bypass valve (where included) that is not opening as desired, a canister internal filter being restricted to at least some extent, a restriction in the canister, etc. After obtaining such results, method 1800 may then end.

FIG. 18 thus depicts a high-level example methodology for comparing test evap flow measurements and baseline evap flow measurements to indicate a presence or absence of degradation in the evaporative emissions system. A more detailed methodology is depicted at FIG. 19. Accordingly, turning now to FIG. 19, an example method 1900 for obtaining the baseline or test evap flow measurements as per FIG. 18, is shown. Only one method is illustrated because the methodology for obtaining baseline evap flow measurements is substantially the same as obtaining test evap flow measurements.

Method 1900 begins at 1905, and may include indicating if conditions are met for conducting the baseline or test evap flow diagnostic as discussed at FIG. 18. If conditions are not met, method 1900 may proceed to 1910, and may include maintaining current vehicle operating parameters. Method 1900 may then end.

Returning to 1905, if conditions are met for conducting the baseline or test evap flow diagnostic, method 1900 may proceed to 1915. At 1915, method 1900 may include commanding open the CPV, commanding open the purge pump bypass valve (where included) commanding open the throttle, and may further include commanding or maintaining the FTIV closed. While not explicitly illustrated, at 1915, method 1900 may further include controlling the engine as discussed above with regard to FIG. 18, to position at least intake valves closed. Briefly, a motor may rotate the engine unfueled and actuators (e.g. 483, 484) associated with variable cam timing, for example Ti-VCT, may be utilized to position at least the intake valves closed.

Proceeding to 1920, method 1900 may include commanding the ELCM COV to the second position, and may further include activating the ELCM pump to draw negative pressure on the evaporative emissions system. As discussed above, the ELCM pump may be activated to a predetermined speed.

Proceeding to 1925, method 1900 may include monitoring fluid flow in the intake of the engine, via the MAF sensor (e.g. 202). After a predetermined duration of time (e.g. 5 seconds, 10 seconds, 20 seconds, etc.), the MAF measurements may be averaged or otherwise processed, and method 1900 may proceed to 1930 where the measurements (either baseline evap flow measurements or test evap flow measurements) may be stored at the controller.

Proceeding to 1935, method 1900 may include commanding closed the CPV, commanding closed the purge pump bypass valve (where included), commanding the throttle to the position it was in prior to the diagnostic being conducted, and returning engine intake/exhaust valves to the positions they were in prior to conducting the diagnostic, or to positions appropriate for starting the engine for the next engine start request.

Proceeding to 1940, method 1900 may include deactivating the ELCM, and returning the ELCM COV to the first position. With the ELCM deactivated, method 1900 may proceed to 1945, and may include utilizing the obtained measurements in conjunction with method 1800 depicted at FIG. 18, in order to determine the presence or absence of degradation, as discussed above. For example, if method 1900 was conducted to obtain baseline evap flow measurements, then such measurements may be stored at the controller and nothing further may be done. If test evap flow measurements were obtained, then method 1800 may be used to compare the test evap flow measurements to the baseline evap flow measurements, such that the presence or absence of degradation may be indicated. In this way, evaporative emissions system degradation may be indicated without relying on engine combustion.

Turning now to FIG. 20, an example timeline 2000 for obtaining baseline evap flow and test evap flow measurements in the absence of a refueling event, without the engine combusting and during a key-off event, is shown. In this example timeline 2000, it may be understood that baseline evap flow measurements have already been obtained, and thus test evap flow diagnostics are obtained. Timeline 2000 includes plot 2005, indicating whether conditions are met for conducting the evap flow diagnostic, plot 2010, indicating CPV status, plot 2015, indicating throttle position, plot 2020, indicating mass air flow as monitored via the MAF sensor, plot 2025, indicating FTIV status, plot 2030, indicating ELCM COV status, plot 2035, indicating ELCM status, and plot 2040, indicating a presence or absence of degradation. Each of the above plots are with respect to time. The CPV, throttle, and FTIV may be open or closed, or in the case of the throttle, somewhere between. The ELCM COV may be configured in the first position (see FIG. 3C), or the second position (see FIG. 3B). There may be no flow (0) or increased flow (+) as monitored via the MAF sensor. Furthermore, the ELCM may be either off, or may be activated on in a vacuum-mode, where the evaporative emissions system is evacuated.

At time t0, conditions are not yet met for conducting the test evap flow diagnostic (plot 2005). In this example, it may be understood that the vehicle is in a key-off state, and the controller is asleep, and is scheduled to awake at a predetermined time to conduct the test evap flow diagnostic. The CPV is closed (plot 2010), the throttle is mostly closed (plot 2015), there is no flow in the intake as monitored via the MAF sensor (plot 2020), the FTIV is closed (plot 2025), the ELCM COV is configured in the first position (plot 2030), the ELCM is off (plot 2035), and degradation is not indicated (plot 2040).

At time t1, conditions are indicated to be met for conducting the test evap flow diagnostic. In this example, while not explicitly illustrated, it may be understood that the controller is awoken at time t1 to conduct the test evap flow diagnostic. With conditions being met, at time t2, the CPV is commanded fully open, the throttle is commanded fully open, and the ELCM COV is commanded to the second position. While not explicitly illustrated, it may be understood that in some examples, at time t2, the engine may be controlled to position at least intake valves in closed configurations, as discussed above.

At time t3, the ELCM is activated on in vacuum-mode to draw a negative pressure with respect to atmospheric pressure on the evaporative emissions system. Accordingly, between time t3 and t4, mass air flow in the intake increases and stabilizes at a MAF corresponding to the MAF obtained from baseline evap flow measurements obtained previously, represented by dashed line 2021. In other words, the fluid flow in the intake for the test measurements due to atmospheric air being drawn into the intake, through the open CPV en route to the ELCM is not different than the fluid flow obtained for the baseline measurements. Accordingly, evaporative emissions system degradation is not indicated. In other words, there does not appear to be degradation of the CPV related to the CPV not fully opening or sticking closed, nor substantial clogging/plugging of the canister itself or canister internal filter, nor a presence of undesired evaporative emissions stemming from the evaporative emissions system. If included, such an indication may further indicate the purge pump bypass valve is not degraded.

Accordingly, at time t4, with the diagnostic having been completed, conditions are no longer met for conducting the diagnostic, the CPV is commanded closed, the throttle is commanded to its initial position prior to the diagnostic, the ELCM COV is commanded to the first position, and the ELCM is commanded off, or is deactivated. With the ELCM COV in the first position, between time t4 and t5, pressure in the evaporative emissions system returns to atmospheric pressure.

Thus, a method comprises during a condition where an engine of a vehicle is not combusting air and fuel, applying a pressure from an evaporative emissions system of the vehicle to an intake of the engine, and indicating an absence of degradation in the evaporative emissions system based on a test flow in the intake of the engine being within a predetermined threshold of a baseline flow obtained at an earlier time via applying the pressure.

In such a method, a purge valve positioned in a purge line between the fuel vapor storage canister and the engine is commanded fully open, and a throttle positioned in the intake is commanded fully open for obtaining the test flow and the baseline flow. Such a method may further comprise adjusting operation of the purge valve while the engine is combusting air and fuel based at least in part on a presence or the absence of degradation in the evaporative emissions system.

In such a method, applying the pressure may includes applying a negative pressure with respect to atmospheric pressure from the evaporative emissions system to the intake. In such a method, a fuel vapor storage canister positioned in the evaporative emissions system is substantially clean of stored fuel vapors. A pump positioned in a vent line of the evaporative emissions system is controlled to a predetermined speed for applying the negative pressure to obtain the test flow and the baseline flow. Furthermore, the method may further comprise sealing a fuel system from the evaporative emissions system for obtaining the baseline flow and the test flow.

In such a method, applying the pressure may includes applying a positive pressure with respect to atmospheric pressure from the evaporative emissions system to the intake. Applying the positive pressure may include routing pressure generated during a refueling event of a fuel tank of the vehicle to the intake.

In another example, a method comprises with an engine of a vehicle not combusting air and fuel, in a first condition operating an evaporative emissions system in a first mode to obtain a first test flow in an intake of the engine and indicating an absence of degradation of the evaporative emissions system in response to the first test flow being within a first threshold of a first baseline flow obtained at an earlier time via operating the evaporative emissions system in the first mode; and in a second condition, operating the evaporative emissions system in a second mode to obtain a second test flow in the intake of the engine and indicating the absence of degradation of the evaporative emissions system in response to the second test flow being within a second threshold of a second baseline flow obtained at an earlier time via operating the evaporative emissions system in the second mode.

In such a method, the first condition includes an indication that a refueling event is not in progress, and wherein the second condition includes an indication that a refueling event is in progress.

In such a method, a pressure-build from the refueling event in the second condition routes fluid flow to the intake of the engine, and wherein the second condition includes an indication of a predetermined fuel fill rate of a fuel tank.

In such a method, the second condition includes an absence of premature shutoffs of a refueling dispenser during the refueling event.

In such a method, operating the evaporative emissions system in the first mode and operating the evaporative emissions system in the second mode in both the first condition and the second condition, respectively, include commanding fully open a canister purge valve positioned in a purge line downstream of a fuel vapor storage canister, commanding fully open a throttle position in the intake, and controlling intake valves of the engine to substantially closed positions.

In such a method, operating the evaporative emissions system in the first mode in the first condition includes operation of a pump positioned in the evaporative emissions system, to draw a vacuum on the evaporative emissions system.

In such a method, the first condition includes an indication that a fuel vapor storage canister positioned in the evaporative emissions system is substantially free from stored fuel vapor, and where operating the evaporative emissions system in the first mode includes sealing the fuel system from the evaporative emissions system, and wherein operating the evaporative emissions system in the second mode includes fluidically coupling the evaporative emissions system to the fuel system.

In such a method, the method may further comprise indicating the first test flow, the first baseline flow, the second test flow, and the second baseline flow based on output of a mass air flow sensor positioned in the intake.

In this way, degradation in the evaporative emissions system may be indicated under conditions that do not rely on engine operation. For example, degradation may include situations where a canister purge valve is sticking closed, or is not fully opening. Degradation may additionally include situations where a canister internal filter is clogged or plugged to some extent. Degradation in some examples may include a source of undesired evaporative emissions stemming from the evaporative emissions system. By indicating such degradation in the absence of engine operation, such degradation may be reliably and readily indicated, which may be particularly desirable for hybrid electric vehicles with limited engine run time.

The technical effect is to recognize that air flow in an intake of the engine may be used as a readout of whether there is degradation present in the evaporative emissions system. More specifically, a technical effect is to recognize that by sealing the engine via closing at least intake valves of the engine, commanding open a throttle and a canister purge valve while maintaining a fuel system sealed from the evaporative emissions system, and directing a negative pressure to the intake via a pump positioned in the evaporative emissions system, a test fluid flow in the intake may be compared to a baseline fluid flow obtained in similar fashion as for obtaining the test flow, to indicate a level to which the evaporative emissions system and/or components therein is/are degraded. A further technical effect is to recognize that such methodology may be conducted under situations where it is known that a fuel vapor storage canister is substantially clean of fuel vapors, to avoid introducing said vapors to atmosphere. In this way, evaporative emissions system degradation may be indicated without engine operation.

A further technical effect is to recognize that during refueling events, pressure induced by the refueling event may be used to route fluid flow to the intake, where air flow in the intake may be used as a readout of whether there is degradation in the evaporative emissions system. Thus, a technical effect is to recognize that by commanding open a canister purge valve during the refueling event, a test flow in the intake may be monitored under conditions where the throttle is commanded fully open and at least the intake valves of the engine are commanded closed. By comparing the test flow to a baseline flow obtained under similar conditions as the test flow, a level to which the evaporative emissions system is degraded may be indicated. Thus, a further technical effect is to recognize that it may be desirable to obtain the test flow and the baseline flow under circumstances where a predetermined fuel fill rate is indicated for both obtaining the test flow and the baseline flow, to avoid complications in interpretation of the results of such a diagnostic. In this way, degradation in the evaporative emissions system may be indicated even under conditions where the engine is not in operation, and which do not rely on battery power to operate a pump.

The systems and methods discussed herein may enable one or more systems and one or more methods. In one example, a method comprises during a condition where an engine of a vehicle is not combusting air and fuel, applying a pressure from an evaporative emissions system of the vehicle to an intake of the engine; and indicating an absence of degradation in the evaporative emissions system based on a test flow in the intake of the engine being within a predetermined threshold of a baseline flow obtained at an earlier time via applying the pressure. In a first example of the method, the method includes wherein a purge valve positioned in a purge line between the fuel vapor storage canister and the engine is commanded fully open, and wherein a throttle positioned in the intake is commanded fully open for obtaining the test flow and the baseline flow. A second example of the method optionally includes the first example, and further comprises adjusting operation of the purge valve while the engine is combusting air and fuel based at least in part on a presence or the absence of degradation in the evaporative emissions system. A third example of the method optionally includes any one or more or each of the first and second examples, and further includes wherein applying the pressure includes applying a negative pressure with respect to atmospheric pressure from the evaporative emissions system to the intake. A fourth example of the method optionally includes any one or more or each of the first through third examples, and further includes wherein a fuel vapor storage canister positioned in the evaporative emissions system is substantially clean of stored fuel vapors. A fifth example of the method optionally includes any one or more or each of the first through fourth examples, and further includes wherein a pump positioned in a vent line of the evaporative emissions system is controlled to a predetermined speed for applying the negative pressure to obtain the test flow and the baseline flow. A sixth example of the method optionally includes any one or more or each of the first through fifth examples, and further comprises sealing a fuel system from the evaporative emissions system for obtaining the baseline flow and the test flow. A seventh example of the method optionally includes any one or more or each of the first through sixth examples, and further includes wherein applying the pressure includes applying a positive pressure with respect to atmospheric pressure from the evaporative emissions system to the intake. An eighth example of the method optionally includes any one or more or each of the first through seventh examples, and further includes wherein applying the positive pressure includes routing pressure generated during a refueling event of a fuel tank of the vehicle to the intake.

Another example of a method comprises with an engine of a vehicle not combusting air and fuel, in a first condition operating an evaporative emissions system in a first mode to obtain a first test flow in an intake of the engine and indicating an absence of degradation of the evaporative emissions system in response to the first test flow being within a first threshold of a first baseline flow obtained at an earlier time via operating the evaporative emissions system in the first mode; and in a second condition, operating the evaporative emissions system in a second mode to obtain a second test flow in the intake of the engine and indicating the absence of degradation of the evaporative emissions system in response to the second test flow being within a second threshold of a second baseline flow obtained at an earlier time via operating the evaporative emissions system in the second mode. In a first example of the method, the method further includes wherein the first condition includes an indication that a refueling event is not in progress; and wherein the second condition includes an indication that a refueling event is in progress. A second example of the method optionally includes the first example, and further includes wherein a pressure-build from the refueling event in the second condition routes fluid flow to the intake of the engine; and wherein the second condition includes an indication of a predetermined fuel fill rate of a fuel tank. A third example of the method optionally includes any one or more or each of the first and second examples, and further includes wherein the second condition includes an absence of premature shutoffs of a refueling dispenser during the refueling event. A fourth example of the method optionally includes any one or more or each of the first through third examples, and further includes wherein operating the evaporative emissions system in the first mode and operating the evaporative emissions system in the second mode in both the first condition and the second condition, respectively, include commanding fully open a canister purge valve positioned in a purge line downstream of a fuel vapor storage canister, commanding fully open a throttle position in the intake, and controlling intake valves of the engine to substantially closed positions. A fifth example of the method optionally includes any one or more or each of the first through fourth examples, and further includes wherein operating the evaporative emissions system in the first mode in the first condition includes operation of a pump positioned in the evaporative emissions system, to draw a vacuum on the evaporative emissions system. A sixth example of the method optionally includes any one or more or each of the first through fifth examples, and further includes wherein the first condition includes an indication that a fuel vapor storage canister positioned in the evaporative emissions system is substantially free from stored fuel vapor, and where operating the evaporative emissions system in the first mode includes sealing the fuel system from the evaporative emissions system; and wherein operating the evaporative emissions system in the second mode includes fluidically coupling the evaporative emissions system to the fuel system. A seventh example of the method optionally includes any one or more or each of the first through sixth examples, and further comprises indicating the first test flow, the first baseline flow, the second test flow, and the second baseline flow based on output of a mass air flow sensor positioned in the intake.

An example of a system for a hybrid vehicle comprises a fuel vapor storage canister positioned in an evaporative emissions system of the hybrid vehicle, the fuel vapor storage canister selectively fluidically coupled to a fuel system via a fuel tank isolation valve and selectively fluidically coupled to an intake of an engine via a canister purge valve; a throttle positioned in the intake of the engine; a plurality of intake valves configured to regulate air flow to the engine; a mass air flow sensor positioned in the intake of the engine; and a controller with computer readable instructions stored on non-transitory memory that when executed, cause the controller to: with the engine not combusting air and fuel, in a first condition, operate the evaporative emissions system in a first mode to direct a first test flow that is negative with respect to atmospheric pressure to the intake and indicate evaporative emissions system degradation in response to the first test flow being outside of a first predetermined threshold of a first baseline flow obtained via operating the evaporative emissions system in the first mode, where the first test flow and first baseline flow are indicated via the mass air flow sensor; and in a second condition, operate the evaporative emissions system in a second mode to direct a second test flow that is positive with respect to atmospheric pressure to the intake and indicate evaporative emissions system degradation in response to the second test flow being outside of a second predetermined threshold of a second baseline flow obtained via operating the evaporative emissions system in the second mode, where the second test flow and the second baseline flow are monitored via the mass air flow sensor. In a first example of the system, the system further comprises a pump positioned in the evaporative emissions system between the fuel vapor storage canister and atmosphere; and wherein the controller stores further instructions to, in the first condition, command fully open the canister purge valve, command fully closed the fuel tank isolation valve, command fully open the throttle, control the engine to substantially close the plurality of intake valves; and operate the pump at a predetermined speed to direct the first test flow to the intake, where the predetermined speed comprises a same speed as that utilized for obtaining the first baseline flow. A second example of the system optionally includes the first example, and further includes wherein the controller stores further instructions to, in the second condition, in response to a request for refueling of a fuel tank positioned in the fuel system, command fully open the fuel tank isolation valve to enable refueling of the fuel tank, and in response to an absence of premature shutoffs of a refueling dispenser during the refueling, and in response to an indication that a fuel fill rate comprises a predetermined fuel fill rate, direct the second test flow to the intake via commanding fully open the canister purge valve with the fuel tank isolation valve open, commanding fully open the throttle, and controlling the engine to substantially close the plurality of intake valves.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a hybrid vehicle, comprising:
a fuel vapor storage canister positioned in an evaporative emissions system of the hybrid vehicle, the fuel vapor storage canister selectively fluidically coupled to a fuel system via a fuel tank isolation valve and selectively fluidically coupled to an intake of an engine via a canister purge valve;
a throttle positioned in the intake of the engine;
a plurality of intake valves configured to regulate air flow to the engine;
a mass air flow sensor positioned in the intake of the engine; and
a controller with computer readable instructions stored on non-transitory memory that when executed, cause the controller to:
with the engine not combusting air and fuel, in a first condition, operate the evaporative emissions system in a first mode to direct a first test flow that is negative with respect to atmospheric pressure to the intake and indicate evaporative emissions system degradation in response to the first test flow being outside of a first predetermined threshold of a first baseline flow obtained via operating the evaporative emissions system in the first mode, where the first test flow and first baseline flow are indicated via the mass air flow sensor; and
in a second condition, operate the evaporative emissions system in a second mode to direct a second test flow that is positive with respect to atmospheric pressure to the intake and indicate evaporative emissions system degradation in response to the second test flow being outside of a second predetermined threshold of a second baseline flow obtained via operating the evaporative emissions system in the second mode, where the second test flow and the second baseline flow are monitored via the mass air flow sensor.

2. The system of claim 1, further comprising:
a pump positioned in the evaporative emissions system between the fuel vapor storage canister and atmosphere; and
wherein the controller stores further instructions to, in the first condition, command fully open the canister purge valve, command fully closed the fuel tank isolation valve, command fully open the throttle, control the engine to substantially close the plurality of intake valves; and
operate the pump at a predetermined speed to direct the first test flow to the intake, where the predetermined speed comprises a same speed as that utilized for obtaining the first baseline flow.

3. The system of claim 1, wherein the controller stores further instructions to, in the second condition, in response to a request for refueling of a fuel tank positioned in the fuel system, command fully open the fuel tank isolation valve to enable refueling of the fuel tank, and in response to an absence of premature shutoffs of a refueling dispenser during the refueling, and in response to an indication that a fuel fill rate comprises a predetermined fuel fill rate, direct the second test flow to the intake via commanding fully open the canister purge valve with the fuel tank isolation valve open, commanding fully open the throttle, and controlling the engine to substantially close the plurality of intake valves.

4. A method, comprising:
during a condition where an engine of a vehicle is not combusting air and fuel, applying a pressure from an evaporative emissions system of the vehicle to an intake of the engine; and
indicating an absence of degradation in the evaporative emissions system based on a test flow in the intake of the engine being within a predetermined threshold of a baseline flow obtained at an earlier time via applying the pressure.

5. The method of claim 4, wherein a purge valve positioned in a purge line between the fuel vapor storage canister and the engine is commanded fully open, and wherein a throttle positioned in the intake is commanded fully open for obtaining the test flow and the baseline flow.

6. The method of claim 5, further comprising:
adjusting operation of the purge valve while the engine is combusting air and fuel based at least in part on a presence or the absence of degradation in the evaporative emissions system.

7. The method of claim 4, wherein applying the pressure includes applying a negative pressure with respect to atmospheric pressure from the evaporative emissions system to the intake.

8. The method of claim 7, wherein a fuel vapor storage canister positioned in the evaporative emissions system is substantially clean of stored fuel vapors.

9. The method of claim 7, wherein a pump positioned in a vent line of the evaporative emissions system is controlled to a predetermined speed for applying the negative pressure to obtain the test flow and the baseline flow.

10. The method of claim 7, further comprising sealing a fuel system from the evaporative emissions system for obtaining the baseline flow and the test flow.

11. The method of claim 1, wherein applying the pressure includes applying a positive pressure with respect to atmospheric pressure from the evaporative emissions system to the intake.

12. The method of claim 11, wherein applying the positive pressure includes routing pressure generated during a refueling event of a fuel tank of the vehicle to the intake.

13. A method, comprising:
with an engine of a vehicle not combusting air and fuel, in a first condition operating an evaporative emissions system in a first mode to obtain a first test flow in an intake of the engine and indicating an absence of degradation of the evaporative emissions system in response to the first test flow being within a first threshold of a first baseline flow obtained at an earlier time via operating the evaporative emissions system in the first mode; and
in a second condition, operating the evaporative emissions system in a second mode to obtain a second test flow in the intake of the engine and indicating the absence of degradation of the evaporative emissions system in response to the second test flow being within a second threshold of a second baseline flow obtained at an earlier time via operating the evaporative emissions system in the second mode.

14. The method of claim 13, wherein the first condition includes an indication that a refueling event is not in progress; and
wherein the second condition includes an indication that a refueling event is in progress.

15. The method of claim 14, wherein a pressure-build from the refueling event in the second condition routes fluid flow to the intake of the engine; and
wherein the second condition includes an indication of a predetermined fuel fill rate of a fuel tank.

16. The method of claim 14, wherein the second condition includes an absence of premature shutoffs of a refueling dispenser during the refueling event.

17. The method of claim 13, wherein operating the evaporative emissions system in the first mode and operating the evaporative emissions system in the second mode in both the first condition and the second condition, respectively, include commanding fully open a canister purge valve positioned in a purge line downstream of a fuel vapor storage canister, commanding fully open a throttle position in the intake, and controlling intake valves of the engine to substantially closed positions.

18. The method of claim 13, wherein operating the evaporative emissions system in the first mode in the first condition includes operation of a pump positioned in the evaporative emissions system, to draw a vacuum on the evaporative emissions system.

19. The method of claim 13, wherein the first condition includes an indication that a fuel vapor storage canister positioned in the evaporative emissions system is substantially free from stored fuel vapor, and where operating the evaporative emissions system in the first mode includes sealing the fuel system from the evaporative emissions system; and
wherein operating the evaporative emissions system in the second mode includes fluidically coupling the evaporative emissions system to the fuel system.

20. The method of claim 13, further comprising indicating the first test flow, the first baseline flow, the second test flow, and the second baseline flow based on output of a mass air flow sensor positioned in the intake.

* * * * *